United States Patent
Si et al.

(10) Patent No.: US 11,160,050 B2
(45) Date of Patent: Oct. 26, 2021

(54) METHOD AND APPARATUS FOR SUPPORTING LARGE SUBCARRIER SPACING FOR SS/PBCH BLOCK

(71) Applicant: Samsung Electronics Co., Ltd., Suwon-si (KR)

(72) Inventors: Hongbo Si, Plano, TX (US); Yingzhe Li, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 16/365,487

(22) Filed: Mar. 26, 2019

(65) Prior Publication Data

US 2019/0306832 A1    Oct. 3, 2019

Related U.S. Application Data

(60) Provisional application No. 62/649,118, filed on Mar. 28, 2018, provisional application No. 62/665,859, (Continued)

(51) Int. Cl.
*H04W 4/00* (2018.01)
*H04W 72/00* (2009.01)
(Continued)

(52) U.S. Cl.
CPC ....... *H04W 72/005* (2013.01); *H04J 11/0069* (2013.01); *H04L 5/001* (2013.01);
(Continued)

(58) Field of Classification Search
None
See application file for complete search history.

(56) References Cited

U.S. PATENT DOCUMENTS

2016/0135179 A1    5/2016    Yin et al.
2016/0337817 A1*  11/2016    Malladi .................. H04W 4/06
(Continued)

FOREIGN PATENT DOCUMENTS

| CA | 2966970 A1 | 5/2016 |
|----|------------|--------|
| WO | 2017026434 A1 | 2/2017 |
| WO | 2017073651 A1 | 5/2017 |

OTHER PUBLICATIONS

"3rd Generation Partnership Project; Technical Specification Group Radio Access Network; NR; Physical channels and modulation (Release 15)", 3GPP TS 38.211 V15.0.0, Dec. 2017, 73 pages.
(Continued)

*Primary Examiner* — Bob A Phunkulh

(57) ABSTRACT

A UE in a wireless communication system is provided. The UE comprises a transceiver configured to receive SS/PBCH block over downlink channels using a set of parameters based on an operation mode. The operation mode is configured for the SS/PBCH block as a first operation mode in which the SS/PBCH block is used on a LAA Scell or a second operation mode in which the SS/PBCH block is at least used on a Pcell. The set of parameters is configured as a first set of parameters for the SS/PBCH block when the operation mode of the SS/PBCH block is configured as the first operation mode or a second set of parameters for the SS/PBCH block when the operation mode of the SS/PBCH block is configured as the second operation mode. The first and second set of parameters include different information each other.

20 Claims, 39 Drawing Sheets

Related U.S. Application Data filed on May 2, 2018, provisional application No. 62/667,868, filed on May 7, 2018, provisional application No. 62/670,305, filed on May 11, 2018, provisional application No. 62/724,226, filed on Aug. 29, 2018, provisional application No. 62/793,985, filed on Jan. 18, 2019.

(51) Int. Cl.
```
H04W 72/04      (2009.01)
H04L 5/00       (2006.01)
H04L 27/26      (2006.01)
H04J 11/00      (2006.01)
H04W 16/14      (2009.01)
```

(52) U.S. Cl.
CPC .......... *H04L 5/005* (2013.01); *H04L 27/2666* (2013.01); *H04W 16/14* (2013.01); *H04W 72/042* (2013.01); *H04W 72/0446* (2013.01)

(56) References Cited

U.S. PATENT DOCUMENTS

| | | | |
|---|---|---|---|
| 2017/0094621 A1* | 3/2017 | Xu | H04L 47/125 |
| 2017/0099667 A1 | 4/2017 | Dinan | |
| 2017/0238272 A1 | 8/2017 | You et al. | |
| 2017/0257838 A1* | 9/2017 | Patel | H04H 20/08 |
| 2017/0289818 A1 | 10/2017 | Ng et al. | |
| 2017/0303220 A1 | 10/2017 | Sadeghi et al. | |
| 2017/0318473 A1 | 11/2017 | Futaki | |
| 2017/0353912 A1 | 12/2017 | Einhaus et al. | |
| 2018/0084432 A1 | 3/2018 | Kwak et al. | |
| 2018/0192383 A1* | 7/2018 | Nam | H04W 72/044 |
| 2018/0192412 A1* | 7/2018 | Novlan | H04L 5/0048 |
| 2018/0192443 A1* | 7/2018 | Novlan | H04W 76/11 |
| 2018/0242374 A1 | 8/2018 | Harada et al. | |
| 2018/0302867 A1* | 10/2018 | Abedini | H04W 56/0015 |
| 2018/0324017 A1* | 11/2018 | Liu | H04L 5/0053 |
| 2018/0324719 A1* | 11/2018 | Liu | H04L 5/0048 |
| 2018/0324731 A1* | 11/2018 | Liu | H04L 27/2666 |
| 2019/0260530 A1* | 8/2019 | Yi | H04L 5/0039 |
| 2020/0137701 A1* | 4/2020 | Harada | H04L 5/0053 |
| 2020/0236572 A1* | 7/2020 | Yiu | H04L 5/0057 |
| 2020/0288417 A1* | 9/2020 | Harada | H04W 72/044 |
| 2020/0288442 A1* | 9/2020 | Murayama | H04L 27/26025 |
| 2020/0366398 A1* | 11/2020 | Takeda | H04W 72/042 |
| 2020/0374837 A1* | 11/2020 | Harada | H04W 72/005 |
| 2020/0404537 A1* | 12/2020 | Harada | H04J 11/0073 |
| 2021/0068064 A1* | 3/2021 | Harada | H04W 72/005 |
| 2021/0185684 A1* | 6/2021 | Miao | H04W 72/0453 |

OTHER PUBLICATIONS

"3rd Generation Partnership Project; Technical Specification Group Radio Access Network; NR; Multiplexing and channel coding (Release 15)", 3GPP TS 38.212 V15.0.0, Dec. 2017, 82 pages.

"3rd Generation Partnership Project; Technical Specification Group Radio Access Network; NR; Physical layer procedures (Release 15)", 3GPP TS 38.213 V15.0.0, Dec. 2017, 56 pages.

"3rd Generation Partnership Project; Technical Specification Group Radio Access Network; NR; Physical layer procedures for data (Release 15)", 3GPP TS 38.214 V15.0.0, Dec. 2017, 71 pages.

"3rd Generation Partnership Project; Technical Specification Group Radio Access Network; NR; Medium Access Control (MAC) protocol specification (Release 15)", 3GPP TS 38.321 V15.0.0, Dec. 2017, 55 pages.

"3rd Generation Partnership Project; Technical Specification Group Radio Access Network; NR; Radio Resource Control (RRC) protocol specification (Release 15)", 3GPP TS 38.331 V15.0.0, Dec. 2017, 188 pages.

ISR/KR, International Search Report and Written Opinion of the International Searching Authority, International Application No. PCT/KR2019/003679, dated Jul. 5, 2019, 8 pages.

Huawei, et al., "NR licensed assisted and standalone operation on unlicensed bands," R1-1801368, 3GPP TSG RAN WG1 Meeting #92, Athens, Greece, Feb. 26-Mar. 2, 2018, 4 pages.

Interdigital Inc., "Considerations on Synchronization Signal for NR Unlicensed Spectrum," R1-1802647, 3GPP TSG RAN WG1 Meeting #92, Athens, Greece, Feb. 26-Mar. 2, 2018, 3 pages.

LG Electronics, "RMSI delivery and CORESET configuration," R1-1802191, 3GPP TSG RAN WG1 Meeting #92, Athens, Greece, Feb. 26-Mar. 2, 2018, 22 pages.

Nokia, et al., "Potential solutions and techniques for NR unlicensed," R1-1802526, 3GPP TSG RAN WG1 Meeting #92, Athens, Greece, Feb. 26-Mar. 2, 2018, 10 pages.

Labib, et al., "Extending LTE into the Unlicensed Spectrum: Technical Analysis of the Proposed Variants", Sep. 13, 2017, 18 pages.

Sony, "DRS design for NR unlicensed spectrum", 3GPP TSG RAN WG1 Meeting 91, R1-1720474, Reno, US, Nov. 27-Dec. 2, 2017, 4 pages.

Office Action dated Feb. 12, 2021 from the European Patent Office in connection with European Patent Application No. 19 776 931.8, 15 pages.

Extended European Search Report regarding Application No. 19776931.8, dated Jun. 17, 2021, 27 pages.

Qualcomm, "New SID on NR-based Access to Unlicensed Spectrum", 3GPP Tsg Ran Meeting # 75, RP-170828, Mar. 2017, 5 pages.

Huawei et al., "Low frequency assisted high frequency operation on initial access", 3GPP TSG RAN WG1 Meeting #86b, R1-1609448, Oct. 2016, 5 pages.

Interdigitial Inc., "General views on NR Operation in Unlicensed Spectrum", 3GPP TSG RAN WG1 Meeting AH 1801, R1-1800637, Jan. 2018, 8 pages.

* cited by examiner

METHOD AND APPARATUS FOR SUPPORTING LARGE SUBCARRIER SPACING FOR SS/PBCH BLOCK

CROSS-REFERENCE TO RELATED APPLICATION(S) AND CLAIM OF PRIORITY

The present application claims priority to:
U.S. Provisional Patent Application Ser. No. 62/649,118, filed on Mar. 28, 2018;
U.S. Provisional Patent Application Ser. No. 62/665,859, filed on May 2, 2018;
U.S. Provisional Patent Application Ser. No. 62/667,868, filed on May 7, 2018;
U.S. Provisional Patent Application Ser. No. 62/670,305, filed on May 11, 2018;
U.S. Provisional Patent Application Ser. No. 62/724,226, filed on Aug. 29, 2018; and
U.S. Provisional Patent Application Ser. No. 62/793,985, filed on Jan. 18, 2019.
The content of the above-identified patent documents are incorporated herein by reference.

TECHNICAL FIELD

The present application relates generally to subcarrier spacing. More specifically, this disclosure relates to larger subcarrier spacing for SS/PBCH block in an advanced wireless communication system.

BACKGROUND

For a new radio (NR) licensed spectrum, each synchronization and physical broadcasting channel (PBCH) signal block (SS/PBCH block) comprises one symbol for NR-primary synchronization signal (NR-PSS), two symbols for NR-PBCH, and one symbol for NR-secondary synchronization signal (NR-SSS) and NR-PBCH, where the four symbols are mapped consecutively and time division multiplexed. An NR-SS is a unified design, including the NR-PSS and NR-SSS sequence design, for all supported carrier frequency ranges in the NR. The transmission bandwidth of NR-PSS and NR-SSS is smaller than the transmission bandwidth of the whole SS/PBCH block. For initial cell selection for an NR cell, a UE assumes the default SS burst set periodicity as 20 ms, and for detecting a non-standalone NR cell, network provides one SS burst set periodicity information per frequency carrier to the UE and information to derive measurement timing/duration. Other than a master information block (MIB), the remaining minimum system information (RMSI) is carried by physical downlink shared channel (PDSCH) with scheduling info carried by the corresponding physical downlink control channel (PDCCH). A control resource set (CORESET) for receiving common control channels is required to be configured, and can be transmitted in PBCH.

SUMMARY

Embodiments of the present disclosure provide larger subcarrier spacing for SS/PBCH block in an advanced wireless communication system.

In one embodiment, a user equipment (UE) in a wireless communication system is provided. The UE comprises a transceiver configured to receive, from a base station (BS), synchronization signals and physical broadcast channels (SS/PBCH) block over downlink channels using a set of parameters based on an operation mode. The operation mode is configured for the SS/PBCH block as a first operation mode in which the SS/PBCH block is used on a licensed-assisted-access (LAA) secondary cell (Scell) or a second operation mode in which the SS/PBCH block is at least used on a primary cell (Pcell). The set of parameters is configured as a first set of parameters for the SS/PBCH block when the operation mode of the SS/PBCH block is configured as the first operation mode or a second set of parameters for the SS/PBCH block when the operation mode of the SS/PBCH block is configured as the second operation mode, and the first and second set of parameters include different information each other, the information comprising at least one of an SS/PBCH block structure or an SS/PBCH block time-domain mapping pattern.

In another embodiment, a base station (BS) in a wireless communication system is provided. The BS comprises at least one processor configured to configure an operation mode for synchronization signals and physical broadcast channels (SS/PBCH) block as a first operation mode in which the SS/PBCH block is used on a licensed-assisted-access (LAA) secondary cell (Scell) or a second operation mode in which the SS/PBCH block is at least used on a primary cell (Pcell), and configure a set of parameters as a first set of parameters for the SS/PBCH block when the operation mode of the SS/PBCH block is configured as the first operation mode or a second set of parameters for the SS/PBCH block when the operation mode of the SS/PBCH block is configured as the second operation mode, wherein the first and second set of parameters include different information each other, the information comprising at least one of an SS/PBCH block structure or an SS/PBCH block time-domain mapping pattern. The BS further comprises a transceiver operably connected to the at least one processor, the transceiver configured to transmit, to a user equipment (UE), the SS/PBCH block over downlink channels using the configured set of parameters based on the configured operation mode.

In yet another embodiment, a method of a base station (BS) in a wireless communication system is provided. The method comprises configuring an operation mode for synchronization signals and physical broadcast channels (SS/PBCH) block as a first operation mode in which the SS/PBCH block is used on a licensed-assisted-access (LAA) secondary cell (Scell) or a second operation mode in which the SS/PBCH block is at least used on a primary cell (Pcell), configuring a set of parameters as a first set of parameters for the SS/PBCH block when the operation mode of the SS/PBCH block is configured as the first operation mode or a second set of parameters for the SS/PBCH block when the operation mode of the SS/PBCH block is configured as the second operation mode, wherein the first and second set of parameters include different information each other, the information comprising at least one of an SS/PBCH block structure or an SS/PBCH block time-domain mapping pattern, and transmitting, to a user equipment (UE), the SS/PBCH block over downlink channels using the configured set of parameters based on the configured operation mode.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates an example SS/PBCH mapping pattern according to embodiments of the present disclosure;

FIG. 30 illustrates another example a mapping pattern of SS/PBCH blocks according to embodiments of the present disclosure;

FIG. 31 illustrates yet another example a mapping pattern of SS/PBCH blocks according to embodiments of the present disclosure;

FIG. 37 illustrates yet another example mapping of SS/PBCH block according to embodiments of the present disclosure;

DETAILED DESCRIPTION

FIG. 1 through FIG. 39, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 38.211 v15.0.0, "NR; Physical channels and modulation;" 3GPP TS 38.212 v15.0.0, "NR; Multiplexing and channel coding;" 3GPP TS 38.213 v15.0.0, "NR; Physical layer procedures for control;" 3GPP TS 38.214 v15.0.0, "NR; Physical layer procedures for data;" 3GPP TS 38.215 v15.0.0, "NR; Physical layer measurements;" and 3GPP TS 38.331 v15.0.0, "NR; Radio Resource Control (RRC) protocol specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
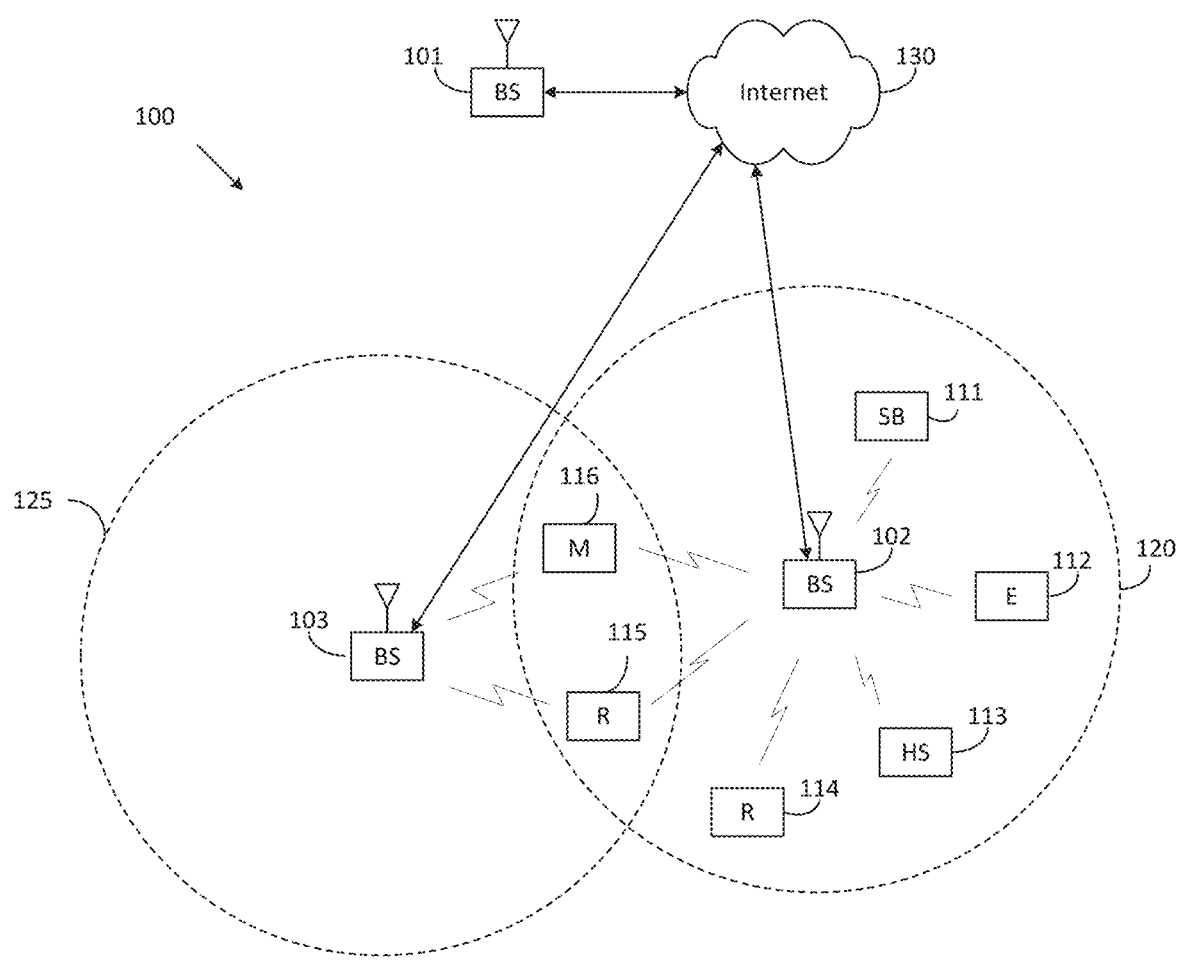
FIG. 1 illustrates an example wireless network according to embodiments of the present disclosure.
Figure 2:
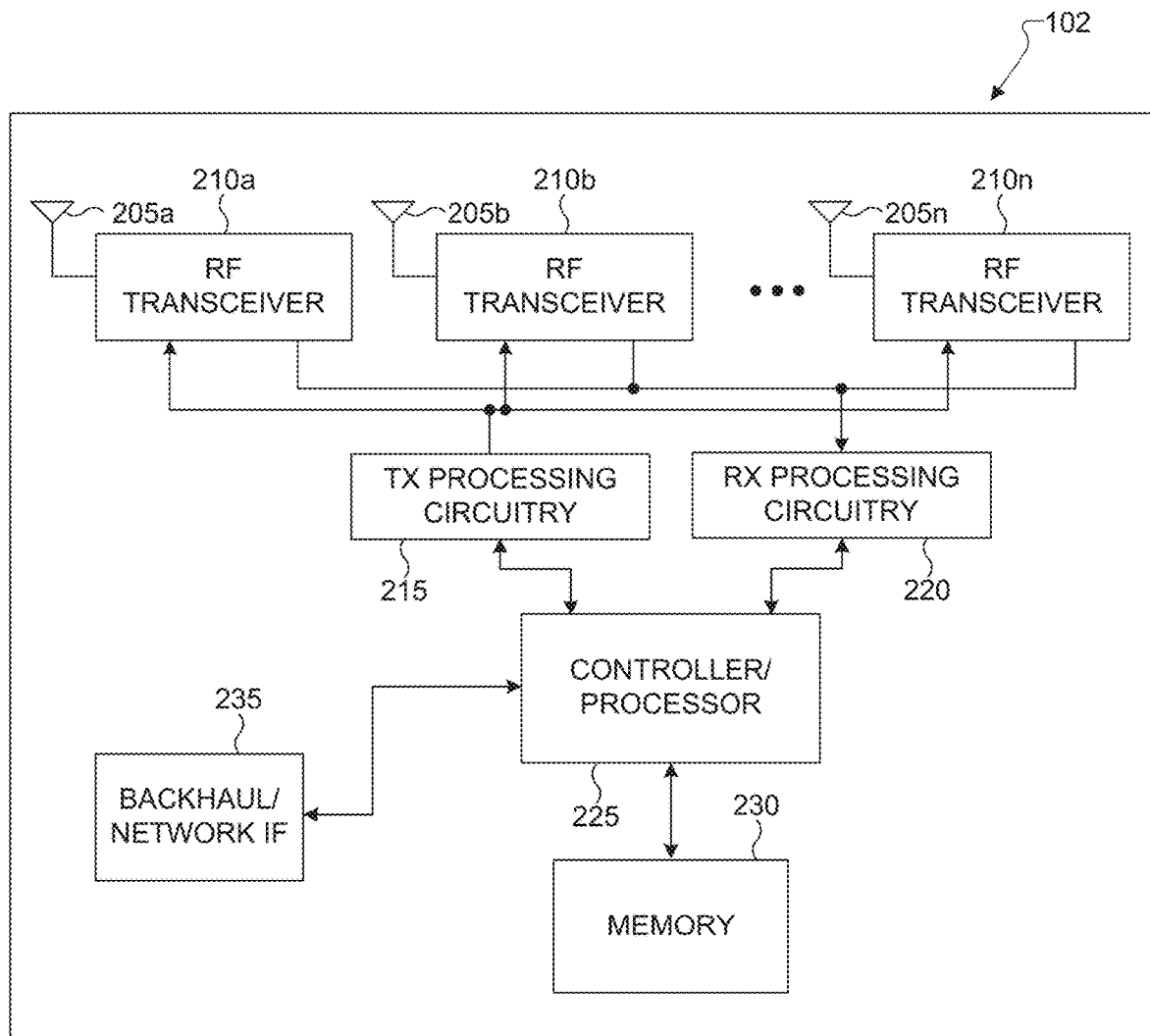
FIG. 2 illustrates an example gNB according to embodiments of the present disclosure.
Figure 3:
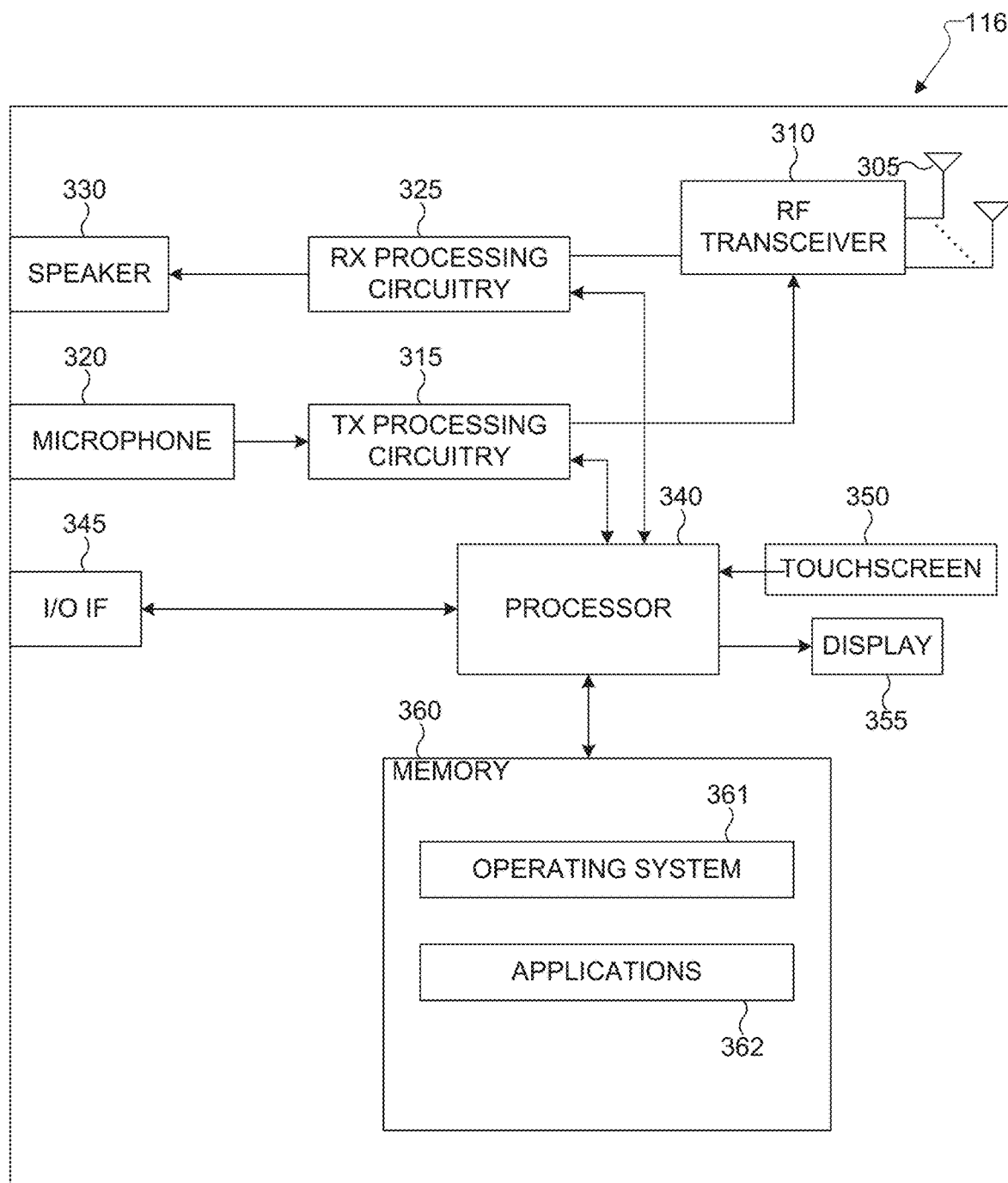
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient discovery signal and channel with larger subcarrier spacing. In certain embodiments, and one or more of the gNBs 101-103 includes circuitry, programing, or a combination thereof, for efficient discovery signal and channel with larger subcarrier spacing for SS/PBCH block.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
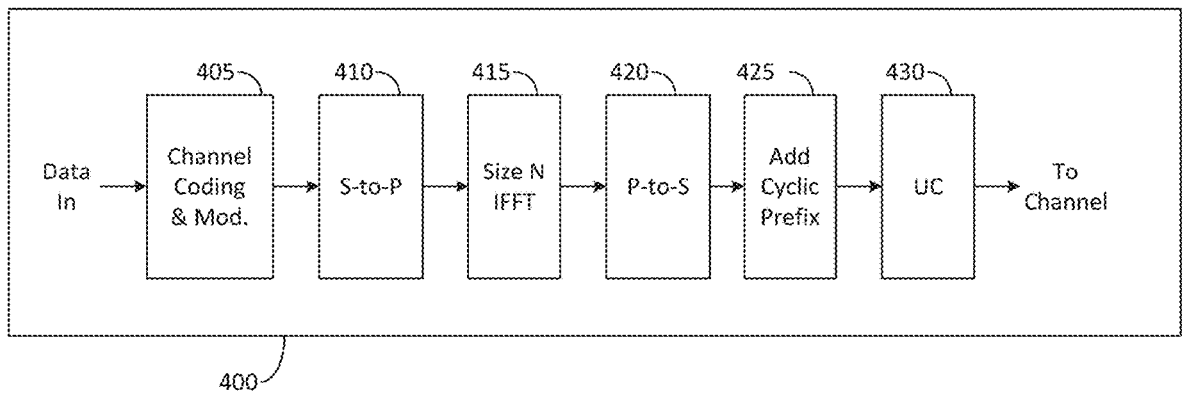
FIG. 4A illustrates a high-level diagram of an orthogonal frequency division multiple access transmit path according to embodiments of the present disclosure.
Figure 4B:
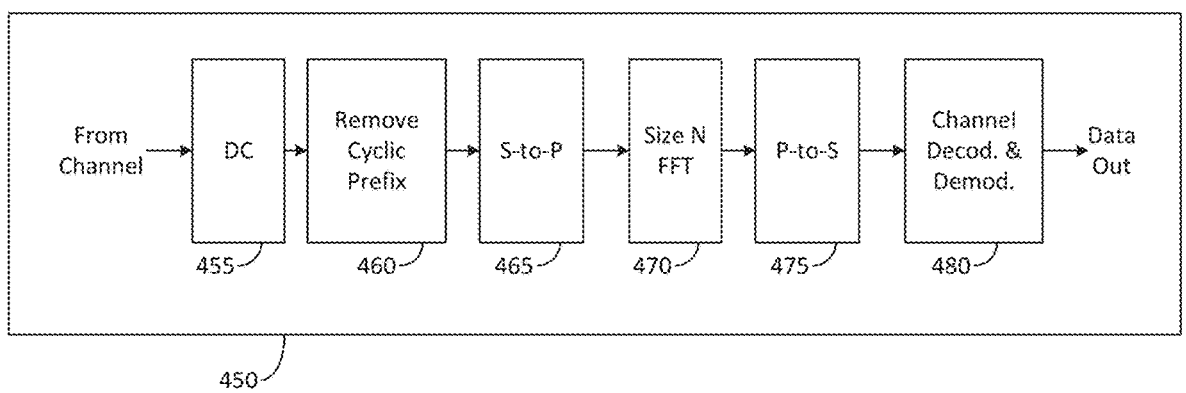
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g. user equipment 116 of FIG. 1). In other examples, for uplink communication, the receive path circuitry 450 may be implemented in a base station (e.g. gNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at the gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to the gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra-reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the BCCH conveys a master information block (MIB) or to a DL shared channel (DL-SCH) when the BCCH conveys a system information block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1) - N_{SRS}$ where $N_{SRS}=1$ if a last subframe symbol is used to transmit SRS and $N_{SRS}=0$ otherwise.

Figure 5:
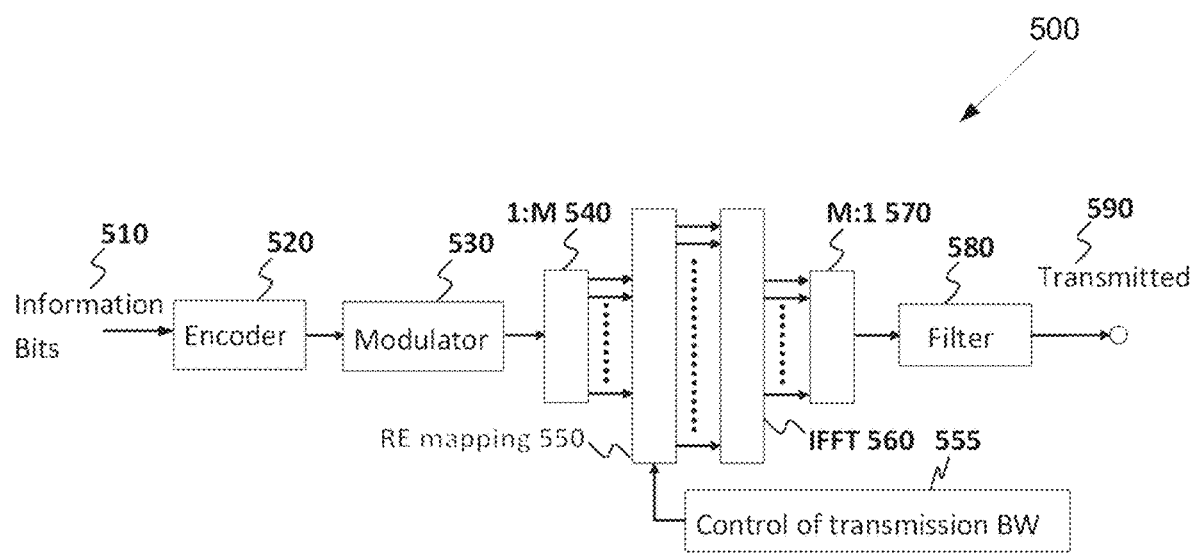
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
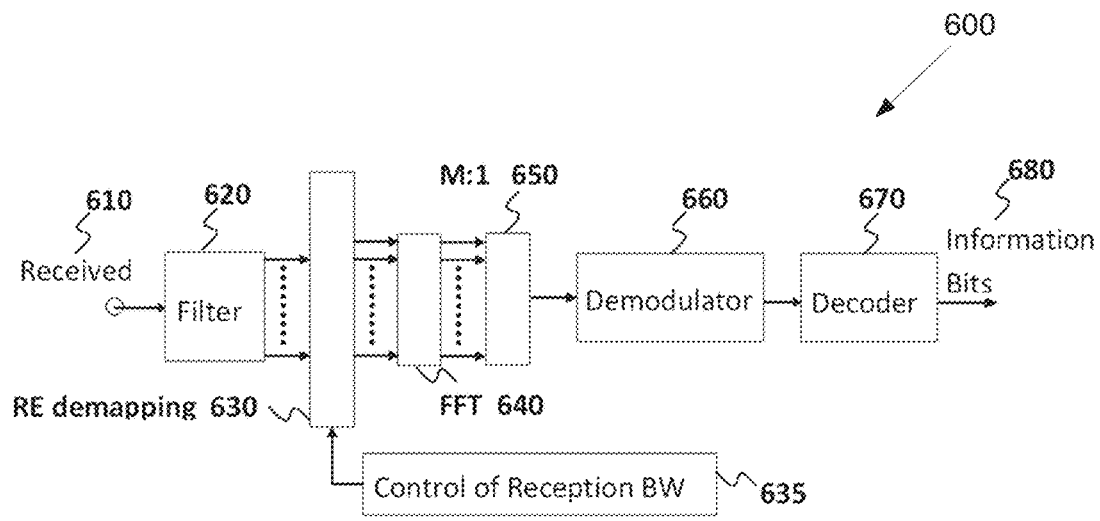
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
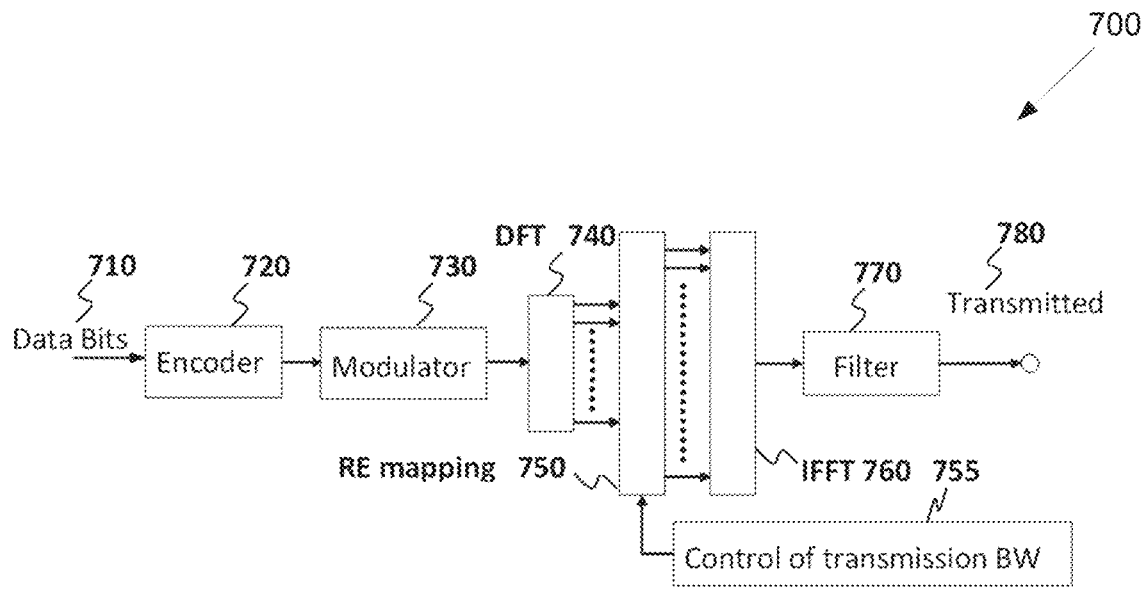
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
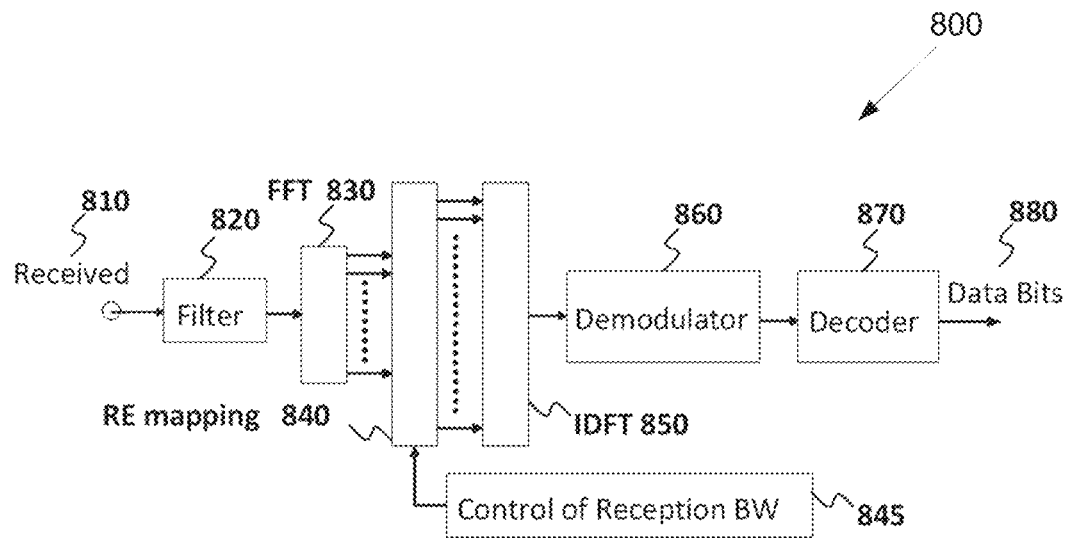
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one embodiment has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Power consumption and battery life are very important for terminals in an internet of thing (IoT). In a narrowband IoT (NB-IoT) or an enhanced machine type communication (eMTC) system, the power of terminal devices can be saved by means of configuring a power saving mode (PSM) or an extended discontinuous reception (eDRX) mode. However, a UE is unable to listen paging messages during sleep in the PSM mode or the eDRX mode. In some IoT application scenarios, a UE is required to establish a connection with a network within a certain period of time after receiving a network command. Then the UE that has the requirement cannot be configured with the PSM mode or the eDRX mode that has a relatively long period.

In NB-IoT and an enhanced version of eMTC system, to enable a UE to be paged, and meanwhile to save power, a wake-up or sleep signal/channel is introduced after study and research. The wake-up signal/channel is configured to wake up a UE, i.e., a case where the UE needs to continue to monitor a subsequent MTC physical downlink control channel (MPDCCH) that is used to indicate a paging message. The sleep signal/channel is configured to instruct that a UE may enter into a sleep state, i.e., a case where the UE does not need to monitor a subsequent MPDCCH that is used to indicate a paging message.

In a multi-carrier system, a carrier that transmits a synchronization signal is called an anchor carrier, and in an LTE system, a paging signal is transmitted on an anchor carrier. In an NB-IoT system, a scheme for transmitting paging messages on non-anchor carriers is introduced. In the eMTC system, multiple narrowbands are defined, in which a narrowband has 6 physical resource blocks (PRBs), and the concept of paging narrowband is introduced. In addition, in the eMTC system, a downlink control channel for MTC, MPDCCH, is configured to indicate a paging message, and different UEs may monitor MPDCCHs on different narrowbands. Similarly, in an ongoing 5G new radio (NR) system, there is a situation where the bandwidth of a UE is smaller than a system bandwidth, and in this case, multiple bandwidth parts may be defined for a paging channel. For the case of multi-carrier or narrowbands or partial bandwidths, it is an issue yet to be solved that how to transmit and receive a wake-up or sleep signal.

Figure 9:
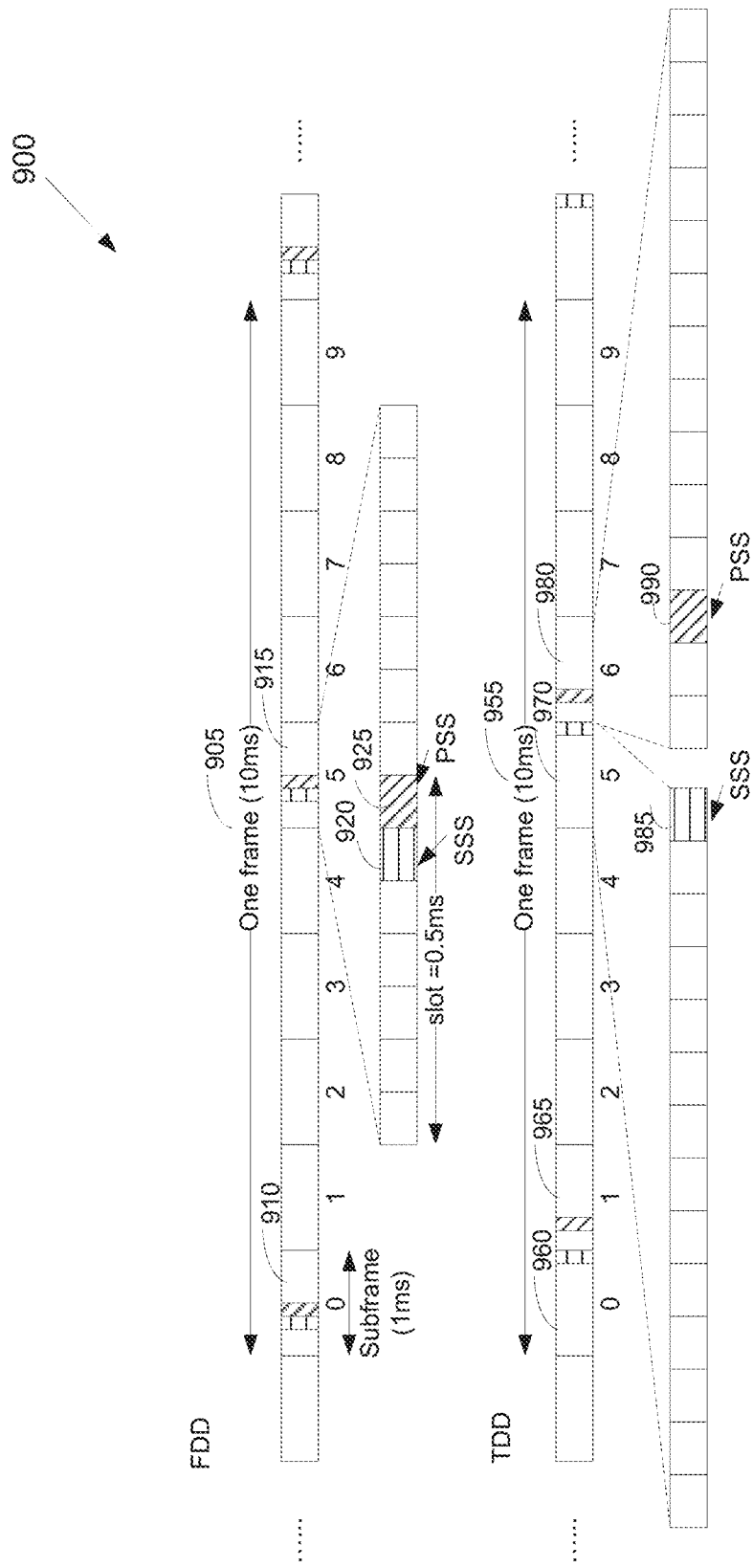
FIG. 9 illustrates an example time domain positions for the mapping of PSS/SSS for FDD and TDD according to embodiments of the present disclosure.

FIG. 9 illustrates an example time domain positions 900 for the mapping of PSS/SSS for FDD and TDD according to embodiments of the present disclosure. The embodiment of the time domain positions 900 illustrated in FIG. 9 is for illustration only. FIG. 9 does not limit the scope of this disclosure to any particular implementation.

Referring to FIG. 9, in case of FDD, in every frame (905), a PSS (925) is transmitted within a last symbol of a first slot of subframes 0 and 5 (910 and 915), wherein a subframe includes two slots. An SSS (920) is transmitted within a second last symbol of a same slot. In case of TDD, in every frame (955), a PSS (990) is transmitted within a third symbol of subframes 1 and 6 (965 and 980), while an (SSS) 985 is transmitted in a last symbol of subframes 0 and 5 (960 and 970). The difference allows for the detection of the duplex scheme on a cell. The resource elements for PSS and SSS are not available for transmission of any other type of DL signals.

In the present disclosure, numerology refers to a set of signal parameters which can include subframe duration, sub-carrier spacing, cyclic prefix length, transmission bandwidth, or any combination of these signal parameters.

For LTE initial access, primary and secondary synchronization signals (PSS and SSS, respectively) are used for coarse timing and frequency synchronization and cell ID acquisition. Since PSS/SSS is transmitted twice per 10 ms radio frame and time-domain enumeration is introduced in terms of system frame number (SFN, included in the MIB), frame timing is detected from PSS/SSS to avoid the need for increasing the detection burden from PBCH. In addition, cyclic prefix (CP) length and, if unknown, duplexing scheme can be detected from PSS/SSS. The PSS is constructed from a frequency-domain ZC sequence of length 63, with the middle element truncated to avoid using the d.c. subcarrier.

Three roots are selected for PSS to represent the three physical layer identities within each group of cells. The SSS sequences are based on the maximum length sequences (also known as M-sequences). Each SSS sequence is constructed by interleaving two length-31 BPSK modulated sequences in frequency domain, where the two source sequences before modulation are different cyclic shifts of the same M-sequence. The cyclic shift indices are constructed from the physical cell ID group.

Since PSS/SSS detection can be faulty (due to, for instance, non-idealities in the auto- and cross-correlation properties of PSS/SSS and lack of CRC protection), cell ID hypotheses detected from PSS/SSS may occasionally be confirmed via PBCH detection. PBCH is primarily used to signal the master information block (MIB) which consists of DL and UL system bandwidth information (3 bits), PHICH information (3 bits), and SFN (8 bits). 10 reserved bits (for other uses such as MTC) are added, the MIB payload amounts to 24 bits. After appended with a 16-bit CRC, a rate-1/3 tail-biting convolutional coding, 4× repetitions and QPSK modulation are applied to the 40-bit codeword. The resulting QPSK symbol stream is transmitted across 4 subframes spread over 4 radio frames. Other than detecting MIB, blind detection of the number of CRS ports is also needed for PBCH.

For NR licensed spectrum, each synchronization and PBCH signal block (SS/PBCH block) compromises of one symbol for NR-PSS, two symbols for NR-PBCH, one symbol for NR-SSS and NR-PBCH, where the four symbols are mapped consecutively and time division multiplexed. NR-SS is a unified design, including the NR-PSS and NR-SSS sequence design, for all supported carrier frequency rages in NR. The transmission bandwidth of NR-PSS and NR-SSS (e.g. 12 RBs) is smaller than the transmission bandwidth of the whole SS/PBCH block (e.g. 20 RBs).

For initial cell selection for NR cell, a UE assumes the default SS burst set periodicity as 20 ms, and for detecting non-standalone NR cell, network provides one SS burst set periodicity information per frequency carrier to UE and information to derive measurement timing/duration if possible. Other than the MIB, the remaining minimum system information (RMSI) is carried by PDSCH with scheduling info carried by the corresponding PDCCH Similar structure applies to other system information (OSI) and Paging message. The control resource set (CORESET) for receiving common control channels, such as RMSI, OSI, RAR, etc., is required to be configured, and can be transmitted in PBCH.

In one embodiment, an SS/PBCH block operated in a non-standalone mode refers to the SS/PBCH block transmitted on a license-assisted-access (LAA) mode on a secondary cell (Scell), and an SS/PBCH block operated in a standalone mode refers to the SS/PBCH block transmitted on at least a primary cell (Pcell).

In another embodiment, an SS/PBCH block operated in a non-standalone mode refers to that a UE does not expect to receive physical downlink control channel (PDCCH)/physical downlink shared channel (PDSCH) of at least one of remaining minimum system information (RMSI) or other system information (OSI), on the same frequency layer where the SS/PBCH block is received, and an SS/PBCH block operated in a standalone mode refers to that a UE expects to receive PDCCH/PDSCH of both RMSI and OSI on the same frequency layer where the SS/PBCH block is received.

In new radio (NR), multiple numerologies are supported, for SS/PBCH block and data transmission separately, and also for different carrier frequency ranges below 52.6 GHz. A summary of the supported numerologies is given by TABLE 1.

TABLE 1

Numerologies

| Subcarrier spacing (kHz) | Cyclic prefix | Supported for data | Supported for SS/PBCH block |
|---|---|---|---|
| 15 | Normal | Yes | Yes |
| 30 | Normal | Yes | Yes |
| 60 | Normal, Extended | Yes | No |
| 120 | Normal | Yes | Yes |
| 240 | Normal | No | Yes |

Figure 10:
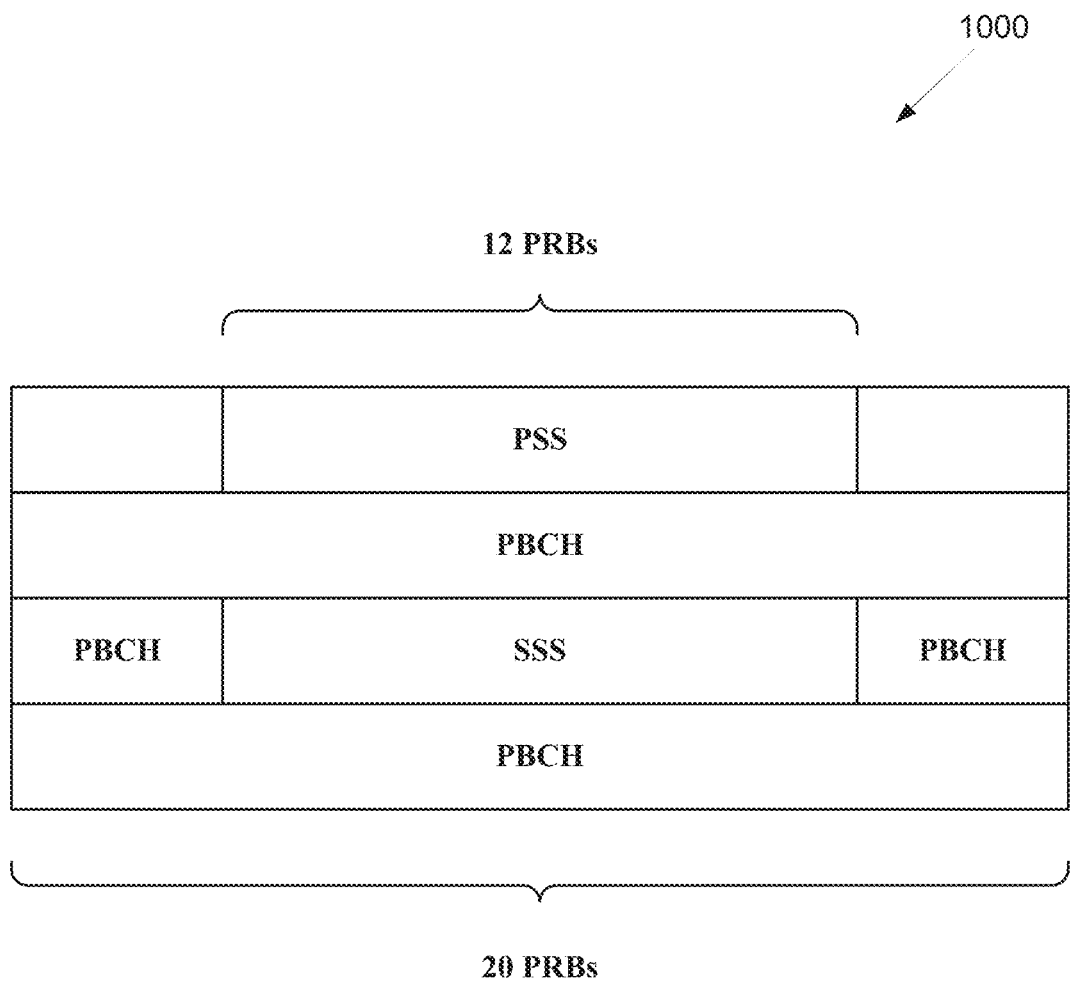
FIG. 10 illustrates an example OFDM symbol according to embodiments of the present disclosure.

FIG. 10 illustrates an example OFDM symbol 1000 according to embodiments of the present disclosure. The embodiment of the OFDM symbol 1000 illustrated in FIG. 10 is for illustration only. FIG. 10 does not limit the scope of this disclosure to any particular implementation.

In NR, each synchronization signal (SS) and physical broadcast channel (PBCH) block compromise of four consecutive orthogonal frequency division multiplexing (OFDM) symbols (e.g. FIG. 10) wherein the first symbol is mapped for primary synchronization signal (PSS), the second and forth symbols are mapped for PBCH, and the third symbol is mapped for both secondary synchronization signal (SSS) and PBCH. The same SS/PBCH composition is applied to all supported carrier frequency ranges in NR, which spans from 0 GHz to 52.6 GHz. The transmission bandwidth of PSS and SSS (e.g. 12 physical resource blocks (PRBs)) is smaller than the transmission bandwidth of the whole SS/PBCH block (e.g. 20 PRBs). In every PRB mapped for PBCH, 3 out of the 12 resource elements (REs) are mapped for the demodulation reference signal (DMRS) of PBCH, wherein the 3 REs are uniformly distributed in the PRB and the starting location of the first RE is based on cell ID.

NR supports one or two subcarrier spacing (SCS) for SS/PBCH block, for a given band, wherein the same SCS is utilized for PSS, SSS, and PBCH (including DMRS). For carrier frequency range 0 GHz to 6 GHz, 15 kHz and/or 30 kHz can be utilized for the SS SCS. For carrier frequency range 6 GHz to 52.6 GHz, 120 kHz and/or 240 kHz can be utilized for SS SCS.

Figure 11:
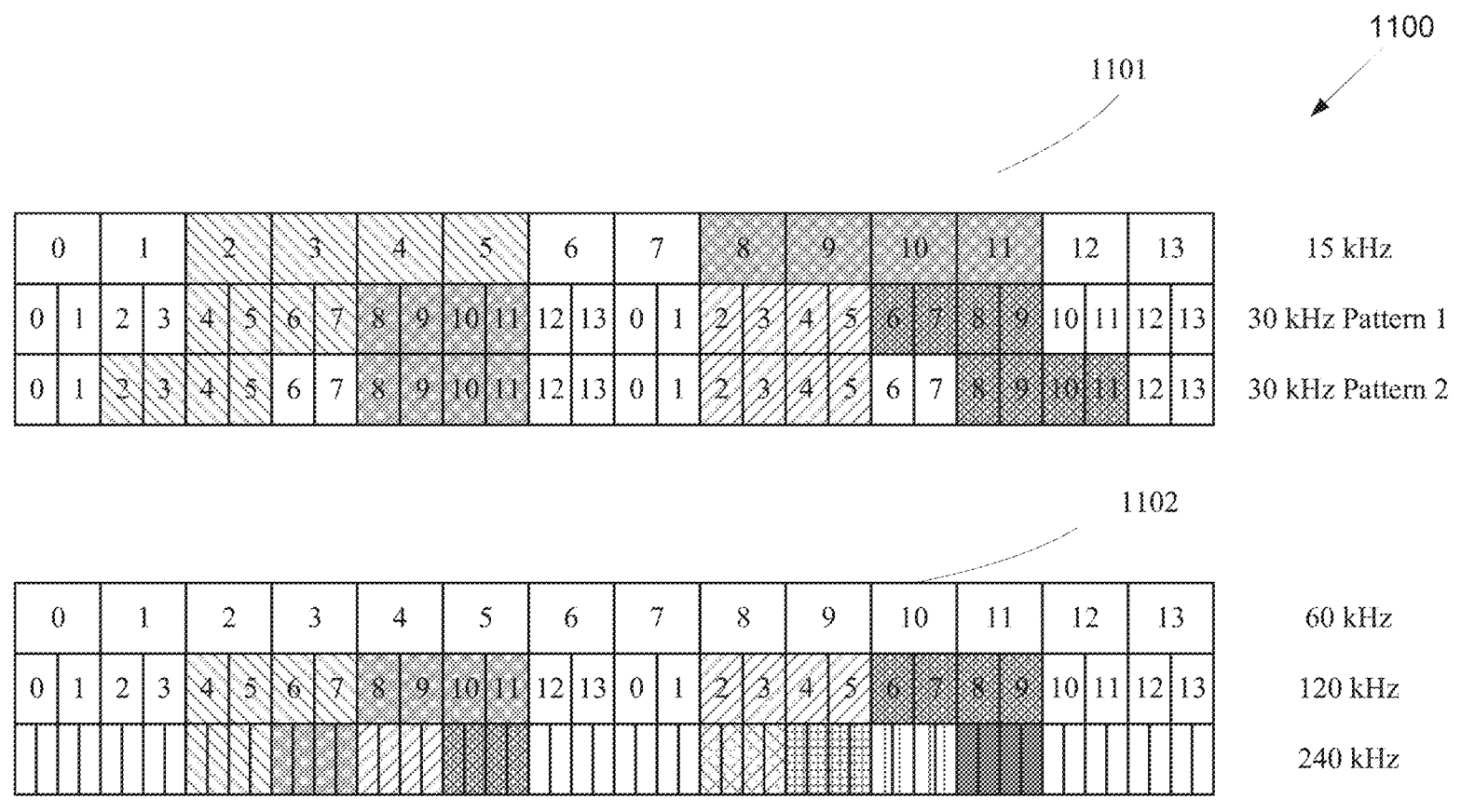

FIG. 11 illustrates an example SS/PBCH mapping pattern 1100 according to embodiments of the present disclosure. The embodiment of the SS/PBCH mapping pattern 1100 illustrated in FIG. 11 is for illustration only. FIG. 11 does not limit the scope of this disclosure to any particular implementation.

In NR, SS/PBCH blocks are transmitted in a beam-sweeping way, and multiple candidate location for transmitting SS/PBCH blocks are predefined within a unit of a half frame. The mapping pattern of SS/PBCH blocks to 1 slot with respect to 15 kHz as the reference SCS for sub6 GHz and with respect to 60 kHz as the reference SCS for above 6 GHz are illustrated in 1101 and 1102 as illustrated in FIG. 11, respectively. Two mapping patterns are designed for 30 kHz SS SCS: Pattern 1 is utilized for non-LTE-NR coexistence bands, and Pattern 2 is utilized for LTE-NR coexistence bands.

Figure 12:
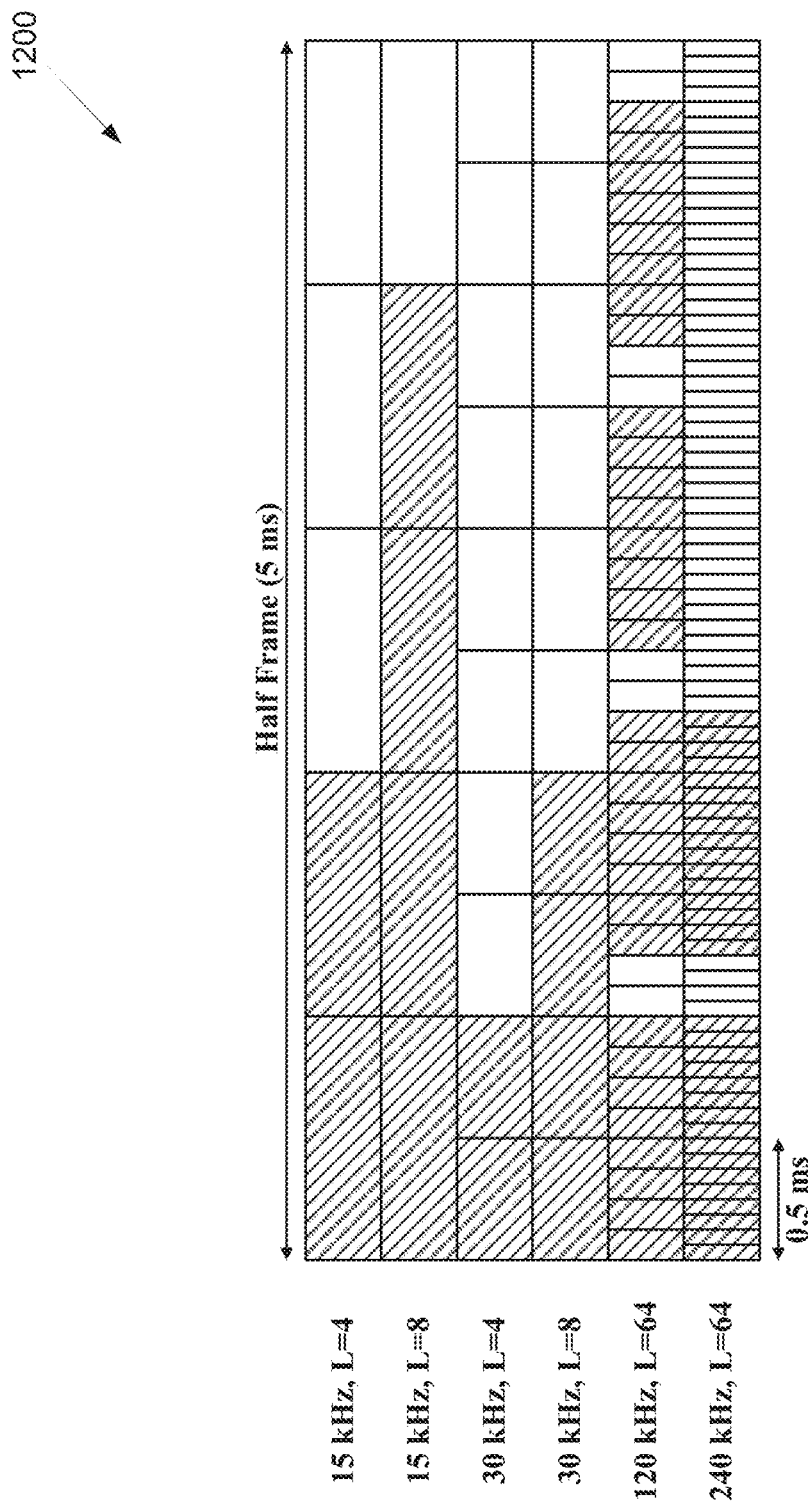
FIG. 12 illustrates an example a number of SS/PBCH blocks according to embodiments of the present disclosure.

FIG. 12 illustrates an example a number of SS/PBCH blocks 1200 according to embodiments of the present disclosure. The embodiment of the number of SS/PBCH blocks 1200 illustrated in FIG. 12 is for illustration only. FIG. 12 does not limit the scope of this disclosure to any particular implementation.

The maximum number of SS/PBCH blocks, denoted as L, is determined based on carrier frequency range: for carrier frequency range 0 GHz to 3 GHz, L is 4; for carrier frequency range 3 GHz to 6 GHz, L is 8; for carrier frequency range 6 GHz to 52.6 GHz, L is 64. The determination of the slots within the half frame unit which contains the candidate locations of SS/PBCH blocks, with respect to each combination of SS SCS and L, is illustrated in FIG. 12.

In an initial cell selection, a UE assumes a default SS burst set periodicity as 20 ms, and for detecting non-standalone NR cell, a network provides one SS burst set periodicity information per frequency carrier to the UE and information to derive measurement timing/duration if possible.

In NR, the SCS of the control resource set (CORESET) of remaining minimum system information (RMSI) and the associated physical downlink shared channel (PDSCH) conveying RMSI are indicated in master information block (MIB) conveyed by PBCH in the SS/PBCH block, which can be same as or different from SCS of SS. For carrier frequency range 0 GHz to 6 GHz, the candidate SCSs for the CORESET of RMSI and the PDSCH conveying RMSI are 15 kHz and 30 kHz; for carrier frequency range 6 GHz to 52.6 GHz, the candidate SCSs for the CORESET of RMSI and the PDSCH conveying RMSI are 60 kHz and 120 kHz.

Figure 13A:
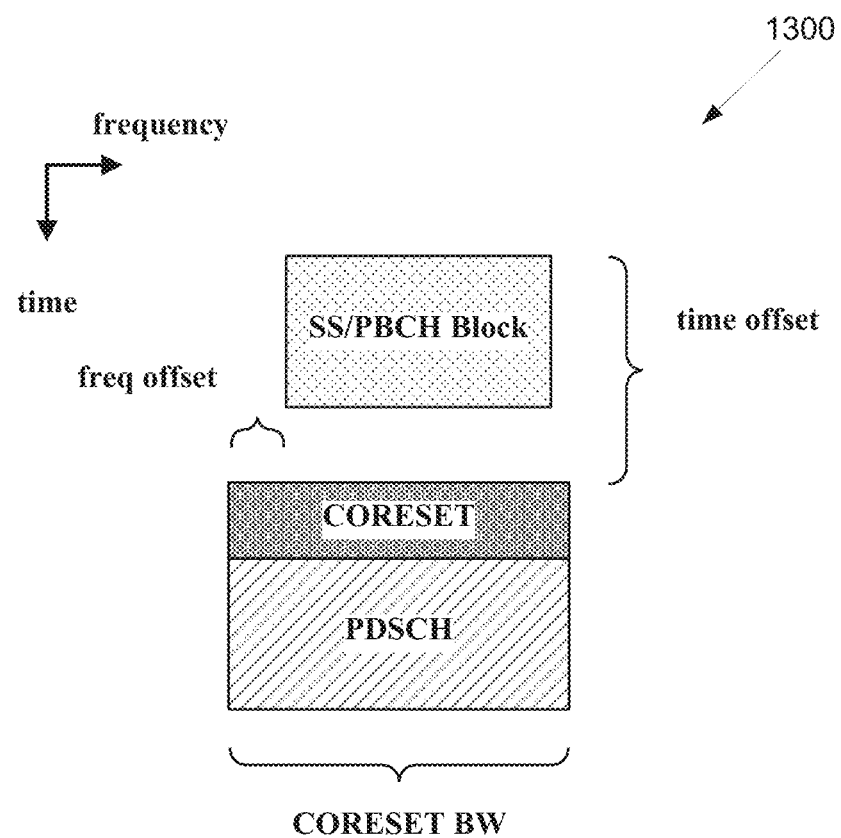
FIG. 13A illustrates an example a multiplexing pattern of SS/PBCH block according to embodiments of the present disclosure.

FIG. 13A illustrates an example a multiplexing pattern of SS/PBCH block 1300 according to embodiments of the present disclosure. The embodiment of the multiplexing pattern of SS/PBCH block 1300 illustrated in FIG. 13A is for illustration only. FIG. 13A does not limit the scope of this disclosure to any particular implementation.

Figure 13B:
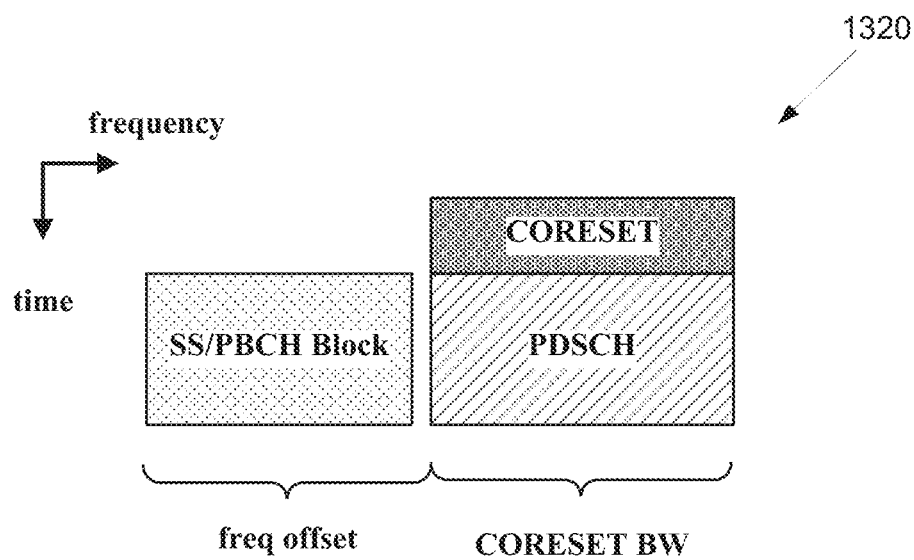
FIG. 13B illustrates another example a multiplexing pattern of SS/PBCH block according to embodiments of the present disclosure.

FIG. 13B illustrates another example a multiplexing pattern of SS/PBCH block 1320 according to embodiments of the present disclosure. The embodiment of the multiplexing pattern of SS/PBCH block 1320 illustrated in FIG. 13B is for illustration only. FIG. 13B does not limit the scope of this disclosure to any particular implementation.

Figure 13C:
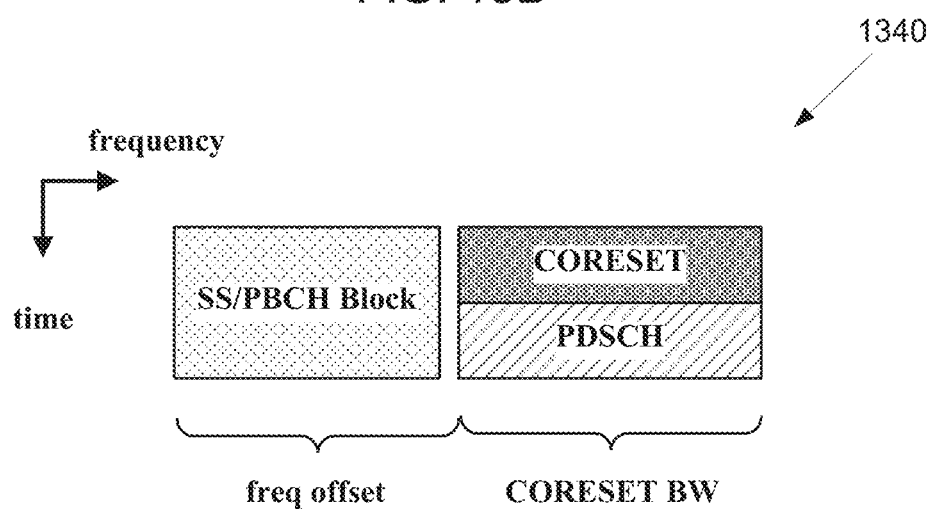
FIG. 13C illustrates yet another example a multiplexing pattern of SS/PBCH block according to embodiments of the present disclosure.

FIG. 13C illustrates yet another example a multiplexing pattern of SS/PBCH block 1340 according to embodiments of the present disclosure. The embodiment of the multiplexing pattern of SS/PBCH block 1340 illustrated in FIG. 13C is for illustration only. FIG. 13C does not limit the scope of this disclosure to any particular implementation.

A cell-defining SS/PBCH block is located on the synchronization raster. The CORESET of RMSI can have a RB-level offset comparing to the associated cell-defining SS/PBCH block, wherein the PRB-level offset is jointly coded with multiplexing pattern, CORESET bandwidth (BW), and the number of OFDM symbols of the CORESET, and indicated by MIB. Moreover, the parameters for monitor window of common search space in the CORESET of RMSI are also jointly coded and indicated by MIB, wherein the parameters are configured separately for each multiplexing pattern. An illustration of the three supported multiplexing patterns of SS/PBCH block and CORESET and PDSCH of RMSI are illustrated in FIG. 13A, FIG. 13B, and FIG. 13C, respectively.

The present disclosure focuses on supporting larger SCS for higher carrier frequency range in NR (e.g. above 52.6 GHz), and the related design aspects may at least include the following: maximum number of SS/PBCH blocks; mapping pattern of SS/PBCH blocks within a half frame; PRACH format with larger SCS; common subcarrier spacing indication in PBCH; SS/PBCH block index indication; subcarrier offset indication in PBCH; CORESET configuration indication in PBCH; and/or search space configuration indication in PBCH.

In NR, for carrier frequency range 0 GHz to 3 GHz, the maximum number of SS/PBCH block within a burst set is 4, where the candidate SCS for SS/PBCH block can be 15 kHz, and can also be 30 kHz only for the NR-LTE coexistence bands (e.g. n5 and n66); for carrier frequency range 3 GHz to 6 GHz, the maximum number of SS/PBCH block within a burst set is 8, where the candidate SCS for SS/PBCH block can be 15 kHz or 30 kHz; for carrier frequency range 6 GHz to 52.6 GHz, the maximum number of SS/PBCH block within a burst set is 64, where the candidate SCS for SS/PBCH block can be 120 kHz or 240 kHz.

In one embodiment, for NR HFR, the choice of SCS for SS/PBCH block can be determined by guaranteeing the performance against carrier frequency offset (CFO) (e.g. maximum 5 ppm) in an initial cell search, and the maximum number of SS/PBCH block within a burst set can be determined by maintaining similar time-domain overhead ratio within a half frame as the ones already supported in other NR carrier frequency ranges, for the determined SCS for SS/PBCH block. One example of this embodiment is illustrated in TABLE 2, where the maximum number of SS/PBCH blocks is determined as 128 and the maximum SCS for SS/PBCH block is determined as 480 kHz, and/or the maximum number of SS/PBCH block is determined as 256 and the maximum SCS of SS/PBCH block is determined as 960 kHz.

In one sub-embodiment, dual SCSs for SS/PBCH block can be supported for a given HFR band, and the UE may need to blindly detect the SCS in initial cell search, wherein the dual SCSs can be 240 kHz and 480 kHz.

In another sub-embodiment, dual SCSs for SS/PBCH block can be supported for a given HFR band, and the UE may need to blindly detect the SCS in initial cell search, wherein the dual SCSs can be 480 kHz and 960 kHz.

In yet another sub-embodiment, single SCS for SS/PBCH block can be supported for a given HFR band, wherein the single SCS can be either 240 kHz or 480 kHz.

In yet another sub-embodiment, single SCS for SS/PBCH block can be supported for a given HFR band, wherein the single SCS can be either 480 kHz or 960 kHz.

TABLE 2

| Carrier frequency range | | | | |
| --- | --- | --- | --- | --- |
| Carrier Frequency Range | Maximum # of SS/PBCH Blocks | Max SCS for SS/PBCH | Max CFO | Time-domain Ratio* |
| 0-3 GHz | 4 | 15 kHz** | 15 kHz | 22.8% |
| 3-6 GHz | 8 | 30 kHz | 30 kHz | 22.8% |
| 6-52.6 GHz | 64 | 240 kHz | 263 kHz | 22.8% |
| 52.6-100 GHz | 128 | 480 kHz | 500 kHz | 22.8% |
| | 256 | 960 kHz | 500 kHz | 22.8% |

*Time-domain ratio is defined as the duration of transmitting all SS/PBCH blocks within a burst set divided by a half frame
**30 kHz for 0-3 GHz is only applied to coexistence bands, and SS/PBCH block exceeds min carrier bandwidth of 5 MHz In another embodiment, for NR HFR, the choice of SCS for SS/PBCH block can be determined by guaranteeing the performance against carrier frequency offset (CFO) (e.g. maximum 5 ppm) in an initial cell search, but the maximum number of SS/PBCH blocks maintains the same as carrier frequency range 6-52.6 GHz (i.e., NR FR2). For example, the maximum number of SS/PBCH blocks is determined as 64 and the maximum SCS for SS/PBCH block can be 480 kHz or 960 kHz.

In one sub-embodiment, dual SCSs for SS/PBCH block can be supported for a given HFR band, and the UE may need to blindly detect the SCS in initial cell search, wherein the dual SCSs can be 240 kHz and 480 kHz.

In another sub-embodiment, dual SCSs for SS/PBCH block can be supported for a given HFR band, and the UE may need to blindly detect the SCS in initial cell search, wherein the dual SCSs can be 480 kHz and 960 kHz.

In yet another sub-embodiment, single SCS for SS/PBCH block can be supported for a given HFR band, wherein the single SCS can be either 240 kHz or 480 kHz.

In yet another sub-embodiment, single SCS for SS/PBCH block can be supported for a given HFR band, wherein the single SCS can be either 480 kHz or 960 kHz.

In yet another embodiment, for NR HFR, the choice of SCS for SS/PBCH block can be determined by guaranteeing the performance against carrier frequency offset (CFO) (e.g. maximum 5 ppm) in an initial cell search, but the maximum number of SS/PBCH blocks is higher than NR FR2. For example, the maximum number of SS/PBCH blocks is determined as 128 and the maximum SCS for SS/PBCH block can be 480 kHz or 960 kHz.

In one sub-embodiment, dual SCSs for SS/PBCH block can be supported for a given HFR band, and the UE may need to blindly detect the SCS in initial cell search, wherein the dual SCSs can be 240 kHz and 480 kHz.

In another sub-embodiment, dual SCSs for SS/PBCH block can be supported for a given HFR band, and the UE may need to blindly detect the SCS in an initial cell search, wherein the dual SCSs can be 480 kHz and 960 kHz.

In yet another sub-embodiment, single SCS for SS/PBCH block can be supported for a given HFR band, wherein the single SCS can be either 240 kHz or 480 kHz.

In yet another sub-embodiment, single SCS for SS/PBCH block can be supported for a given HFR band, wherein the single SCS can be either 480 kHz or 960 kHz.

In one embodiment, if the maximum number of SS/PBCH blocks is 128, the indication of actual transmitted SS/PBCH blocks in RMSI, e.g. higher layer parameter SSB-transmitted-SIB1, can be still a 2-level bitmap.

In one example, the 2-level bitmap is with 8 group bitmap and 16 bitmap within each group, such that the size of RRC parameter SSB-transmitted-SIB1 is 24 bits.

In another example, the 2-level bitmap is with 16 group bitmap and 8 bitmap within each group, such that the size of RRC parameter SSB-transmitted-SIB1 is 24 bits.

In another embodiment, if the maximum number of SS/PBCH blocks is 128, the indication of actual transmitted SS/PBCH blocks in RMSI, e.g., a higher layer parameter SSB-transmitted-SIB1, can be still with 16 bits (e.g. same as NR FR2), but interpreted as other meaning.

In one example, the 16 bits indicate the starting and ending position of the window wherein actually transmitted SS/PBCH blocks are within the window, and 8 bits of the 16 bits are used for the starting position, and the remaining 8 bits are used for the ending position.

In another example, the 16 bits indicate the starting position and duration of the window wherein actually transmitted SS/PBCH blocks are within the window, and 8 bits of the 16 bits are used for the starting position, and the remaining 8 bits are used for the duration.

In one embodiment, if the maximum number of SS/PBCH blocks is 128, the indication of actual transmitted SS/PBCH blocks in RRC, e.g., a higher layer parameter SSB-transmitted, can be a 128-bit full bitmap.

The mapping pattern of SS/PBCH blocks can be designed with respect to a reference SCS (e.g., the reference SCS can be utilized for data transmission) such that the symbols mapped for control channels (e.g. PDCCH and/or PUCCH) and/or gap can be reserved (e.g., not mapped for SS/PBCH blocks) with respect to the reference SCS.

Figure 14:
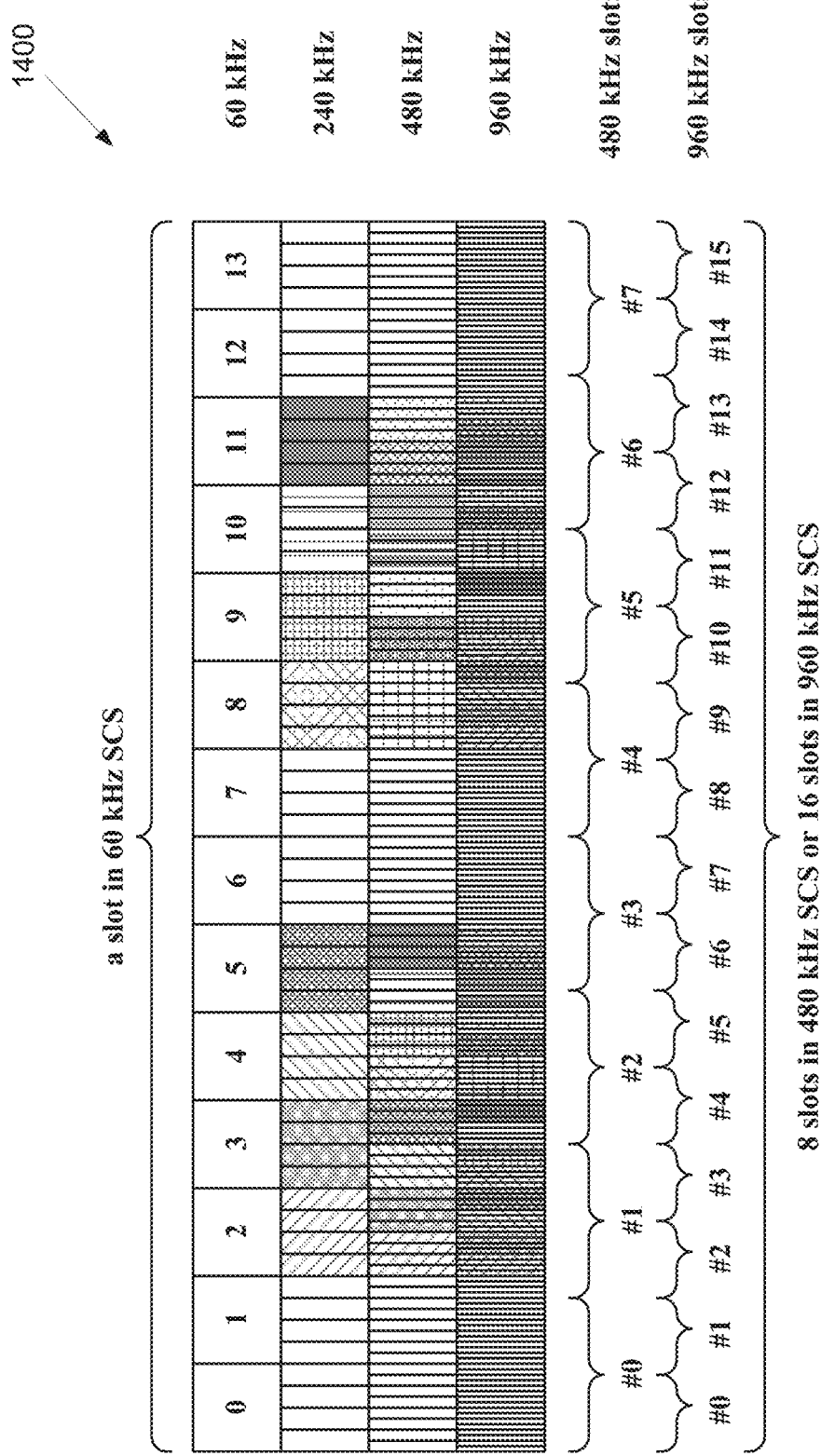
FIG. 14 illustrates an example mapping design according to embodiments of the present disclosure.

FIG. 14 illustrates an example mapping design 1400 according to embodiments of the present disclosure. The embodiment of the mapping design 1400 illustrated in FIG. 14 is for illustration only. FIG. 14 does not limit the scope of this disclosure to any particular implementation.

In one embodiment, if using 60 kHz as the reference SCS to design the mapping pattern of SS/PBCH blocks, the first two symbols (e.g. #0 and #1) as well the last two symbols (e.g., #12 and #13) with respect to the reference SCS of 60 kHz can be reserved.

An example of this mapping design is illustrated in FIG. 14, and mapping patterns are determined by: for SCS of SS/PBCH block being 240 kHz, the first symbols of the candidate SS/PBCH blocks have indexes {8, 12, 16, 20, 32, 36, 40, 44} within every design unit of 56 symbols (e.g. 4 slots with total duration of 0.25 ms); for SCS of SS/PBCH block being 480 kHz, the first symbols of the candidate SS/PBCH blocks have indexes {16, 20, 24, 28, 32, 36, 40, 44, 64, 68, 72, 76, 80, 84, 88, 92} within every design unit of 112 symbols (e.g. 8 slots with total duration of 0.25 ms); and for SCS of SS/PBCH block being 960 kHz, the first symbols of the candidate SS/PBCH blocks have indexes {32, 36, 40, 44, 48, 52, 56, 60, 64, 68, 72, 76, 80, 84, 88, 92, 128, 132, 136, 140, 144, 148, 152, 156, 160, 164, 168, 172, 176, 180, 184, 188} within every design unit of 224 symbols (e.g. 16 slots with total duration of 0.25 ms).

Figure 15:
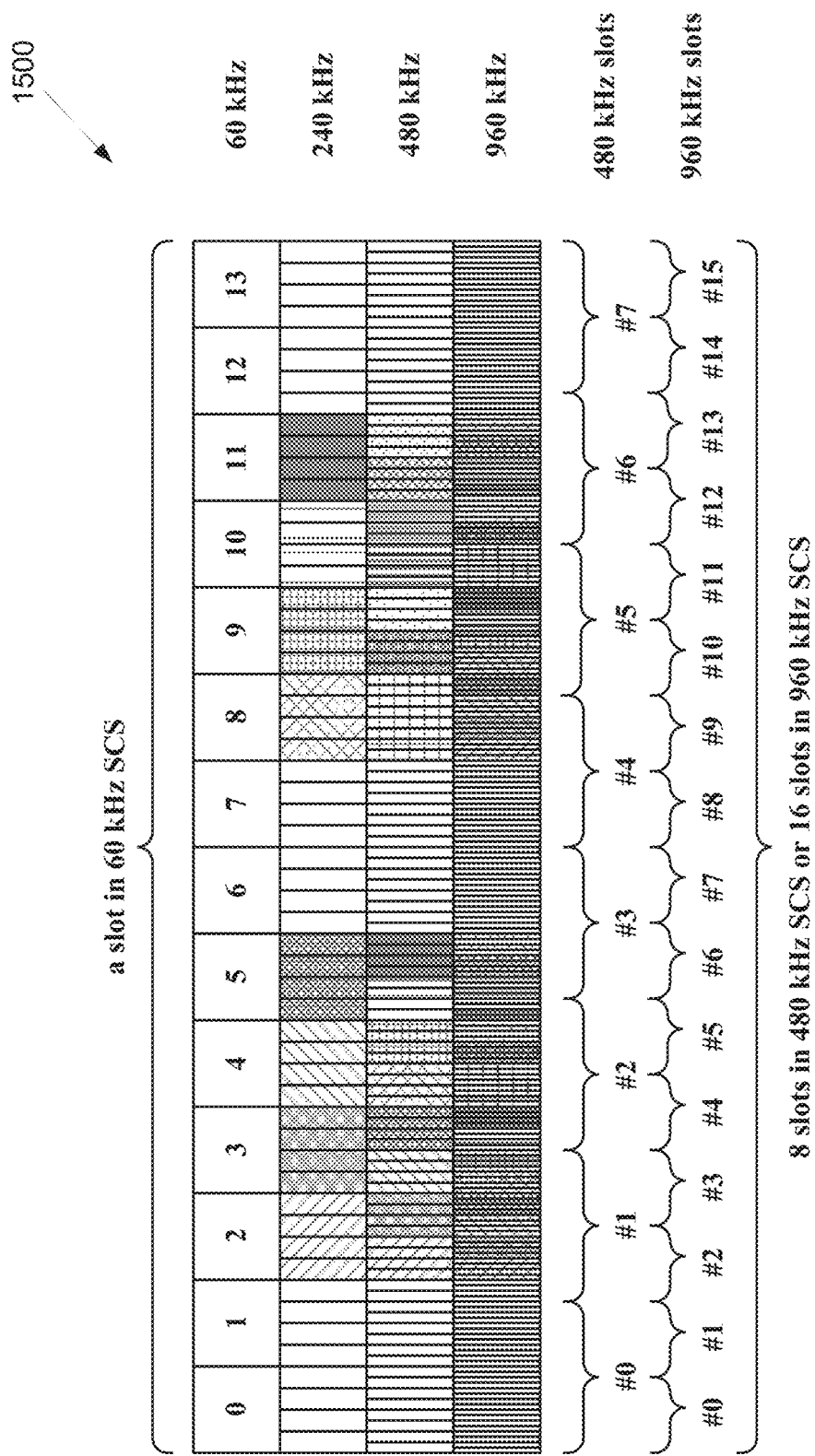
FIG. 15 illustrates another example mapping design according to embodiments of the present disclosure.

FIG. 15 illustrates another example mapping design 1500 according to embodiments of the present disclosure. The embodiment of the mapping design 1500 illustrated in FIG. 15 is for illustration only. FIG. 15 does not limit the scope of this disclosure to any particular implementation.

The mapping of the design unit, 0.25 ms as a slot of 60 kHz SCS as the reference SCS, into the half frame can be determined as in FIG. 15 (L is maximum number of SS/PBCH blocks in the figure), wherein the indexes of the design unit that contains the mapping pattern given by FIG. 14 are given by: for SCS of SS/PBCH block being 240 kHz and maximum number of SS/PBCH blocks being 64, the indexes of design units of 0.25 ms a with a half frame are given by {0, 1, 2, 3, 5, 6, 7, 8}; for SCS of SS/PBCH block being 240 kHz and maximum number of SS/PBCH blocks being 128, the indexes of design units of 0.25 ms with a half frame are given by {0, 1, 2, 3, 5, 6, 7, 8, 10, 11, 12, 13, 15, 16, 17, 18}; for SCS of SS/PBCH block being 480 kHz and maximum number of SS/PBCH blocks being 64, the indexes of design units of 0.25 ms with a half frame are given by {0, 1, 2, 3}; for SCS of SS/PBCH block being 480 kHz and maximum number of SS/PBCH blocks being 128, the indexes of design units of 0.25 ms with a half frame are given by {0, 1, 2, 3, 5, 6, 7, 8}; for SCS of SS/PBCH block being 960 kHz and maximum number of SS/PBCH blocks being 64, the indexes of design units of 0.25 ms with a half frame are given by {0, 1}; for SCS of SS/PBCH block being 960 kHz and maximum number of SS/PBCH blocks being 128, the indexes of design units of 0.25 ms with a half frame are given by {0, 1, 2, 3}; and/or for SCS of SS/PBCH block being 960 kHz and maximum number of SS/PBCH blocks being 256, the indexes of design units of 0.25 ms with a half frame are given by {0, 1, 2, 3, 5, 6, 7, 8}.

In some embodiments, the following mapping patterns for SS/PBCH blocks can be obtained (symbol index 0 is the symbol 0 of the first slot of the half frame).

In one example, for NR HFR, if dual SCSs of SS/PBCH blocks are supported for a given HFR band, wherein the SCSs can be 240 kHz and 480 kHz, and the maximum number of SS/PBCH blocks is 128 within a burst set, the first symbols of the 128 candidate SS/PBCH blocks within a half frame can have indexes: for SCS of SS/PBCH blocks being 240 kHz, {8, 12, 16, 20, 32, 36, 40, 44}+56*N_unit^240 kHz, where N_unit^240 kHz=0, 1, 2, 3, 5, 6, 7, 8, 10, 11, 12, 13, 15, 16, 17, 18; and/or for SCS of SS/PBCH blocks being 480 kHz, {16, 20, 24, 28, 32, 36, 40, 44, 64, 68, 72, 76, 80, 84, 88, 92}+112*N_unit^480 kHz, where N_unit^480 kHz=0, 1, 2, 3, 5, 6, 7, 8.

In one example, for NR HFR, if dual SCSs of SS/PBCH blocks are supported for a given HFR band, wherein the SCSs can be 480 kHz and 960 kHz, and the maximum number of SS/PBCH blocks is 128 within a burst set, the first symbols of the 128 candidate SS/PBCH blocks within a half frame can have indexes: for SCS of SS/PBCH blocks being 480 kHz, {16, 20, 24, 28, 32, 36, 40, 44, 64, 68, 72, 76, 80, 84, 88, 92}+112*N_unit^480 kHz, where N_unit^480 kHz=0, 1, 2, 3, 5, 6, 7, 8; and/or for SCS of SS/PBCH blocks being 960 kHz, {32, 36, 40, 44, 48, 52, 56, 60, 64, 68, 72, 76, 80, 84, 88, 92, 128, 132, 136, 140, 144, 148, 152, 156, 160, 164, 168, 172, 176, 180, 184, 188}+224*N_unit^960 kHz, where N_unit^960 kHz=0, 1, 2, 3.

In one example, for NR HFR, if a single SCS of SS/PBCH blocks is supported for a given HFR band, wherein the SCS can be either 240 kHz or 480 kHz or 960 kHz, and the maximum number of SS/PBCH blocks is 128 within a burst set, the first symbols of the 128 candidate SS/PBCH blocks within a half frame can have indexes: for SCS of SS/PBCH blocks being 240 kHz, {8, 12, 16, 20, 32, 36, 40, 44}+56*N_unit^240 kHz, where N_unit^240 kHz=0, 1, 2, 3, 5, 6, 7, 8, 10, 11, 12, 13, 15, 16, 17, 18; for SCS of SS/PBCH blocks being 480 kHz, {16, 20, 24, 28, 32, 36, 40, 44, 64, 68, 72, 76, 80, 84, 88, 92}+112*N_unit^480 kHz, where N_unit^480 kHz=0, 1, 2, 3, 5, 6, 7, 8; and/or for SCS of SS/PBCH blocks being 960 kHz, {32, 36, 40, 44, 48, 52, 56, 60, 64, 68, 72, 76, 80, 84, 88, 92, 128, 132, 136, 140, 144, 148, 152, 156, 160, 164, 168, 172, 176, 180, 184, 188}+224*N_unit^960 kHz, where N_unit^960 kHz=0, 1, 2, 3.

In one example, for NR HFR, if a single SCS of SS/PBCH blocks is supported for a given HFR band, wherein the SCS can be 960 kHz, and the maximum number of SS/PBCH blocks is 256 within a burst set, the first symbols of the 256 candidate SS/PBCH blocks within a half frame can have indexes: for SCS of SS/PBCH blocks being 960 kHz, {32, 36, 40, 44, 48, 52, 56, 60, 64, 68, 72, 76, 80, 84, 88, 92, 128, 132, 136, 140, 144, 148, 152, 156, 160, 164, 168, 172, 176, 180, 184, 188}+224*N_unit^960 kHz, where N_unit^960 kHz=0, 1, 2, 3, 5, 6, 7, 8.

In one example, for NR HFR, if dual SCSs of SS/PBCH blocks are supported for a given HFR band, wherein the SCSs can be 240 kHz and 480 kHz, and the maximum number of SS/PBCH blocks is 64 within a burst set, the first symbols of the 64 candidate SS/PBCH blocks within a half frame can have indexes: for SCS of SS/PBCH blocks being 240 kHz, {8, 12, 16, 20, 32, 36, 40, 44}+56*N_unit^240 kHz, where N_unit^240 kHz=0, 1, 2, 3, 5, 6, 7, 8; and/or for SCS of SS/PBCH blocks being 480 kHz, {16, 20, 24, 28, 32, 36, 40, 44, 64, 68, 72, 76, 80, 84, 88, 92}+112*N_unit^480 kHz, where N_unit^480 kHz=0, 1, 2, 3.

In one example, for NR HFR, if dual SCSs of SS/PBCH blocks are supported for a given HFR band, wherein the SCSs can be 480 kHz and 960 kHz, and the maximum number of SS/PBCH blocks is 64 within a burst set, the first symbols of the 64 candidate SS/PBCH blocks within a half frame can have indexes: for SCS of SS/PBCH blocks being 480 kHz, {16, 20, 24, 28, 32, 36, 40, 44, 64, 68, 72, 76, 80, 84, 88, 92}+112*N_unit^480 kHz, where N_unit^480 kHz=0, 1, 2, 3; and/or for SCS of SS/PBCH blocks being 960 kHz, {32, 36, 40, 44, 48, 52, 56, 60, 64, 68, 72, 76, 80, 84, 88, 92, 128, 132, 136, 140, 144, 148, 152, 156, 160, 164, 168, 172, 176, 180, 184, 188}+224*N_unit^960 kHz, where N_unit^960 kHz=0, 1.

In one example, for NR HFR, if a single SCS of SS/PBCH blocks is supported for a given HFR band, wherein the SCS can be either 240 kHz or 480 kHz or 960 kHz, and the maximum number of SS/PBCH blocks is 64 within a burst set, the first symbols of the 64 candidate SS/PBCH blocks within a half frame can have indexes: for SCS of SS/PBCH blocks being 240 kHz, {8, 12, 16, 20, 32, 36, 40, 44}+56*N_unit^240 kHz, where N_unit^240 kHz=0, 1, 2, 3, 5, 6, 7, 8; for SCS of SS/PBCH blocks being 480 kHz, {16, 20, 24, 28, 32, 36, 40, 44, 64, 68, 72, 76, 80, 84, 88, 92}+112*N_unit^480 kHz, where N_unit^480 kHz=0, 1, 2, 3; and/or for SCS of SS/PBCH blocks being 960 kHz, {32, 36, 40, 44, 48, 52, 56, 60, 64, 68, 72, 76, 80, 84, 88, 92, 128, 132, 136, 140, 144, 148, 152, 156, 160, 164, 168, 172, 176, 180, 184, 188}+224*N_unit^960 kHz, where N_unit^960 kHz=0, 1.

Figure 16:
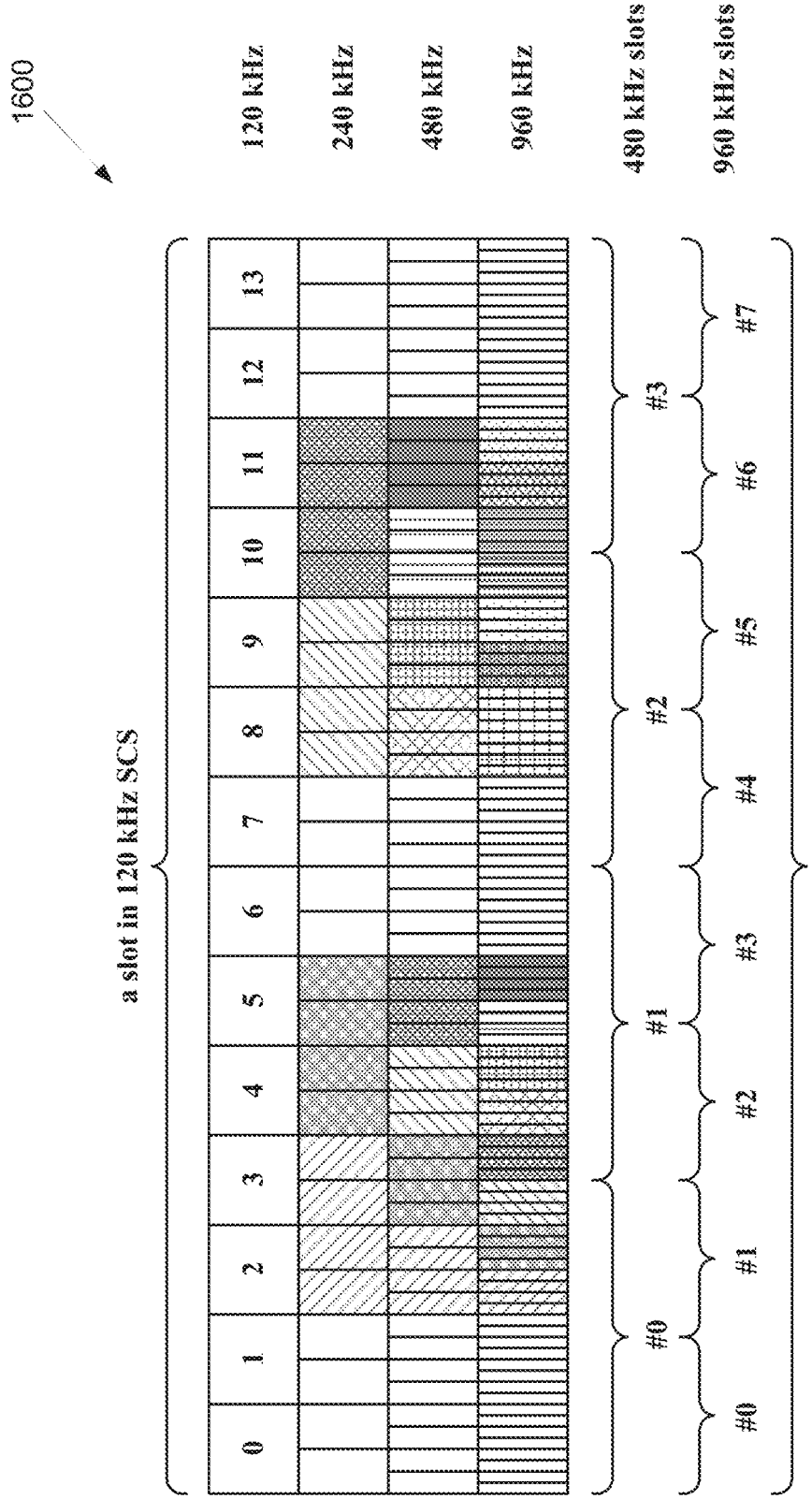
FIG. 16 illustrates yet another example mapping design according to embodiments of the present disclosure.

FIG. 16 illustrates yet another example mapping design 1600 according to embodiments of the present disclosure. The embodiment of the mapping design 1600 illustrated in FIG. 16 is for illustration only. FIG. 16 does not limit the scope of this disclosure to any particular implementation.

In another embodiment, if using 120 kHz as the reference SCS to design the mapping pattern of SS/PBCH blocks, the first two symbols (e.g. #0 and #1) as well the last two symbols (e.g. #12 and #13) with respect to the reference SCS of 120 kHz can be reserved. An example of this mapping design is illustrated in FIG. 16, and mapping patterns are determined by: for SCS of SS/PBCH block being 240 kHz, the first symbols of the candidate SS/PBCH blocks have indexes {4, 8, 16, 20} within every design unit of 28 symbols (e.g. 2 slots with total duration of 0.125 ms); for SCS of SS/PBCH block being 480 kHz, the first symbols of the candidate SS/PBCH blocks have indexes {8, 12, 16, 20, 32, 36, 40, 44} within every design unit of 56 symbols (e.g. 4 slots with total duration of 0.125 ms); and/or for SCS of SS/PBCH block being 480 kHz, the first symbols of the candidate SS/PBCH blocks have indexes {16, 20, 24, 28, 32, 36, 40, 44, 64, 68, 72, 76, 80, 84, 88, 92} within every design unit of 112 symbols (e.g. 8 slots with total duration of 0.125 ms).

Figure 17:
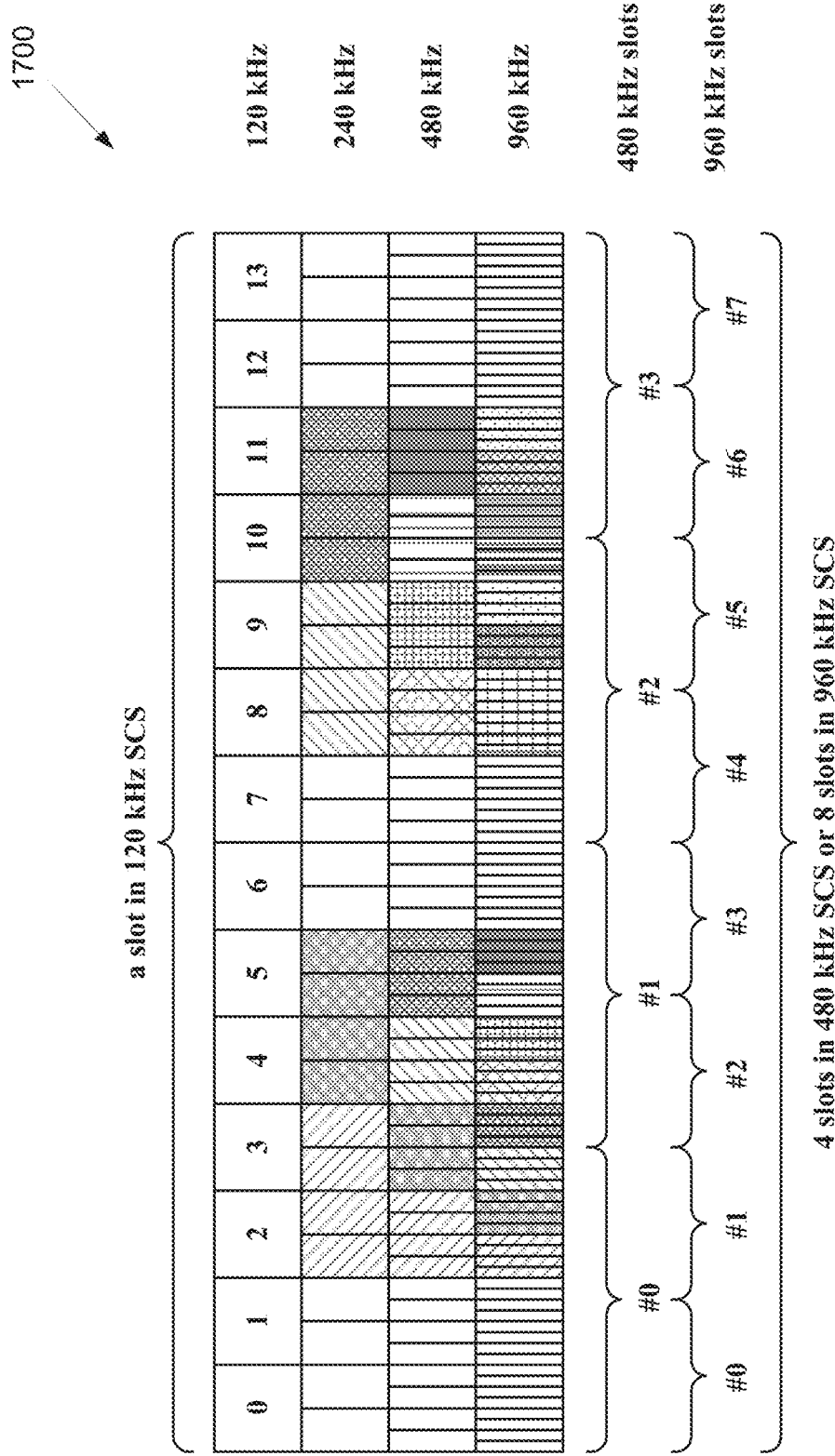
FIG. 17 illustrates yet another example mapping design according to embodiments of the present disclosure.

FIG. 17 illustrates yet another example mapping design 1700 according to embodiments of the present disclosure. The embodiment of the mapping design 1700 illustrated in FIG. 17 is for illustration only. FIG. 17 does not limit the scope of this disclosure to any particular implementation.

The mapping of the design unit, 0.125 ms as a slot of 120 kHz SCS as the reference SCS, into the half frame can be determined as in FIG. 17 (L is maximum number of SS/PBCH blocks in the figure), wherein the indexes of the design unit that contains the mapping pattern given by FIG. 16 are given by: for SCS of SS/PBCH block being 240 kHz and maximum number of SS/PBCH blocks being 64, the indexes of design units of 0.125 ms with a half frame are given by {0, 1, 2, 3, 4, 5, 6, 7, 10, 11, 12, 13, 14, 15, 16, 17}; for SCS of SS/PBCH block being 240 kHz and maximum number of SS/PBCH blocks being 128, the indexes of design units of 0.125 ms with a half frame are given by {0, 1, 2, 3, 4, 5, 6, 7, 10, 11, 12, 13, 14, 15, 16, 17, 20, 21, 22, 23, 24, 25, 26, 27, 30, 31, 32, 33, 34, 35, 36, 37}; for SCS of SS/PBCH block being 480 kHz and maximum number of SS/PBCH blocks being 64, the indexes of design units of 0.125 ms with a half frame are given by {0, 1, 2, 3, 4, 5, 6, 7}; for SCS of SS/PBCH block being 480 kHz and maximum number of SS/PBCH blocks being 128, the indexes of design units of 0.125 ms with a half frame are given by {0, 1, 2, 3, 4, 5, 6, 7, 10, 11, 12, 13, 14, 15, 16, 17}; for SCS of SS/PBCH block being 960 kHz and maximum number of SS/PBCH blocks being 64, the indexes of design units of 0.125 ms with a half frame are given by {0, 1, 2, 3}; for SCS of SS/PBCH block being 960 kHz and maximum number of SS/PBCH blocks being 128, the indexes of design units of 0.125 ms with a half frame are given by {0, 1, 2, 3, 4, 5, 6, 7}; and/or for SCS of SS/PBCH block being 960 kHz and maximum number of SS/PBCH blocks being 256, the indexes of design units of 0.125 ms with a half frame are given by {0, 1, 2, 3, 4, 5, 6, 7, 10, 11, 12, 13, 14, 15, 16, 17}.

In some embodiment, the following mapping patterns for SS/PBCH blocks can be obtained (symbol index 0 is the symbol 0 of the first slot of the half frame).

In one example, for NR HFR, if dual SCSs of SS/PBCH blocks are supported for a given HFR band, wherein the SCSs can be 240 kHz and 480 kHz, and the maximum number of SS/PBCH blocks is 128 within a burst set, the first symbols of the 128 candidate SS/PBCH blocks within a half frame can have indexes: for SCS of SS/PBCH blocks being 240 kHz, {4, 8, 16, 20}+28*N_unit^240 kHz, where N_unit^240 kHz=0, 1, 2, 3, 4, 5, 6, 7, 10, 11, 12, 13, 14, 15, 16, 17, 20, 21, 22, 23, 24, 25, 26, 27, 30, 31, 32, 33, 34, 35, 36, 37; and/or for SCS of SS/PBCH blocks being 480 kHz, {8, 12, 16, 20, 32, 36, 40, 44}+56*N_unit^480 kHz, where N_unit^480 kHz=0, 1, 2, 3, 4, 5, 6, 7, 10, 11, 12, 13, 14, 15, 16, 17.

In one example, for NR HFR, if dual SCSs of SS/PBCH blocks are supported for a given HFR band, wherein the SCSs can be 480 kHz and 960 kHz, and the maximum number of SS/PBCH blocks is 128 within a burst set, the first symbols of the 128 candidate SS/PBCH blocks within a half frame can have indexes: for SCS of SS/PBCH blocks being 480 kHz, {8, 12, 16, 20, 32, 36, 40, 44}+56*N_unit^480 kHz, where N_unit^480 kHz=0, 1, 2, 3, 4, 5, 6, 7, 10, 11, 12, 13, 14, 15, 16, 17; and/or for SCS of SS/PBCH blocks being 960 kHz, {16, 20, 24, 28, 32, 36, 40, 44, 64, 68, 72, 76, 80, 84, 88, 92}+112*N_unit^960 kHz, where N_unit^960 kHz=0, 1, 2, 3, 4, 5, 6, 7.

In one example, for NR HFR, if a single SCS of SS/PBCH blocks is supported for a given HFR band, wherein the SCS can be either 240 kHz or 480 kHz or 960 kHz, and the maximum number of SS/PBCH blocks is 128 within a burst set, the first symbols of the 128 candidate SS/PBCH blocks within a half frame can have indexes: for SCS of SS/PBCH blocks being 240 kHz, {4, 8, 16, 20}+28*N_unit^240 kHz, where N_unit^240 kHz=0, 1, 2, 3, 4, 5, 6, 7, 10, 11, 12, 13, 14, 15, 16, 17, 20, 21, 22, 23, 24, 25, 26, 27, 30, 31, 32, 33, 34, 35, 36, 37; for SCS of SS/PBCH blocks being 480 kHz, {8, 12, 16, 20, 32, 36, 40, 44}+56*N_unit^480 kHz, where N_unit^480 kHz=0, 1, 2, 3, 4, 5, 6, 7, 10, 11, 12, 13, 14, 15, 16, 17; and/or for SCS of SS/PBCH blocks being 960 kHz, {16, 20, 24, 28, 32, 36, 40, 44, 64, 68, 72, 76, 80, 84, 88, 92}+112*N_unit^960 kHz, where N_unit^960 kHz=0, 1, 2, 3, 4, 5, 6, 7.

In one example, for NR HFR, if a single SCS of SS/PBCH blocks is supported for a given HFR band, wherein the SCS can be 960 kHz, and the maximum number of SS/PBCH blocks is 256 within a burst set, the first symbols of the 256 candidate SS/PBCH blocks within a half frame can have indexes: for SCS of SS/PBCH blocks being 960 kHz, {16, 20, 24, 28, 32, 36, 40, 44, 64, 68, 72, 76, 80, 84, 88, 92}+112*N_unit^960 kHz, where N_unit^960 kHz=0, 1, 2, 3, 4, 5, 6, 7, 10, 11, 12, 13, 14, 15, 16, 17.

In one example, for NR HFR, if dual SCSs of SS/PBCH blocks are supported for a given HFR band, wherein the SCSs can be 240 kHz and 480 kHz, and the maximum number of SS/PBCH blocks is 64 within a burst set, the first symbols of the 64 candidate SS/PBCH blocks within a half frame can have indexes: for SCS of SS/PBCH blocks being 240 kHz, {4, 8, 16, 20}+28*N_unit^240 kHz, where N_unit^240 kHz=0, 1, 2, 3, 4, 5, 6, 7, 10, 11, 12, 13, 14, 15, 16, 17; and/or for SCS of SS/PBCH blocks being 480 kHz, {8, 12, 16, 20, 32, 36, 40, 44}+56*N_unit^480 kHz, where N_unit^480 kHz=0, 1, 2, 3, 4, 5, 6, 7.

In one example, for NR HFR, if dual SCSs of SS/PBCH blocks are supported for a given HFR band, wherein the SCSs can be 480 kHz and 960 kHz, and the maximum number of SS/PBCH blocks is 64 within a burst set, the first symbols of the 64 candidate SS/PBCH blocks within a half frame can have indexes: for SCS of SS/PBCH blocks being 480 kHz, {8, 12, 16, 20, 32, 36, 40, 44}+56*N_unit^480 kHz, where N_unit^480 kHz=0, 1, 2, 3, 4, 5, 6, 7; and/or for SCS of SS/PBCH blocks being 960 kHz, {16, 20, 24, 28, 32, 36, 40, 44, 64, 68, 72, 76, 80, 84, 88, 92}+112*N_unit^960 kHz, where N_unit^960 kHz=0, 1, 2, 3.

In one example, for NR HFR, if a single SCS of SS/PBCH blocks is supported for a given HFR band, wherein the SCS can be either 240 kHz or 480 kHz or 960 kHz, and the maximum number of SS/PBCH blocks is 64 within a burst set, the first symbols of the 64 candidate SS/PBCH blocks within a half frame can have indexes: for SCS of SS/PBCH blocks being 240 kHz, {4, 8, 16, 20}+28*N_unit^240 kHz, where N_unit^240 kHz=0, 1, 2, 3, 4, 5, 6, 7, 10, 11, 12, 13, 14, 15, 16, 17; for SCS of SS/PBCH blocks being 480 kHz, {8, 12, 16, 20, 32, 36, 40, 44}+56*N_unit^480 kHz, where N_unit^480 kHz=0, 1, 2, 3, 4, 5, 6, 7; and/or for SCS of SS/PBCH blocks being 960 kHz, {16, 20, 24, 28, 32, 36, 40, 44, 64, 68, 72, 76, 80, 84, 88, 92}+112*N_unit^960 kHz, where N_unit^960 kHz=0, 1, 2, 3.

Figure 18:
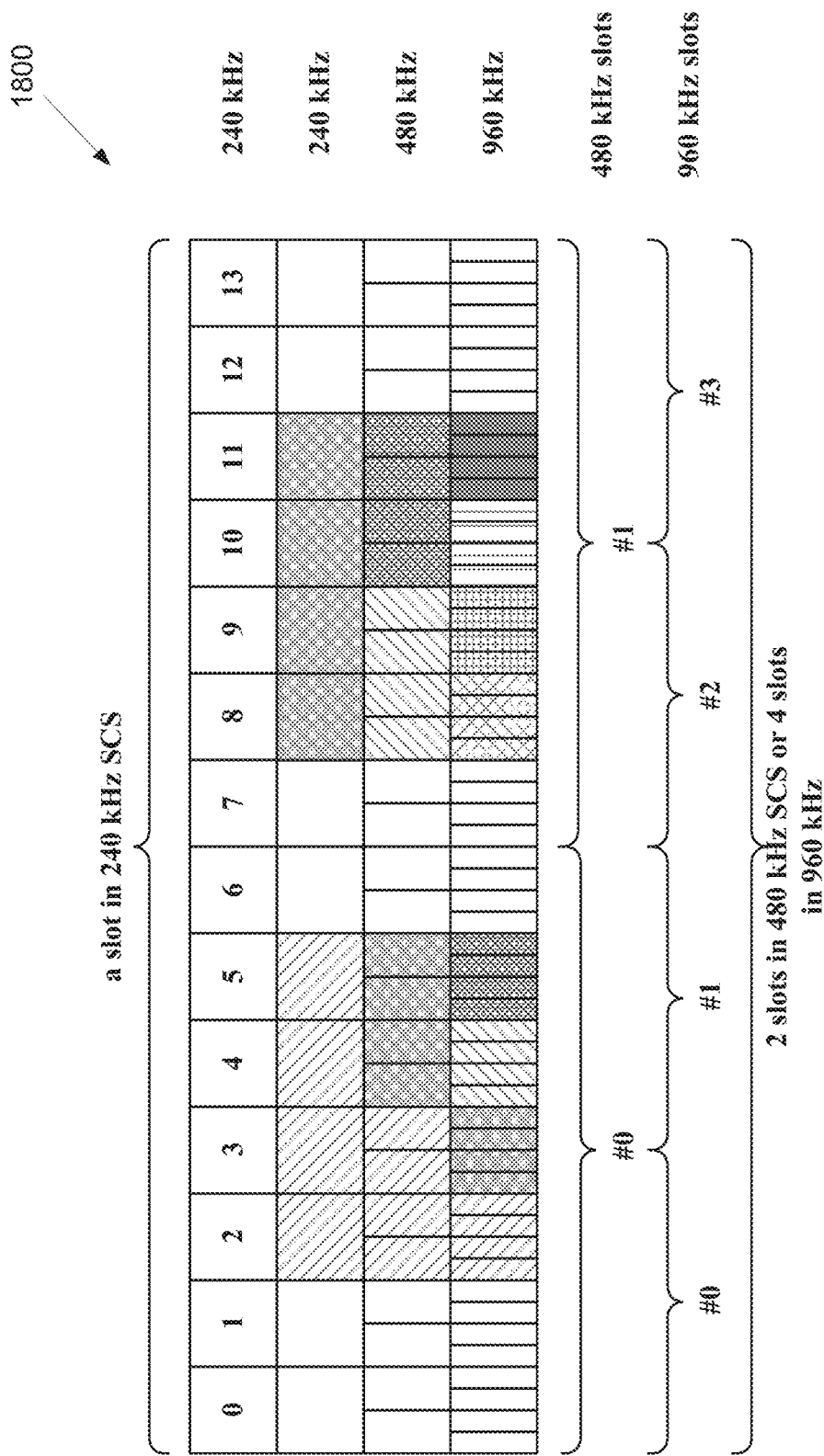
FIG. 18 illustrates yet another example mapping design according to embodiments of the present disclosure.

FIG. 18 illustrates yet another example mapping design 1800 according to embodiments of the present disclosure. The embodiment of the mapping design 1800 illustrated in FIG. 18 is for illustration only. FIG. 18 does not limit the scope of this disclosure to any particular implementation.

In yet another embodiment, if using 240 kHz as the reference SCS to design the mapping pattern of SS/PBCH blocks, the first two symbols (e.g., #0 and #1) as well the last two symbols (e.g., #12 and #13) with respect to the reference SCS of 240 kHz can be reserved. An example of this mapping design is illustrated in FIG. 18, and mapping patterns are determined by: for SCS of SS/PBCH block being 240 kHz, the first symbols of the candidate SS/PBCH blocks have indexes {2, 8} within every design unit of 14 symbols (e.g. 1 slot with total duration of 0.0625 ms); for SCS of SS/PBCH block being 480 kHz, the first symbols of the candidate SS/PBCH blocks have indexes {4, 8, 16, 20} within every design unit of 28 symbols (e.g. 2 slots with total duration of 0.0625 ms); and/or for SCS of SS/PBCH block being 960 kHz, the first symbols of the candidate SS/PBCH blocks have indexes {8, 12, 16, 20, 32, 36, 40, 44} within every design unit of 56 symbols (e.g. 4 slots with total duration of 0.0625 ms).

Figure 19:
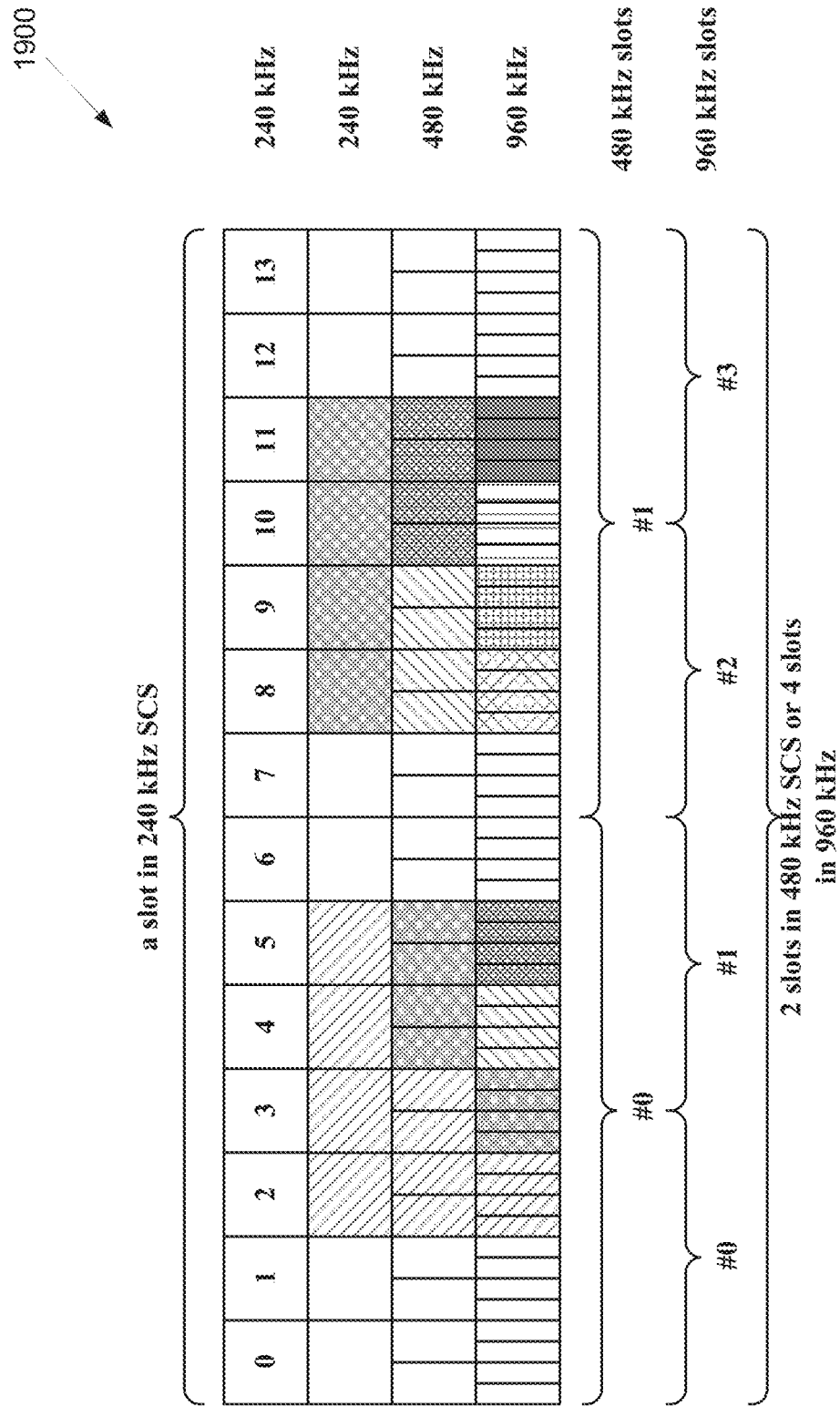
FIG. 19 illustrates yet another example mapping design according to embodiments of the present disclosure.

FIG. 19 illustrates yet another example mapping design 1900 according to embodiments of the present disclosure. The embodiment of the mapping design 1900 illustrated in FIG. 19 is for illustration only. FIG. 19 does not limit the scope of this disclosure to any particular implementation.

The mapping of the design unit, 0.0625 ms as a slot of 240 kHz SCS as the reference SCS, into the half frame can be determined as illustrated in FIG. 19 (L is maximum number of SS/PBCH blocks in the figure), wherein the indexes of the design unit that contains the mapping pattern given by FIG. 19 are given by: for SCS of SS/PBCH block being 240 kHz and maximum number of SS/PBCH blocks being 64, the indexes of design units of 0.0625 ms with a half frame are given by {0, 1, 2, 3, 4, 5, 6, 7, 8, 9, 10, 11, 12, 13, 14, 15, 20, 21, 22, 23, 24, 25, 26, 27, 28, 29, 30, 31, 32, 33, 34, 35}; for SCS of SS/PBCH block being 240 kHz and maximum number of SS/PBCH blocks being 128, the indexes of design units of 0.0625 ms with a half frame are given by {0, 1, 2, 3, 4, 5, 6, 7, 8, 9, 10, 11, 12, 13, 14, 15, 20, 21, 22, 23, 24, 25, 26, 27, 28, 29, 30, 31, 32, 33, 34, 35, 40, 41, 42, 43, 44, 45, 46, 47, 48, 49, 50, 51, 52, 53, 54, 55, 60, 61, 62, 63, 64, 65, 66, 67, 68, 69, 70, 71, 72, 73, 74, 75}; for SCS of SS/PBCH block being 480 kHz and maximum number of SS/PBCH blocks being 64, the indexes of design units of 0.0625 ms with a half frame are given by {0, 1, 2, 3, 4, 5, 6, 7, 8, 9, 10, 11, 12, 13, 14, 15}; for SCS of SS/PBCH block being 480 kHz and maximum number of SS/PBCH blocks being 128, the indexes of design units of 0.0625 ms with a half frame are given by {0, 1, 2, 3, 4, 5, 6, 7, 8, 9, 10, 11, 12, 13, 14, 15, 20, 21, 22, 23, 24, 25, 26, 27, 28, 29, 30, 31, 32, 33, 34, 35}; for SCS of SS/PBCH block being 960 kHz and maximum number of SS/PBCH blocks being 64, the indexes of design units of 0.0625 ms with a half frame are given by {0, 1, 2, 3, 4, 5, 6, 7}; for SCS of SS/PBCH block being 960 kHz and maximum number of SS/PBCH blocks being 128, the indexes of design units of 0.0625 ms with a half frame are given by {0, 1, 2, 3, 4, 5, 6, 7, 8, 9, 10, 11, 12, 13, 14, 15}; and/or for SCS of SS/PBCH block being 960 kHz and maximum number of SS/PBCH blocks being 256, the indexes of design units of 0.0625 ms with a half frame are given by {0, 1, 2, 3, 4, 5, 6, 7, 8, 9, 10, 11, 12, 13, 14, 15, 20, 21, 22, 23, 24, 25, 26, 27, 28, 29, 30, 31, 32, 33, 34, 35}.

In some embodiments, the following mapping patterns for SS/PBCH blocks can be obtained (symbol index 0 is the symbol 0 of the first slot of the half frame).

In one example, for NR HFR, if dual SCSs of SS/PBCH blocks are supported for a given HFR band, wherein the SCSs can be 240 kHz and 480 kHz, and the maximum number of SS/PBCH blocks is 128 within a burst set, the first symbols of the 128 candidate SS/PBCH blocks within a half frame can have indexes: for SCS of SS/PBCH blocks being 240 kHz, {2, 8}+14*N_unit^240 kHz, where N_unit^240 kHz=0, 1, 2, 3, 4, 5, 6, 7, 8, 9, 10, 11, 12, 13, 14, 15, 20, 21, 22, 23, 24, 25, 26, 27, 28, 29, 30, 31, 32, 33, 34, 35, 40, 41, 42, 43, 44, 45, 46, 47, 48, 49, 50, 51, 52, 53, 54, 55, 60, 61, 62, 63, 64, 65, 66, 67, 68, 69, 70, 71, 72, 73, 74, 75; and/or for SCS of SS/PBCH blocks being 480 kHz, {4, 8, 16, 20}+28*N_unit^480 kHz, where N_unit^480 kHz=0, 1, 2, 3, 4, 5, 6, 7, 8, 9, 10, 11, 12, 13, 14, 15, 20, 21, 22, 23, 24, 25, 26, 27, 28, 29, 30, 31, 32, 33, 34, 35.

In one example, for NR HFR, if dual SCSs of SS/PBCH blocks are supported for a given HFR band, wherein the SCSs can be 480 kHz and 960 kHz, and the maximum number of SS/PBCH blocks is 128 within a burst set, the first symbols of the 128 candidate SS/PBCH blocks within a half frame can have indexes: for SCS of SS/PBCH blocks being 480 kHz, {4, 8, 16, 20}+28*N_unit^480 kHz, where N_unit^480 kHz=0, 1, 2, 3, 4, 5, 6, 7, 8, 9, 10, 11, 12, 13, 14, 15, 20, 21, 22, 23, 24, 25, 26, 27, 28, 29, 30, 31, 32, 33, 34, 35; and/or for SCS of SS/PBCH blocks being 960 kHz, {8, 12, 16, 20, 32, 36, 40, 44}+56*N_unit^960 kHz, where N_unit^960 kHz=0, 1, 2, 3, 4, 5, 6, 7, 8, 9, 10, 11, 12, 13, 14, 15.

In one embodiment, for NR HFR, if a single SCS of SS/PBCH blocks is supported for a given HFR band, wherein the SCS can be either 240 kHz or 480 kHz or 960 kHz, and the maximum number of SS/PBCH blocks is 128 within a burst set, the first symbols of the 128 candidate SS/PBCH blocks within a half frame can have indexes: for SCS of SS/PBCH blocks being 240 kHz, {2, 8}+14*N_unit^240 kHz, where N_unit^240 kHz=0, 1, 2, 3, 4, 5, 6, 7, 8, 9, 10, 11, 12, 13, 14, 15, 20, 21, 22, 23, 24, 25, 26, 27, 28, 29, 30, 31, 32, 33, 34, 35, 40, 41, 42, 43, 44, 45, 46, 47, 48, 49, 50, 51, 52, 53, 54, 55, 60, 61, 62, 63, 64, 65, 66, 67, 68, 69, 70, 71, 72, 73, 74, 75; for SCS of SS/PBCH blocks being 480 kHz, {4, 8, 16, 20}+28*N_unit^480 kHz, where N_unit^480 kHz=0, 1, 2, 3, 4, 5, 6, 7, 8, 9, 10, 11, 12, 13, 14, 15, 20, 21, 22, 23, 24, 25, 26, 27, 28, 29, 30, 31, 32, 33, 34, 35; and/or for SCS of SS/PBCH blocks being 960 kHz, {8, 12, 16, 20, 32, 36, 40, 44}+56*N_unit^960 kHz, where N_unit^960 kHz=0, 1, 2, 3, 4, 5, 6, 7, 8, 9, 10, 11, 12, 13, 14, 15.

In one example, for NR HFR, if a single SCS of SS/PBCH blocks is supported for a given HFR band, wherein the SCS can be 960 kHz, and the maximum number of SS/PBCH blocks is 256 within a burst set, the first symbols of the 256 candidate SS/PBCH blocks within a half frame can have indexes: for SCS of SS/PBCH blocks being 960 kHz, {8, 12, 16, 20, 32, 36, 40, 44}+56*N_unit^960 kHz, where N_unit^960 kHz=0, 1, 2, 3, 4, 5, 6, 7, 8, 9, 10, 11, 12, 13, 14, 15, 20, 21, 22, 23, 24, 25, 26, 27, 28, 29, 30, 31, 32, 33, 34, 35.

In one example, for NR HFR, if dual SCSs of SS/PBCH blocks are supported for a given HFR band, wherein the SCSs can be 240 kHz and 480 kHz, and the maximum number of SS/PBCH blocks is 64 within a burst set, the first symbols of the 64 candidate SS/PBCH blocks within a half frame can have indexes: for SCS of SS/PBCH blocks being 240 kHz, {2, 8}+14*N_unit^240 kHz, where N_unit^240 kHz=0, 1, 2, 3, 4, 5, 6, 7, 8, 9, 10, 11, 12, 13, 14, 15, 20, 21, 22, 23, 24, 25, 26, 27, 28, 29, 30, 31, 32, 33, 34, 35; and/or for SCS of SS/PBCH blocks being 480 kHz, {4, 8, 16, 20}+28*N_unit^480 kHz, where N_unit^480 kHz=0, 1, 2, 3, 4, 5, 6, 7, 8, 9, 10, 11, 12, 13, 14, 15.

For NR HFR, if dual SCSs of SS/PBCH blocks are supported for a given HFR band, wherein the SCSs can be 480 kHz and 960 kHz, and the maximum number of SS/PBCH blocks is 64 within a burst set, the first symbols of the 64 candidate SS/PBCH blocks within a half frame can have indexes: for SCS of SS/PBCH blocks being 480 kHz, {4, 8, 16, 20}+28*N_unit^480 kHz, where N_unit^480 kHz=0, 1, 2, 3, 4, 5, 6, 7, 8, 9, 10, 11, 12, 13, 14, 15; and/or for SCS of SS/PBCH blocks being 960 kHz, {8, 12, 16, 20, 32, 36, 40, 44}+56*N_unit^960 kHz, where N_unit^960 kHz=0, 1, 2, 3, 4, 5, 6, 7.

For NR HFR, if a single SCS of SS/PBCH blocks is supported for a given HFR band, wherein the SCS can be either 240 kHz or 480 kHz or 960 kHz, and the maximum number of SS/PBCH blocks is 64 within a burst set, the first symbols of the 64 candidate SS/PBCH blocks within a half frame can have indexes: for SCS of SS/PBCH blocks being 240 kHz, {2, 8}+14*N_unit^240 kHz, where N_unit^240 kHz=0, 1, 2, 3, 4, 5, 6, 7, 8, 9, 10, 11, 12, 13, 14, 15, 20, 21, 22, 23, 24, 25, 26, 27, 28, 29, 30, 31, 32, 33, 34, 35; for SCS of SS/PBCH blocks being 480 kHz, {4, 8, 16, 20}+28*N_unit^480 kHz, where N_unit^480 kHz=0, 1, 2, 3, 4, 5, 6, 7, 8, 9, 10, 11, 12, 13, 14, 15; and/or for SCS of SS/PBCH blocks being 960 kHz, {8, 12, 16, 20, 32, 36, 40, 44}+56*N_unit^960 kHz, where N_unit^960 kHz=0, 1, 2, 3, 4, 5, 6, 7.

Figure 20:
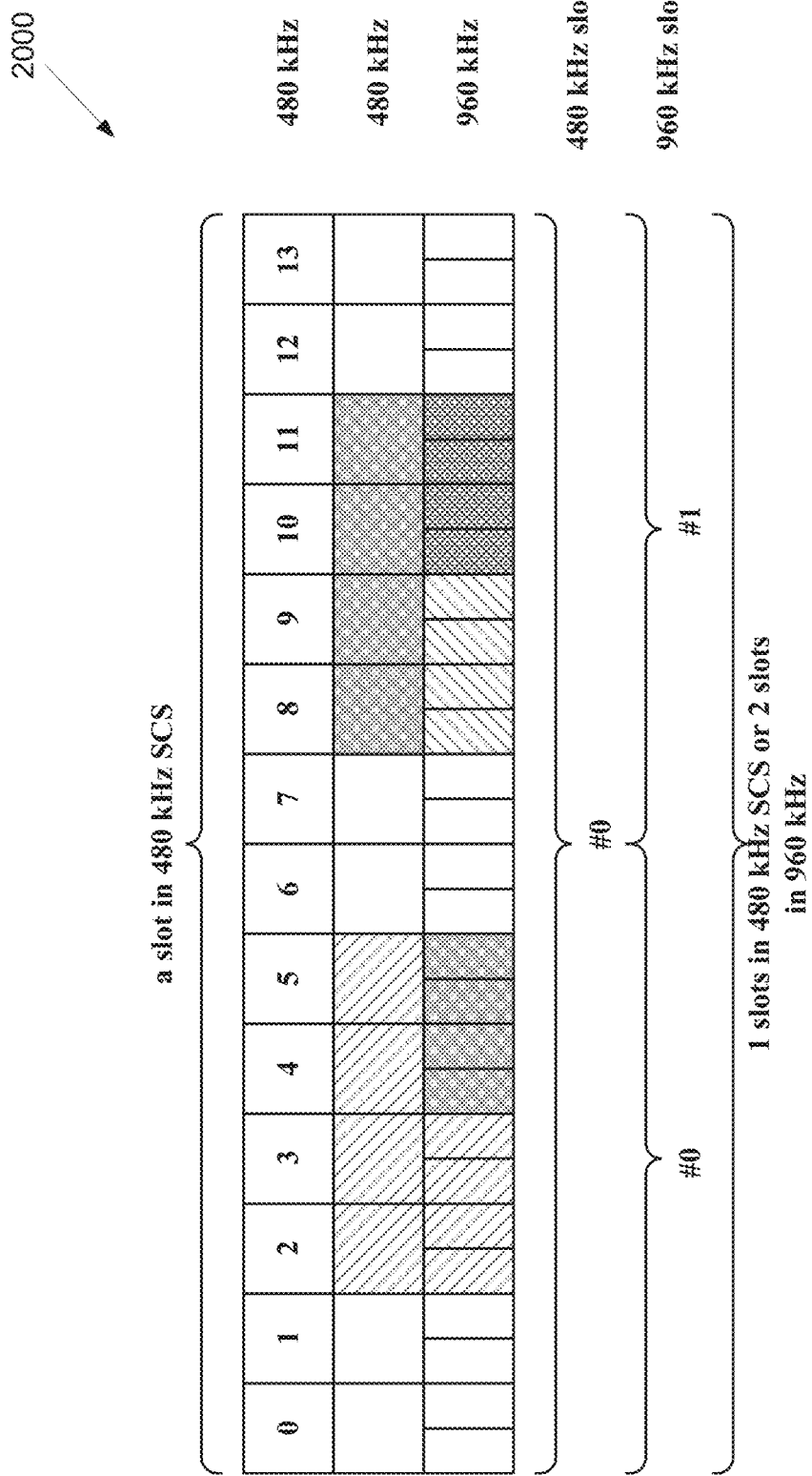
FIG. 20 illustrates yet another example mapping design according to embodiments of the present disclosure.

FIG. 20 illustrates yet another example mapping design 2000 according to embodiments of the present disclosure. The embodiment of the mapping design 2000 illustrated in FIG. 20 is for illustration only. FIG. 20 does not limit the scope of this disclosure to any particular implementation.

In yet another embodiment, if using 480 kHz as the reference SCS to design the mapping pattern of SS/PBCH blocks, the first two symbols (e.g. #0 and #1) as well the last two symbols (e.g. #12 and #13) with respect to the reference SCS of 480 kHz can be reserved. An example of this mapping design is illustrated in FIG. 20, and mapping patterns are determined by: for SCS of SS/PBCH block being 480 kHz, the first symbols of the candidate SS/PBCH blocks have indexes {2, 8} within every design unit of 14 symbols (e.g. 1 slot with total duration of 0.03125 ms); and/or for SCS of SS/PBCH block being 960 kHz, the first symbols of the candidate SS/PBCH blocks have indexes {4, 8, 16, 20} within every design unit of 28 symbols (e.g. 2 slots with total duration of 0.03125 ms).

Figure 21:
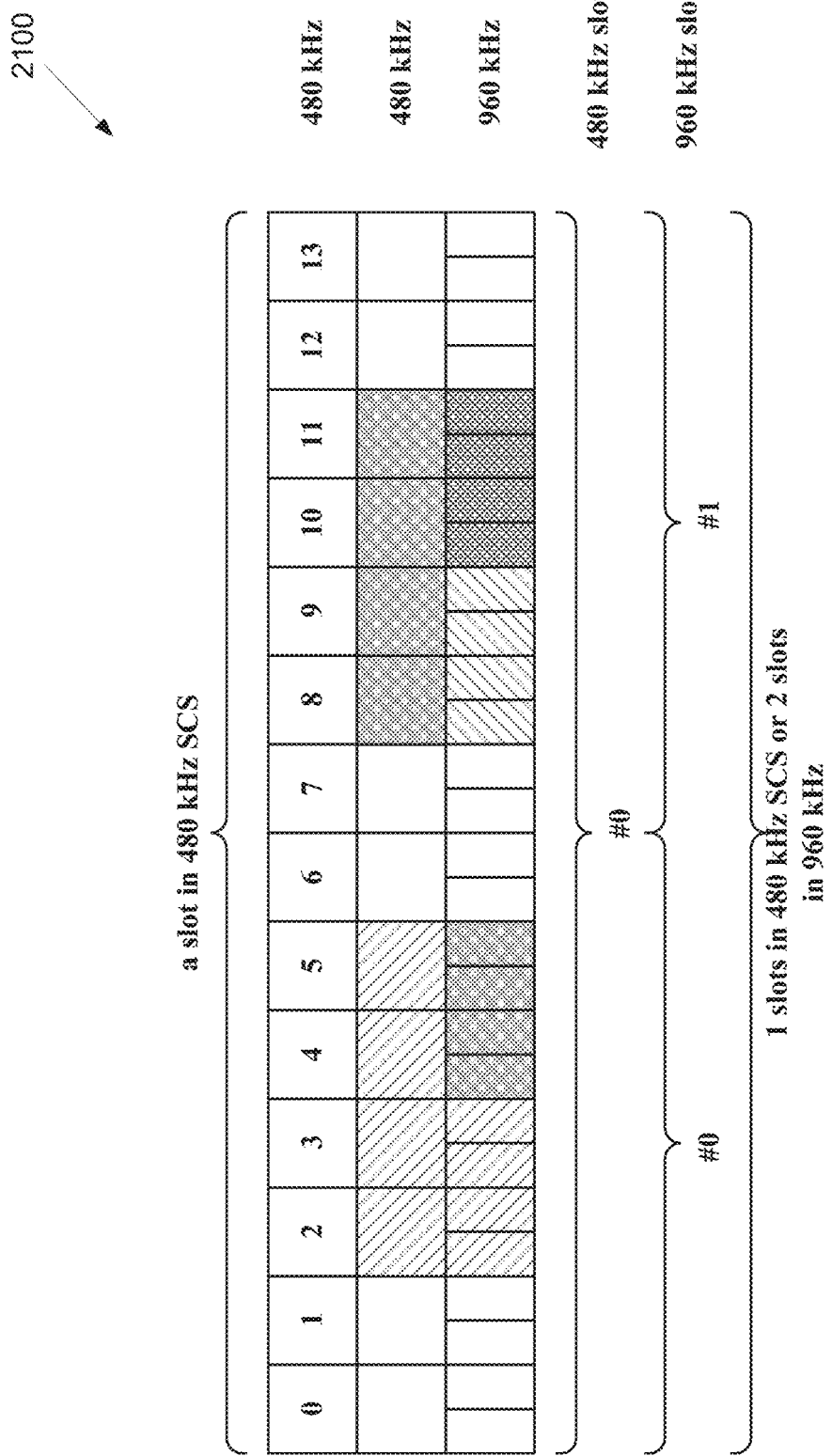
FIG. 21 illustrates yet another example mapping design according to embodiments of the present disclosure.

FIG. 21 illustrates yet another example mapping design 2100 according to embodiments of the present disclosure. The embodiment of the mapping design 2100 illustrated in FIG. 21 is for illustration only. FIG. 21 does not limit the scope of this disclosure to any particular implementation.

The mapping of the design unit, 0.03125 ms as a slot of 480 kHz SCS as the reference SCS, into the half frame can be determined as illustrated in FIG. 21 (L is maximum number of SS/PBCH blocks in the figure), wherein the indexes of the design unit that contains the mapping pattern given by FIG. 20 are given by: for SCS of SS/PBCH block being 480 kHz and maximum number of SS/PBCH blocks being 64, the indexes of design units of 0.03125 ms with a half frame are given by {0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31}; for SCS of SS/PBCH block being 480 kHz and maximum number of SS/PBCH blocks being 128, the indexes of design units of 0.03125 ms with a half frame are given by {0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71}; for SCS of SS/PBCH block being 960 kHz and maximum number of SS/PBCH blocks being 64, the indexes of design units of 0.03125 ms with a half frame are given by {0, 1, 2, 3, 4, 5, 6, 7, 8, 9, 10, 11, 12, 13, 14, 15}; for SCS of SS/PBCH block being 960 kHz and maximum number of SS/PBCH blocks being 128, the indexes of design units of 0.03125 ms with a half frame are given by {0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31}; and/or for SCS of SS/PBCH block being 960 kHz and maximum number of SS/PBCH blocks being 256, the indexes of design units of 0.03125 ms with a half frame are given by {0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71}.

In some embodiments, the following mapping patterns for SS/PBCH blocks can be obtained (symbol index 0 is the symbol 0 of the first slot of the half frame).

In one example, for NR HFR, if dual SCSs of SS/PBCH blocks are supported for a given HFR band, wherein the SCSs can be 480 kHz and 960 kHz, and the maximum number of SS/PBCH blocks is 128 within a burst set, the first symbols of the 128 candidate SS/PBCH blocks within a half frame can have indexes: for SCS of SS/PBCH blocks being 480 kHz, {2, 8}+14*N_unit^480 kHz, where N_unit^480 kHz=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71; and/or for SCS of SS/PBCH blocks being 960 kHz, {4, 8, 16, 20}+28*N_unit^960 kHz, where N_unit^960 kHz=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31.

In one example, for NR HFR, if a single SCS of SS/PBCH blocks is supported for a given HFR band, wherein the SCS can be either 480 kHz or 960 kHz, and the maximum number of SS/PBCH blocks is 128 within a burst set, the first symbols of the 128 candidate SS/PBCH blocks within a half frame can have indexes: for SCS of SS/PBCH blocks being 480 kHz, {2, 8}+14*N_unit^480 kHz, where N_unit^480 kHz=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71; and/or for SCS of SS/PBCH blocks being 960 kHz, {4, 8, 16, 20}+28*N_unit^960 kHz, where N_unit^960 kHz=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31.

In one example, for NR HFR, if a single SCS of SS/PBCH blocks is supported for a given HFR band, wherein the SCS can be 960 kHz, and the maximum number of SS/PBCH blocks is 256 within a burst set, the first symbols of the 256 candidate SS/PBCH blocks within a half frame can have indexes: for SCS of SS/PBCH blocks being 960 kHz, {4, 8, 16, 20}+28*N_unit^960 kHz, where N_unit^960 kHz=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71.

In one example, for NR HFR, if dual SCSs of SS/PBCH blocks are supported for a given HFR band, wherein the SCSs can be 480 kHz and 960 kHz, and the maximum number of SS/PBCH blocks is 64 within a burst set, the first symbols of the 64 candidate SS/PBCH blocks within a half frame can have indexes: for SCS of SS/PBCH blocks being 480 kHz, {2, 8}+14*N_unit^480 kHz, where N_unit^480 kHz=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31; and/or for SCS of SS/PBCH blocks being 960 kHz, {4, 8, 16, 20}+28*N_unit^960 kHz, where N_unit^960 kHz=0, 1, 2, 3, 4, 5, 6, 7, 8, 9, 10, 11, 12, 13, 14, 15.

In on example, for NR HFR, if a single SCS of SS/PBCH blocks is supported for a given HFR band, wherein the SCS can be either 480 kHz or 960 kHz, and the maximum number of SS/PBCH blocks is 64 within a burst set, the first symbols of the 64 candidate SS/PBCH blocks within a half frame can have indexes: for SCS of SS/PBCH blocks being 480 kHz, {2, 8}+14*N_unit^480 kHz, where N_unit^480 kHz=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31; and/or for SCS of SS/PBCH blocks being 960 kHz, {4, 8, 16, 20}+28*N_unit^960 kHz, where N_unit^960 kHz=0, 1, 2, 3, 4, 5, 6, 7, 8, 9, 10, 11, 12, 13, 14, 15.

Figure 22:
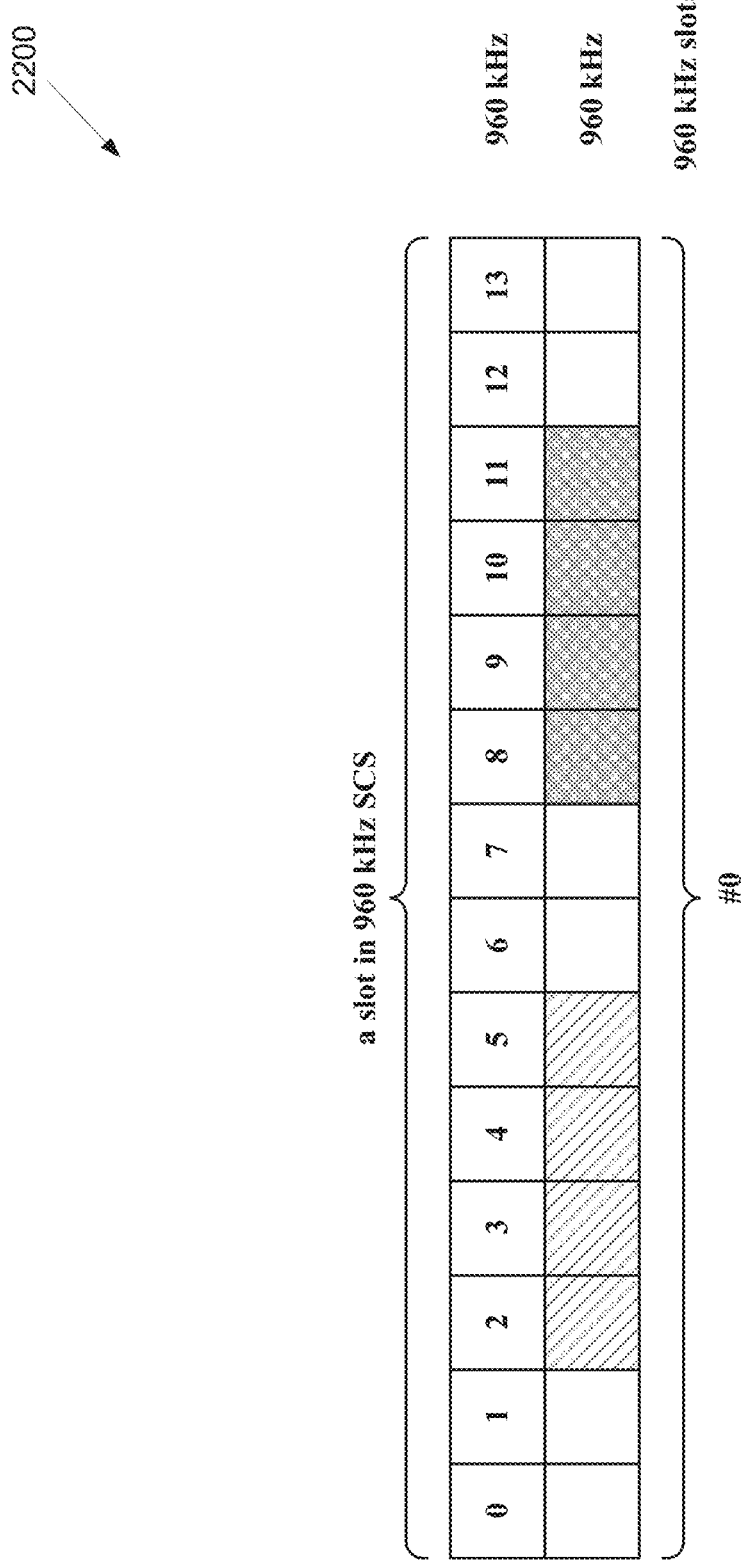
FIG. 22 illustrates yet another example mapping design according to embodiments of the present disclosure.

FIG. 22 illustrates yet another example mapping design 2200 according to embodiments of the present disclosure. The embodiment of the mapping design 2200 illustrated in FIG. 22 is for illustration only. FIG. 22 does not limit the scope of this disclosure to any particular implementation.

In yet another embodiment, if using 960 kHz as the reference SCS to design the mapping pattern of SS/PBCH blocks, the first two symbols (e.g. #0 and #1) as well as the last two symbols (e.g. #12 and #13) with respect to the reference SCS of 960 kHz can be reserved. An example of this mapping design is illustrated in FIG. 22, and mapping patterns are determined by: for SCS of SS/PBCH block being 960 kHz, the first symbols of the candidate SS/PBCH blocks have indexes {2, 8} within every design unit of 14 symbols (e.g., 1 slot with total duration of 0.015625 ms).

Figure 23:
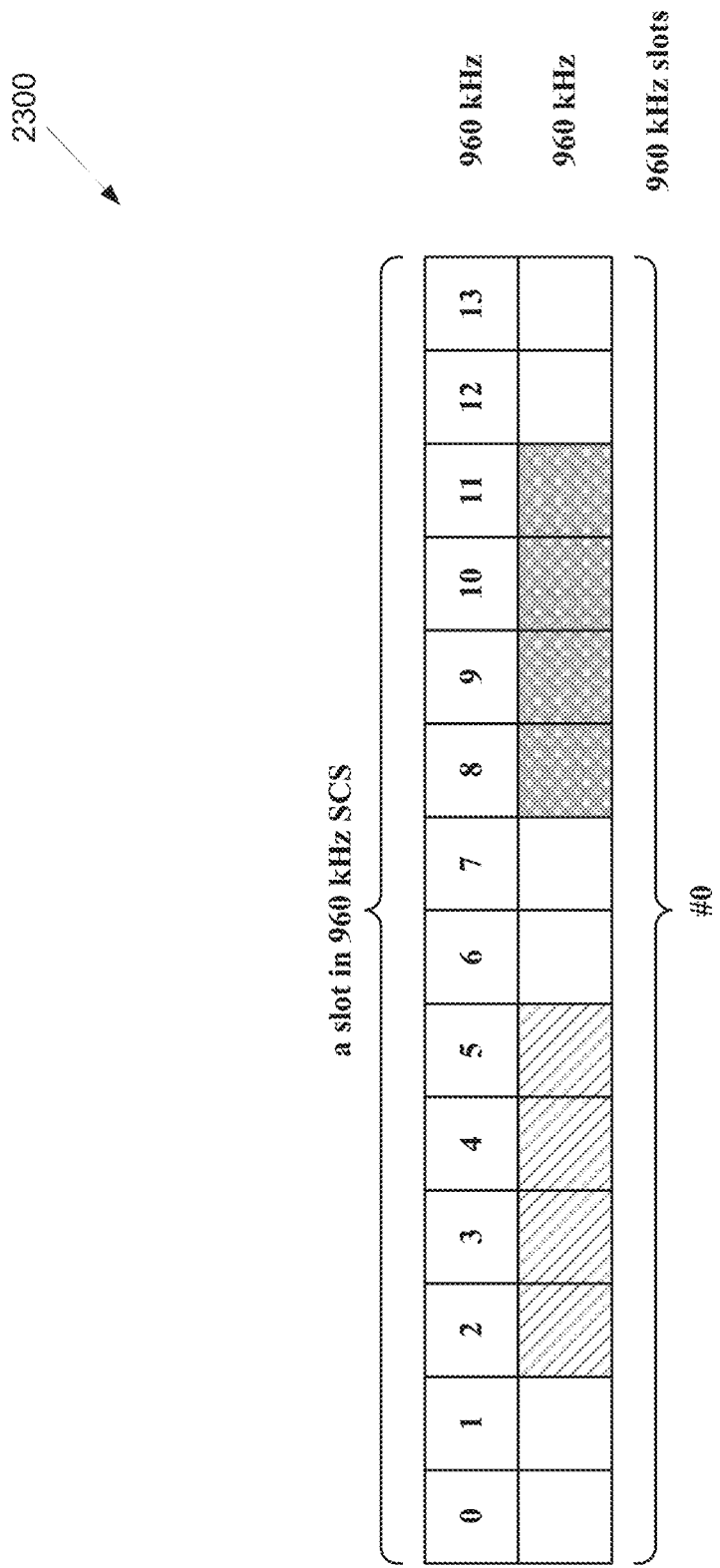
FIG. 23 illustrates yet another example mapping design according to embodiments of the present disclosure.

FIG. 23 illustrates yet another example mapping design 2300 according to embodiments of the present disclosure. The embodiment of the mapping design 2300 illustrated in FIG. 23 is for illustration only. FIG. 23 does not limit the scope of this disclosure to any particular implementation.

The mapping of the design unit, 0.015625 ms as a slot of 960 kHz SCS as the reference SCS, into the half frame can be determined as illustrated in FIG. 23 (L is maximum number of SS/PBCH blocks in the figure), wherein the indexes of the design unit that contains the mapping pattern given by FIG. 22 are given by: for SCS of SS/PBCH block being 960 kHz and maximum number of SS/PBCH blocks being 64, the indexes of design units of 0.03125 ms with a half frame are given by {0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31}; for SCS of SS/PBCH block being 960 kHz and maximum number of SS/PBCH blocks being 128, the indexes of design units of 0.03125 ms with a half frame are given by {0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63}; and/or for SCS of SS/PBCH block being 960 kHz and maximum number of SS/PBCH blocks being 256, the indexes of design units of 0.03125 ms with a half frame are given by {0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143}.

In some embodiments, mapping patterns for SS/PBCH blocks can be obtained (symbol index 0 is the symbol 0 of the first slot of the half frame).

In one example, for NR HFR, if a single SCS of SS/PBCH blocks is supported for a given HFR band, wherein the SCS can be 960 kHz, and the maximum number of SS/PBCH blocks is 64 within a burst set, the first symbols of the 64 candidate SS/PBCH blocks within a half frame can have indexes: for SCS of SS/PBCH blocks being 960 kHz, {2, 8}+14*N_unit^960 kHz, where N_unit^960 kHz=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31.

In one example, for NR HFR, if a single SCS of SS/PBCH blocks is supported for a given HFR band, wherein the SCS can be 960 kHz, and the maximum number of SS/PBCH blocks is 128 within a burst set, the first symbols of the 128 candidate SS/PBCH blocks within a half frame can have indexes: for SCS of SS/PBCH blocks being 960 kHz, {2, 8}+14*N_unit^960 kHz, where N_unit^960 kHz=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63.

In one example, for NR HFR, if a single SCS of SS/PBCH blocks is supported for a given HFR band, wherein the SCS can be 960 kHz, and the maximum number of SS/PBCH blocks is 256 within a burst set, the first symbols of the 256 candidate SS/PBCH blocks within a half frame can have indexes: for SCS of SS/PBCH blocks being 960 kHz, {2, 8}+14*N_unit^960 kHz, where N_unit^960 kHz=0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143.

In NR, a physical random access channel (PRACH) formats with SCS up to 120 kHz were supported for short generation sequence with length 139.

In one embodiment, for NR HFR, PRACH formats with SCS as 240 kHz and/or 480 kHz and/or 960 kHz can be supported by using the same generation sequence with length 139, the same number of symbols, and the same CP length. For example, PRACH formats including at least one of A1, A2, A3, B1, B2, B3, B4, C0, and C2 can be supported using the same generation sequence with length 139, same number of symbols, and same CP length.

In NR, a one-bit field in MIB, i.e., subCarrierSpacing-Common, is utilized to indicate the subcarrier spacing for RMSI, Msg 2/4 of RACH procedure for an initial access, and broadcast SI-messages. For sub-6 GHz, the subcarrier spacing can be either 15 kHz or 30 kHz, and for over 6 GHz, the subcarrier spacing can be either 60 kHz or 120 kHz.

In one embodiment, for NR HFR, the same one-bit field can be utilized to indicate the common value for the subcarrier spacing for RMSI, Msg 2/4 of RACH procedure for an initial access, and broadcast SI-messages, but with different indicated values. For example, the one-bit field can be utilized to indicate one from {SCS_min, SCS_max}, where SCS_max=2*SCS_min. Note that the choice of SCS_min can be related or independent of the SCS for SS/PBCH blocks (i.e., SCS_min can be the same or not equal to the minimum of all supported SCS for SS/PBCH blocks in NR HFR): in one example, SCS_min=480 kHz; in another example, SCS_min=240 kHz; and in yet another example, SCS_min=120 kHz.

In another embodiment, for NR HFR, the one-bit field subCarrierSpacingCommon can be combined with other reserved bit or saved bit from other field's indication to indicate the common value for the subcarrier spacing for RMSI, Msg 2/4 of RACH procedure for an initial access, and broadcast SI-messages, such that the one-bit field can indicate more than 2 values. For example, the one-bit field can be combined with another reserved/saved bit to indicate one of 3 or 4 SCS values.

Note that the choice of SCS_min can be related or independent of the SCS for SS/PBCH blocks. For example, the set of SCS values to be indicated can be {60 kHz, 120 kHz, 240 kHz, 480 kHz}. For another example, the set of SCS values to be indicated can be {120 kHz, 240 kHz, 480 kHz, 960 kHz}.

In yet another embodiment, for NR HFR, the common subcarrier spacing for RMSI, Msg 2/4 of the random access procedure for an initial access, and broadcast SI-messages can be fixed and the one-bit field subCarrierSpacingCommon can be reserved or utilized for other indication. For example, the common subcarrier spacing for RMSI, Msg 2/4 of RACH procedure for initial access, and broadcast SI-messages can be the same as the subcarrier spacing of SS/PBCH block.

In NR, the SS/PBCH block index is carried by the DMRS sequence of PBCH and potentially the PBCH content. For L=64, the 3 MSBs of SS/PBCH block index are indicated by the PBCH content, and the 3 LSBs of SS/PBCH block index are carried by the DMRS sequence of PBCH; for L=8, the 3 bits of SS/PBCH block index are carried by the DMRS sequence of PBCH; for L=4, the 2 bits of SS/PBCH block index are carried by the DMRS sequence of PBCH.

In one embodiment, for NR HFR, if the maximum number of SS/PBCH blocks is 64, the same mechanism can be utilized for carrying the SS/PBCH block index. For example, the 3 MSBs of SS/PBCH block index are indicated by the PBCH content, and the 3 LSBs of SS/PBCH block index are carried by the DMRS sequence of PBCH.

In another embodiment, for NR HFR, if the maximum number of SS/PBCH blocks is 128, the SS/PBCH block index can still be carried in a hybrid way.

In one example, the 3 MSBs of SS/PBCH block index are indicated by the PBCH content (keep the same PBCH content as in NR), and the 4 LSBs of SS/PBCH block index are carried by the DMRS sequence of PBCH.

In another example, the 4 MSBs of SS/PBCH block index are indicated by the PBCH content (can use one reserved bit or use another bit saved from other field, e.g. 1 bit can be saved from search space configuration indication), and the 3 LSBs of SS/PBCH block index are carried by the DMRS sequence of PBCH (keep the same sequence design of DMRS of PBCH).

In yet another example, the 3 MSBs (or the 4th, 5th, and 6th LSB) of SS/PBCH block index are indicated by the PBCH content (keep the same PBCH content as in NR), and the 3 LSBs of SS/PBCH block index are carried by the DMRS sequence of PBCH (keep the same sequence design of DMRS of PBCH), and the remaining one bit (the 4th LSB or the 1st MSB) can be carried in another way.

For example, the remaining one bit can be carried by the sequence frequency-domain mapping order of DMRS of PBCH (e.g. either mapping from lowest RE to highest RE or mapping from highest RE to lowest RE). For another example, the remaining one bit can be carried by the sequence frequency-domain and time-domain mapping order of DMRS of PBCH (e.g. either frequency-first-and-time-second mapping order or time-first-and-frequency-second mapping order). For yet another example, the remaining one bit can be carried by the CRC mask code of PBCH. For yet another example, the remaining one bit can be carried by changing the RE locations mapped for PBCH in different symbols (e.g., either no shift or a constant shift for different symbols mapped for PBCH).

In another embodiment, for NR HFR, if the maximum number of SS/PBCH blocks is 256, the SS/PBCH block index can still be carried in a hybrid way.

In one example, the 3 MSBs of SS/PBCH block index are indicated by the PBCH content (keep the same PBCH content as in NR), and the 5 LSBs of SS/PBCH block index are carried by the DMRS sequence of PBCH.

In another example, the 5 MSBs of SS/PBCH block index are indicated by the PBCH content (can use one reserved bit or use another bit saved from other field, e.g., 1 bit can be saved from search space configuration indication), and the 3 LSBs of SS/PBCH block index are carried by the DMRS sequence of PBCH (keep the same sequence design of DMRS of PBCH).

In yet another example, the 3 MSBs (or the 4th, 5th, and 6th LSB) of SS/PBCH block index are indicated by the PBCH content (keep the same PBCH content as in NR), and the 3 LSBs of SS/PBCH block index are carried by the DMRS sequence of PBCH (keep the same sequence design of DMRS of PBCH), and the remaining two bits can be carried in another way (can be combined from the following examples).

For example, at least one of the remaining bits can be carried by the sequence frequency-domain mapping order of DMRS of PBCH (e.g. either mapping from lowest RE to highest RE or mapping from highest RE to lowest RE).

For another example, at least one of the remaining bits can be carried by the sequence frequency-domain and time-domain mapping order of DMRS of PBCH (e.g., either frequency-first-and-time-second mapping order or time-first-and-frequency-second mapping order).

For yet another example, at least one of the remaining bits can be carried by the CRC mask code of PBCH.

For yet another example, at least one of the remaining bits can be carried by changing the RE locations mapped for PBCH in different symbols (e.g. either no shift or a constant shift for different symbols mapped for PBCH).

In NR, one 4-bit field in MIB, i.e., ssb-SubcarrierOffset, is utilized to indicate the subcarrier offset between the RB grids of SS/PBCH block and RMSI CORESET for over 6 GHz, and this field together with another bit generated in the physical layer are utilized to indicate the subcarrier offset between the RB grids of SS/PBCH block and RMSI CORESET for sub 6 GHz.

In one embodiment, for NR HFR, if the candidate SCS for the common value for the subcarrier spacing for RMSI, Msg 2/4 of RACH procedure for initial access, and broadcast SI-messages is only one, at most 12 values on the subcarrier offset are required to indicate and 4 bits are sufficient to indicate. For example, the field ssb-SubcarrierOffset in MIB can still be utilized to indicate the subcarrier offset.

In another embodiment, for NR HFR, if the candidate SCS for the common values for the subcarrier spacing for RMSI, Msg 2/4 of RACH procedure for initial access, and broadcast SI-messages are two, which is indicated by 1 separate bit in MIB, at most 24 values on the subcarrier offset are required to indicate and 5 bits are sufficient to indicate. For example, the field ssb-SubcarrierOffset in MIB, together with another reserved or saved bit can be utilized to indicate the subcarrier offset.

In another embodiment, for NR HFR, if the candidate SCS for the common values for the subcarrier spacing for RMSI, Msg 2/4 of RACH procedure for initial access, and broadcast SI-messages are three or four, which is indicated by 2 separate bits, at most 36 or 48 values on the subcarrier offset are required to indicate and 6 bits are sufficient to indicate. For example, the field ssb-SubcarrierOffset in MIB, together with another 2 reserved or saved bits can be utilized to indicate the subcarrier offset.

In NR, 4 bits of the field in MIB, i.e., pdcch-ConfigSIB1, is utilized to indicate the CORESET configuration of RMSI, where the configurations of the multiplexing pattern, CORESET BW, number of symbols for CORESET, and RB-level offset between SS/PBCH block and CORESET are jointly coded using the 4 bits. The configuration table is determined per the combination of subcarrier spacing of SS/PBCH block and PDCCH in CORESET.

In general, for multiplexing pattern 1 of the SS/PBCH block and CORESET, the required number of configurations, #RB_offset, can be determined as follow: #RB_offset=[SS_Raster/((Carrier_BW−CORESET_BW+1)*RMSI_SCS/SS_SCS)], where SS_Raster is the synchronization raster in term of RB in SS/PBCH subcarrier spacing, Carrier_BW is the bandwidth of the carrier in term of RB in RMSI subcarrier spacing, CORESET_BW is the bandwidth of the RMSI CORESET in term of RB in RMSI subcarrier spacing, RMSI_SCS is the subcarrier spacing of RMSI, SS_SCS is the subcarrier spacing of SS/PBCH block. The choices of the #RB_offset offset values can be determined as symmetric with respect to the configuration where SS/PBCH block and RMSI CORESET are center-aligned.

In general, for multiplexing pattern 2 and 3 of the SS/PBCH block and CORESET, the required number of configurations, #RB_offset, can be 2, wherein the two configurations are: {CORESET_BW, −20*SS_SCS/RMSI_SCS} if the subcarrier offset k_SSB=0 and SS_SCS=RMSI_SCS; {CORESET_BW, −20*SS_SCS/RMSI_SCS−1} if the subcarrier offset k_SSB≠0 and SS_SCS=RMSI_SCS; {CORESET_BW+1, −20*SS_SCS/RMSI_SCS−1} if the subcarrier offset k_SSB=0 and SS_SCS≠RMSI_SCS; and/or {CORESET_BW+1, −20*SS_SCS/RMSI_SCS−2} if the subcarrier offset k_SSB=0 and SS_SCS≠RMSI_SCS.

In one embodiment, if the combination of {SS_SCS, RMSI_SCS} as {240 kHz, 240 kHz} is supported, and SS raster is 12 RBs in SS_SCS (e.g. the minimum carrier BW is 100 MHz), TABLE 3 (or a subset of the configurations in the table) can be utilized to indicate the CORESET configuration, where condition A and condition B refer to k_SSB=0 and k_SSB>0, respectively.

TABLE 3

Subset of configuration

| Index | Multiplexing Pattern | CORESET BW (RBs) | Number of Symbols | Offset (RBs) |
|---|---|---|---|---|
| 0 | 1 | 24 | 2 | 0 |
| 1 | 1 | 24 | 2 | 4 |
| 2 | 1 | 24 | 3 | 0 |
| 3 | 1 | 24 | 3 | 4 |
| 4 | 1 | 48 | 1 | 14 |
| 5 | 1 | 48 | 2 | 14 |
| 6 | 1 | 48 | 3 | 14 |
| 7 | 1 | 96 | 1 | 38 |
| 8 | 1 | 96 | 2 | 38 |
| 9 | 1 | 96 | 3 | 38 |
| 10 | 3 | 24 | 2 | −20 if condition A, −21 if condition B |
| 11 | 3 | 24 | 2 | 24 |
| 12 | 3 | 48 | 2 | −20 if condition A, −21 if condition B |
| 13 | 3 | 48 | 2 | 48 |
| 14 | 3 | 96 | 2 | −20 if condition A, −21 if condition B |
| 15 | 3 | 96 | 2 | 96 |

In another embodiment, if the combination of {SS_SCS, RMSI_SCS} as {240 kHz, 240 kHz} is supported, and SS raster is 42 or 36 RBs in SS_SCS (e.g. the minimum carrier BW is 200 MHz), TABLE 4 (or a subset of the configurations in the table) can be utilized to indicate the CORESET configuration, where condition A and condition B refer to k_SSB=0 and k_SSB>0, respectively.

TABLE 4

Subset of configuration

| Index | Multiplexing Pattern | CORESET BW (RBs) | Number of Symbols | Offset (RBs) |
|---|---|---|---|---|
| 0 | 1 | 24 | 2 | 2 |
| 1 | 1 | 24 | 3 | 2 |
| 2 | 1 | 48 | 1 | 0 |
| 3 | 1 | 48 | 1 | 14 |
| 4 | 1 | 48 | 1 | 28 |
| 5 | 1 | 48 | 2 | 0 |
| 6 | 1 | 48 | 2 | 14 |
| 7 | 1 | 48 | 2 | 28 |
| 8 | 1 | 96 | 1 | 0 |
| 9 | 1 | 96 | 1 | 76 |
| 10 | 3 | 24 | 2 | −20 if condition A, −21 if condition B |
| 11 | 3 | 24 | 2 | 24 |
| 12 | 3 | 48 | 2 | −20 if condition A, −21 if condition B |
| 13 | 3 | 48 | 2 | 48 |
| 14 | 3 | 96 | 2 | −20 if condition A, −21 if condition B |
| 15 | 3 | 96 | 2 | 96 |

In yet another embodiment, if the combination of {SS_SCS, RMSI_SCS} as {240 kHz, 240 kHz} is supported, and SS raster is 108 RBs or 96 PRBs in SS_SCS (e.g. the minimum carrier BW is 400 MHz), TABLE 5 (or a subset of the configurations in the table) can be utilized to indicate the CORESET configuration, where condition A and condition B refer to $k\_SSB=0$ and $k\_SSB>0$, respectively.

TABLE 5

Subset of configuration

| Index | Multiplexing Pattern | CORESET BW (RBs) | Number of Symbols | Offset (RBs) |
|---|---|---|---|---|
| 0 | 1 | 24 | 2 | 2 |
| 1 | 1 | 24 | 3 | 2 |
| 2 | 1 | 48 | 1 | 0 |
| 3 | 1 | 48 | 1 | 28 |
| 4 | 1 | 48 | 2 | 0 |
| 5 | 1 | 48 | 2 | 28 |
| 6 | 1 | 96 | 1 | 0 |
| 7 | 1 | 96 | 1 | 38 |
| 8 | 1 | 96 | 1 | 76 |
| 9 | 3 | 24 | 2 | −20 if condition A, −21 if condition B |
| 10 | 3 | 24 | 2 | 24 |
| 11 | 3 | 48 | 2 | −20 if condition A, −21 if condition B |
| 12 | 3 | 48 | 2 | 48 |
| 13 | 3 | 96 | 2 | −20 if condition A, −21 if condition B |
| 14 | 3 | 96 | 2 | 96 |
| 15 | | | Reserved | |

In yet another embodiment, if the combination of {SS_SCS, RMSI_SCS} as {240 kHz, 480 kHz} is supported, and SS raster is 12 RBs in SS_SCS (e.g., the minimum carrier BW is 100 MHz), TABLE 6 or a subset of the configurations in the table) can be utilized to indicate the CORESET configuration, where condition A and condition B refer to $k\_SSB=0$ and $k\_SSB>0$, respectively.

TABLE 6

Subset of configuration

| Index | Multiplexing Pattern | CORESET BW (RBs) | Number of Symbols | Offset (RBs) |
|---|---|---|---|---|
| 0 | 1 | 24 | 2 | 7 |
| 1 | 1 | 24 | 3 | 7 |
| 2 | 1 | 48 | 1 | 19 |
| 3 | 1 | 48 | 2 | 19 |
| 4 | 1 | 48 | 3 | 19 |
| 5 | 1 | 96 | 1 | 43 |
| 6 | 1 | 96 | 2 | 43 |
| 7 | 1 | 96 | 3 | 43 |
| 8 | 2 | 24 | 1 | −11 if condition A, −12 if condition B |
| 9 | 2 | 24 | 1 | 25 |
| 10 | 2 | 48 | 1 | −11 if condition A, −12 if condition B |
| 11 | 2 | 48 | 1 | 49 |
| 12 | 2 | 96 | 1 | −11 if condition A, −12 if condition B |
| 13 | 2 | 96 | 1 | 97 |
| 14 | | | Reserved | |
| 15 | | | Reserved | |

In yet another embodiment, if the combination of {SS_SCS, RMSI_SCS} as {240 kHz, 480 kHz} is supported, and SS raster is 42 RBs in SS_SCS (e.g., the minimum carrier BW is 200 MHz), TABLE 7 (or a subset of the configurations in the table) can be utilized to indicate the CORESET configuration, where condition A and condition B refer to $k\_SSB=0$ and $k\_SSB>0$, respectively.

TABLE 7

Subset of configuration

| Index | Multiplexing Pattern | CORESET BW (RBs) | Number of Symbols | Offset (RBs) |
|---|---|---|---|---|
| 0 | 1 | 24 | 2 | 0 |
| 1 | 1 | 24 | 2 | 7 |
| 2 | 1 | 24 | 2 | 14 |
| 3 | 1 | 48 | 1 | 0 |
| 4 | 1 | 48 | 1 | 38 |
| 5 | 1 | 48 | 2 | 0 |
| 6 | 1 | 48 | 2 | 38 |
| 7 | 1 | 96 | 1 | 43 |
| 8 | 1 | 96 | 2 | 43 |
| 9 | 2 | 24 | 1 | −11 if condition A, −12 if condition B |
| 10 | 2 | 24 | 1 | 25 |
| 11 | 2 | 48 | 1 | −11 if condition A, −12 if condition B |
| 12 | 2 | 48 | 1 | 49 |
| 13 | 2 | 96 | 1 | −11 if condition A, −12 if condition B |
| 14 | 2 | 96 | 1 | 97 |
| 15 | | | Reserved | |

In yet another embodiment, if the combination of {SS_SCS, RMSI_SCS} as {240 kHz, 480 kHz} is supported, and SS raster is 108 RBs in SS_SCS (e.g. the minimum carrier BW is 400 MHz), TABLE 8 (or a subset of the configurations in the table) can be utilized to indicate the CORESET configuration, where condition A and condition B refer to $k\_SSB=0$ and $k\_SSB>0$, respectively.

TABLE 8

Subset of configuration

| Index | Multiplexing Pattern | CORESET BW (RBs) | Number of Symbols | Offset (RBs) |
|---|---|---|---|---|
| 0 | 1 | 24 | 2 | 0 |
| 1 | 1 | 24 | 2 | 14 |
| 2 | 1 | 48 | 2 | 0 |
| 3 | 1 | 48 | 2 | 19 |
| 4 | 1 | 48 | 2 | 38 |
| 5 | 1 | 48 | 3 | 0 |
| 6 | 1 | 48 | 3 | 19 |
| 7 | 1 | 48 | 3 | 38 |
| 8 | 1 | 96 | 1 | 0 |
| 9 | 1 | 96 | 1 | 86 |
| 10 | 2 | 24 | 1 | −11 if condition A, −12 if condition B |
| 11 | 2 | 24 | 1 | 25 |
| 12 | 2 | 48 | 1 | −11 if condition A, −12 if condition B |
| 13 | 2 | 48 | 1 | 49 |
| 14 | 2 | 96 | 1 | −11 if condition A, −12 if condition B |
| 15 | 2 | 96 | 1 | 97 |

In yet another embodiment, if the combination of {SS_SCS, RMSI_SCS} as {480 kHz, 240 kHz} is supported, and SS raster is 12 RBs in SS_SCS (e.g., the minimum carrier BW is 100 MHz or 200 MHz), TABLE 9 (or a subset of the configurations in the table) can be utilized to indicate the CORESET configuration, where condition A and condition B refer to $k\_SSB=0$ and $k\_SSB>0$, respectively.

TABLE 9

Subset of configuration

| Index | Multiplexing Pattern | CORESET BW (RBs) | Number of Symbols | Offset (RBs) |
|---|---|---|---|---|
| 0 | 1 | 48 | 1 | 0 |
| 1 | 1 | 48 | 1 | 8 |
| 2 | 1 | 48 | 2 | 0 |
| 3 | 1 | 48 | 2 | 8 |
| 4 | 1 | 48 | 3 | 0 |
| 5 | 1 | 48 | 3 | 8 |
| 6 | 1 | 96 | 1 | 28 |
| 7 | 1 | 96 | 2 | 28 |
| 8 | 1 | 96 | 3 | 28 |
| 9 | 2 | 24 | 1 | −41 if condition A, −42 if condition B |
| 10 | 2 | 24 | 1 | 25 |
| 11 | 2 | 48 | 1 | −41 if condition A, −42 if condition B |
| 12 | 2 | 48 | 1 | 49 |
| 13 | 2 | 96 | 1 | −41 if condition A, −42 if condition B |
| 14 | 2 | 96 | 1 | 97 |
| 15 | | | | Reserved |

In yet another embodiment, if the combination of {SS_SCS, RMSI_SCS} as {480 kHz, 240 kHz} is supported, and SS raster is 42 RBs or 36 RBs in SS_SCS (e.g., the minimum carrier BW is 400 MHz), TABLE 10 (or a subset of the configurations in the table) can be utilized to indicate the CORESET configuration, where condition A and condition B refer to k_SSB=0 and k_SSB>0, respectively.

TABLE 10

Subset of configuration

| Index | Multiplexing Pattern | CORESET BW (RBs) | Number of Symbols | Offset (RBs) |
|---|---|---|---|---|
| 0 | 1 | 48 | 2 | 0 |
| 1 | 1 | 48 | 2 | 2 |
| 2 | 1 | 48 | 2 | 4 |
| 3 | 1 | 48 | 2 | 6 |
| 4 | 1 | 48 | 2 | 8 |
| 5 | 1 | 96 | 1 | 0 |
| 6 | 1 | 96 | 1 | 28 |
| 7 | 1 | 96 | 1 | 56 |
| 8 | 1 | 96 | 2 | 0 |
| 9 | 1 | 96 | 2 | 28 |
| 10 | 1 | 96 | 2 | 56 |
| 11 | 2 | 48 | 1 | −41 if condition A, −42 if condition B |
| 12 | 2 | 48 | 1 | 49 |
| 13 | 2 | 96 | 1 | −41 if condition A, −42 if condition B |
| 14 | 2 | 96 | 1 | 97 |
| 15 | | | | Reserved |

In yet another embodiment, if the combination of {SS_SCS, RMSI_SCS} as {480 kHz, 480 kHz} is supported, and SS raster is 12 RBs in SS_SCS (e.g., the minimum carrier BW is 100 MHz or 200 MHz), TABLE 11 (or a subset of the configurations in the table) can be utilized to indicate the CORESET configuration, where condition A and condition B refer to k_SSB=0 and k_SSB>0, respectively.

TABLE 11

Subset of configuration

| Index | Multiplexing Pattern | CORESET BW (RBs) | Number of Symbols | Offset (RBs) |
|---|---|---|---|---|
| 0 | 1 | 24 | 2 | 0 |
| 1 | 1 | 24 | 2 | 4 |
| 2 | 1 | 24 | 3 | 0 |
| 3 | 1 | 24 | 3 | 4 |
| 4 | 1 | 48 | 1 | 14 |
| 5 | 1 | 48 | 2 | 14 |
| 6 | 1 | 48 | 3 | 14 |
| 7 | 1 | 96 | 1 | 38 |
| 8 | 1 | 96 | 2 | 38 |
| 9 | 1 | 96 | 3 | 38 |
| 10 | 3 | 24 | 2 | −20 if condition A, −21 if condition B |
| 11 | 3 | 24 | 2 | 24 |
| 12 | 3 | 48 | 2 | −20 if condition A, −21 if condition B |
| 13 | 3 | 48 | 2 | 48 |
| 14 | 3 | 96 | 2 | −20 if condition A, −21 if condition B |
| 15 | 3 | 96 | 2 | 96 |

In yet another embodiment, if the combination of {SS_SCS, RMSI_SCS} as {480 kHz, 480 kHz} is supported, and SS raster is 42 RBs or 36 RBs in SS_SCS (e.g., the minimum carrier BW is 400 MHz), TABLE 12 (or a subset of the configurations in the table) can be utilized to indicate the CORESET configuration, where condition A and condition B refer to k_SSB=0 and k_SSB>0, respectively.

TABLE 12

Subset of configuration

| Index | Multiplexing Pattern | CORESET BW (RBs) | Number of Symbols | Offset (RBs) |
|---|---|---|---|---|
| 0 | 1 | 24 | 2 | 2 |
| 1 | 1 | 24 | 3 | 2 |
| 2 | 1 | 48 | 1 | 0 |
| 3 | 1 | 48 | 1 | 14 |
| 4 | 1 | 48 | 1 | 28 |
| 5 | 1 | 48 | 2 | 0 |
| 6 | 1 | 48 | 2 | 14 |
| 7 | 1 | 48 | 2 | 28 |
| 8 | 1 | 96 | 1 | 0 |
| 9 | 1 | 96 | 1 | 76 |
| 10 | 3 | 24 | 2 | −20 if condition A, −21 if condition B |
| 11 | 3 | 24 | 2 | 24 |
| 12 | 3 | 48 | 2 | −20 if condition A, −21 if condition B |
| 13 | 3 | 48 | 2 | 48 |
| 14 | 3 | 96 | 2 | −20 if condition A, −21 if condition B |
| 15 | 3 | 96 | 2 | 96 |

In one embodiment, if the combination of {SS_SCS, RMSI_SCS} as {960 kHz, 960 kHz} is supported, and SS raster is 12 RBs in SS_SCS (e.g., the minimum carrier BW is 400 MHz), TABLE 13 (or a subset of the configurations in the table) can be utilized to indicate the CORESET configuration, where condition A and condition B refer to k_SSB=0 and k_SSB>0, respectively.

TABLE 13

Subset of configuration

| Index | Multiplexing Pattern | CORESET BW (RBs) | Number of Symbols | Offset (RBs) |
|---|---|---|---|---|
| 0 | 1 | 24 | 2 | 0 |
| 1 | 1 | 24 | 2 | 4 |
| 2 | 1 | 24 | 3 | 0 |
| 3 | 1 | 24 | 3 | 4 |
| 4 | 1 | 48 | 1 | 14 |
| 5 | 1 | 48 | 2 | 14 |
| 6 | 1 | 48 | 3 | 14 |
| 7 | 1 | 96 | 1 | 38 |
| 8 | 1 | 96 | 2 | 38 |
| 9 | 1 | 96 | 3 | 38 |
| 10 | 3 | 24 | 2 | −20 if condition A, −21 if condition B |
| 11 | 3 | 24 | 2 | 24 |
| 12 | 3 | 48 | 2 | −20 if condition A, −21 if condition B |
| 13 | 3 | 48 | 2 | 48 |
| 14 | 3 | 96 | 2 | −20 if condition A, −21 if condition B |
| 15 | 3 | 96 | 2 | 96 |

In one embodiment, if the combination of {SS_SCS, RMSI_SCS} as {960 kHz, 960 kHz} is supported, and SS raster is 42 RBs or 36 RBs in SS_SCS (e.g., the minimum carrier BW is 800 MHz), TABLE 14 (or a subset of the configurations in the table) can be utilized to indicate the CORESET configuration, where condition A and condition B refer to k_SSB=0 and k_SSB>0, respectively.

TABLE 14

Subset of configuration

| Index | Multiplexing Pattern | CORESET BW (RBs) | Number of Symbols | Offset (RBs) |
|---|---|---|---|---|
| 0 | 1 | 24 | 2 | 2 |
| 1 | 1 | 24 | 3 | 2 |
| 2 | 1 | 48 | 1 | 0 |
| 3 | 1 | 48 | 1 | 14 |
| 4 | 1 | 48 | 1 | 28 |
| 5 | 1 | 48 | 2 | 0 |
| 6 | 1 | 48 | 2 | 14 |
| 7 | 1 | 48 | 2 | 28 |
| 8 | 1 | 96 | 1 | 0 |
| 9 | 1 | 96 | 1 | 76 |
| 10 | 3 | 24 | 2 | −20 if condition A, −21 if condition B |
| 11 | 3 | 24 | 2 | 24 |
| 12 | 3 | 48 | 2 | −20 if condition A, −21 if condition B |
| 13 | 3 | 48 | 2 | 48 |
| 14 | 3 | 96 | 2 | −20 if condition A, −21 if condition B |
| 15 | 3 | 96 | 2 | 96 |

In one embodiment, if the combination of {SS_SCS, RMSI_SCS} as {960 kHz, 960 kHz} is supported, and SS raster is 108 RBs or 96 RBs in SS_SCS (e.g., the minimum carrier BW is 1600 MHz), TABLE 15 (or a subset of the configurations in the table) can be utilized to indicate the CORESET configuration, where condition A and condition B refer to k_SSB=0 and k_SSB>0, respectively.

TABLE 15

Subset of configuration

| Index | Multiplexing Pattern | CORESET BW (RBs) | Number of Symbols | Offset (RBs) |
|---|---|---|---|---|
| 0 | 1 | 24 | 2 | 2 |
| 1 | 1 | 24 | 3 | 2 |
| 2 | 1 | 48 | 1 | 0 |
| 3 | 1 | 48 | 1 | 28 |
| 4 | 1 | 48 | 2 | 0 |
| 5 | 1 | 48 | 2 | 28 |
| 6 | 1 | 96 | 1 | 0 |
| 7 | 1 | 96 | 1 | 38 |
| 8 | 1 | 96 | 1 | 76 |
| 9 | 3 | 24 | 2 | −20 if condition A, −21 if condition B |
| 10 | 3 | 24 | 2 | 24 |
| 11 | 3 | 48 | 2 | −20 if condition A, −21 if condition B |
| 12 | 3 | 48 | 2 | 48 |
| 13 | 3 | 96 | 2 | −20 if condition A, −21 if condition B |
| 14 | 3 | 96 | 2 | 96 |
| 15 | Reserved | | | |

In one embodiment, if the combination of {SS_SCS, RMSI_SCS} as {960 kHz, 960 kHz} is supported, and SS raster is 156 RBs or 144 RBs in SS_SCS (e.g., the minimum carrier BW is 2160 MHz), TABLE 16 (or a subset of the configurations in the table) can be utilized to indicate the CORESET configuration, where condition A and condition B refer to k_SSB=0 and k_SSB>0, respectively.

TABLE 16

Subset of configuration

| Index | Multiplexing Pattern | CORESET BW (RBs) | Number of Symbols | Offset (RBs) |
|---|---|---|---|---|
| 0 | 1 | 24 | 2 | 0 |
| 1 | 1 | 24 | 2 | 4 |
| 2 | 1 | 48 | 1 | 0 |
| 3 | 1 | 48 | 1 | 28 |
| 4 | 1 | 48 | 2 | 0 |
| 5 | 1 | 48 | 2 | 28 |
| 6 | 1 | 96 | 1 | 0 |
| 7 | 1 | 96 | 1 | 76 |
| 8 | 1 | 96 | 2 | 0 |
| 9 | 1 | 96 | 2 | 76 |
| 10 | 3 | 24 | 2 | −20 if condition A, −21 if condition B |
| 11 | 3 | 24 | 2 | 24 |
| 12 | 3 | 48 | 2 | −20 if condition A, −21 if condition B |
| 13 | 3 | 48 | 2 | 48 |
| 14 | 3 | 96 | 2 | −20 if condition A, −21 if condition B |
| 15 | 3 | 96 | 2 | 96 |

In one embodiment, if the combination of {SS_SCS, RMSI_SCS} as {960 kHz, 480 kHz} is supported, and SS raster is 12 RBs in SS_SCS (e.g., the minimum carrier BW is 400 MHz), TABLE 17 (or a subset of the configurations in the table) can be utilized to indicate the CORESET configuration, where condition A and condition B refer to k_SSB=0 and k_SSB>0, respectively.

TABLE 17

Subset of configuration

| Index | Multiplexing Pattern | CORESET BW (RBs) | Number of Symbols | Offset (RBs) |
|---|---|---|---|---|
| 0 | 1 | 48 | 1 | 0 |
| 1 | 1 | 48 | 1 | 8 |
| 2 | 1 | 48 | 2 | 0 |
| 3 | 1 | 48 | 2 | 8 |
| 4 | 1 | 48 | 3 | 0 |
| 5 | 1 | 48 | 3 | 8 |
| 6 | 1 | 96 | 1 | 28 |
| 7 | 1 | 96 | 2 | 28 |
| 8 | 1 | 96 | 3 | 28 |
| 9 | 2 | 24 | 1 | −41 if condition A, −42 if condition B |
| 10 | 2 | 24 | 1 | 25 |
| 11 | 2 | 48 | 1 | −41 if condition A, −42 if condition B |
| 12 | 2 | 48 | 1 | 49 |
| 13 | 2 | 96 | 1 | −41 if condition A, −42 if condition B |
| 14 | 2 | 96 | 1 | 97 |
| 15 | | | Reserved | |

In one embodiment, if the combination of {SS_SCS, RMSI_SCS} as {960 kHz, 480 kHz} is supported, and SS raster is 42 RBs or 36 RBs in SS_SCS (e.g. the minimum carrier BW is 800 MHz), TABLE 18 (or a subset of the configurations in the table) can be utilized to indicate the CORESET configuration, where condition A and condition B refer to k_SSB=0 and k_SSB>0, respectively.

TABLE 18

Subset of configuration

| Index | Multiplexing Pattern | CORESET BW (RBs) | Number of Symbols | Offset (RBs) |
|---|---|---|---|---|
| 0 | 1 | 48 | 2 | 0 |
| 1 | 1 | 48 | 2 | 2 |
| 2 | 1 | 48 | 2 | 4 |
| 3 | 1 | 48 | 2 | 6 |
| 4 | 1 | 48 | 2 | 8 |
| 5 | 1 | 96 | 1 | 0 |
| 6 | 1 | 96 | 1 | 28 |
| 7 | 1 | 96 | 1 | 56 |
| 8 | 1 | 96 | 2 | 0 |
| 9 | 1 | 96 | 2 | 28 |
| 10 | 1 | 96 | 2 | 56 |
| 11 | 2 | 48 | 1 | −41 if condition A, −42 if condition B |
| 12 | 2 | 48 | 1 | 49 |
| 13 | 2 | 96 | 1 | −41 if condition A, −42 if condition B |
| 14 | 2 | 96 | 1 | 97 |
| 15 | | | Reserved | |

In one embodiment, if the combination of {SS_SCS, RMSI_SCS} as {960 kHz, 480 kHz} is supported, and SS raster is 108 RBs or 96 RBs in SS_SCS (e.g., the minimum carrier BW is 1600 MHz), TABLE 19 (or a subset of the configurations in the table) can be utilized to indicate the CORESET configuration, where condition A and condition B refer to k_SSB=0 and k_SSB>0, respectively.

TABLE 19

Subset of configuration

| Index | Multiplexing Pattern | CORESET BW (RBs) | Number of Symbols | Offset (RBs) |
|---|---|---|---|---|
| 0 | 1 | 48 | 1 | 0 |
| 1 | 1 | 48 | 1 | 4 |
| 2 | 1 | 48 | 1 | 8 |
| 3 | 1 | 48 | 2 | 0 |
| 4 | 1 | 48 | 2 | 4 |
| 5 | 1 | 48 | 2 | 8 |
| 6 | 1 | 96 | 1 | 0 |
| 7 | 1 | 96 | 1 | 12 |
| 8 | 1 | 96 | 1 | 24 |
| 9 | 1 | 96 | 1 | 32 |
| 10 | 1 | 96 | 1 | 44 |
| 11 | 1 | 96 | 1 | 56 |
| 12 | 2 | 48 | 1 | −41 if condition A, −42 if condition B |
| 13 | 2 | 48 | 1 | 49 |
| 14 | 2 | 96 | 1 | −41 if condition A, −42 if condition B |
| 15 | 2 | 96 | 1 | 97 |

In one embodiment, if the combination of {SS_SCS, RMSI_SCS} as {960 kHz, 480 kHz} is supported, and SS raster is 156 RBs or 144 RBs in SS_SCS (e.g., the minimum carrier BW is 2160 MHz), TABLE 20 (or a subset of the configurations in the table) can be utilized to indicate the CORESET configuration, where condition A and condition B refer to k_SSB=0 and k_SSB>0, respectively.

TABLE 20

Subset of configuration

| Index | Multiplexing Pattern | CORESET BW (RBs) | Number of Symbols | Offset (RBs) |
|---|---|---|---|---|
| 0 | 1 | 48 | 1 | 0 |
| 1 | 1 | 48 | 1 | 3 |
| 2 | 1 | 48 | 1 | 5 |
| 3 | 1 | 48 | 1 | 8 |
| 4 | 1 | 96 | 1 | 0 |
| 5 | 1 | 96 | 1 | 8 |
| 6 | 1 | 96 | 1 | 16 |
| 7 | 1 | 96 | 1 | 24 |
| 8 | 1 | 96 | 1 | 32 |
| 9 | 1 | 96 | 1 | 40 |
| 10 | 1 | 96 | 1 | 48 |
| 11 | 1 | 96 | 1 | 56 |
| 12 | 2 | 48 | 1 | −41 if condition A, −42 if condition B |
| 13 | 2 | 48 | 1 | 49 |
| 14 | 2 | 96 | 1 | −41 if condition A, −42 if condition B |
| 15 | 2 | 96 | 1 | 97 |

In yet another embodiment, if the combination of {SS_SCS, RMSI_SCS} as {480 kHz, 960 kHz} is supported, and SS raster is 42 RBs or 36 RBs in SS_SCS (e.g., the minimum carrier BW is 400 MHz), TABLE 21 (or a subset of the configurations in the table) can be utilized to indicate the CORESET configuration, where condition A and condition B refer to k_SSB=0 and k_SSB>0, respectively.

TABLE 21

Subset of configuration

| Index | Multiplexing Pattern | CORESET BW (RBs) | Number of Symbols | Offset (RBs) |
|---|---|---|---|---|
| 0 | 1 | 24 | 2 | 0 |
| 1 | 1 | 24 | 2 | 7 |
| 2 | 1 | 24 | 2 | 14 |
| 3 | 1 | 48 | 1 | 0 |
| 4 | 1 | 48 | 1 | 38 |
| 5 | 1 | 48 | 2 | 0 |
| 6 | 1 | 48 | 2 | 38 |
| 7 | 1 | 96 | 1 | 43 |
| 8 | 1 | 96 | 2 | 43 |
| 9 | 2 | 24 | 1 | −11 if condition A, −12 if condition B |
| 10 | 2 | 24 | 1 | 25 |
| 11 | 2 | 48 | 1 | −11 if condition A, −12 if condition B |
| 12 | 2 | 48 | 1 | 49 |
| 13 | 2 | 96 | 1 | −11 if condition A, −12 if condition B |
| 14 | 2 | 96 | 1 | 97 |
| 15 | | | | Reserved |

In yet another embodiment, if the combination of {SS_SCS, RMSI_SCS} as {480 kHz, 960 kHz} is supported, and SS raster is 108 RBs or 96 RBs in SS_SCS (e.g., the minimum carrier BW is 800 MHz), TABLE 22 (or a subset of the configurations in the table) can be utilized to indicate the CORESET configuration, where condition A and condition B refer to k_SSB=0 and k_SSB>0, respectively.

TABLE 22

Subset of configuration

| Index | Multiplexing Pattern | CORESET BW (RBs) | Number of Symbols | Offset (RBs) |
|---|---|---|---|---|
| 0 | 1 | 24 | 2 | 0 |
| 1 | 1 | 24 | 2 | 14 |
| 2 | 1 | 48 | 1 | 0 |
| 3 | 1 | 48 | 1 | 19 |
| 4 | 1 | 48 | 1 | 38 |
| 5 | 1 | 48 | 2 | 0 |
| 6 | 1 | 48 | 2 | 19 |
| 7 | 1 | 48 | 2 | 38 |
| 8 | 1 | 96 | 1 | 0 |
| 9 | 1 | 96 | 1 | 86 |
| 10 | 2 | 24 | 1 | −11 if condition A, −12 if condition B |
| 11 | 2 | 24 | 1 | 25 |
| 12 | 2 | 48 | 1 | −11 if condition A, −12 if condition B |
| 13 | 2 | 48 | 1 | 49 |
| 14 | 2 | 96 | 1 | −11 if condition A, −12 if condition B |
| 15 | 2 | 96 | 1 | 97 |

In yet another embodiment, if the combination of {SS_SCS, RMSI_SCS} as {480 kHz, 960 kHz} is supported, and SS raster is 240 RBs in SS_SCS (e.g., the minimum carrier BW is 1600 MHz), TABLE 23 (or a subset of the configurations in the table) can be utilized to indicate the CORESET configuration, where condition A and condition B refer to k_SSB=0 and k_SSB>0, respectively.

TABLE 23

Subset of configuration

| Index | Multiplexing Pattern | CORESET BW (RBs) | Number of Symbols | Offset (RBs) |
|---|---|---|---|---|
| 0 | 1 | 24 | 2 | 0 |
| 1 | 1 | 24 | 2 | 14 |
| 2 | 1 | 48 | 1 | 0 |
| 3 | 1 | 48 | 1 | 38 |
| 4 | 1 | 48 | 2 | 0 |
| 5 | 1 | 48 | 2 | 38 |
| 6 | 1 | 96 | 1 | 0 |
| 7 | 1 | 96 | 1 | 28 |
| 8 | 1 | 96 | 1 | 58 |
| 9 | 1 | 96 | 1 | 86 |
| 10 | 2 | 24 | 1 | −11 if condition A, −12 if condition B |
| 11 | 2 | 24 | 1 | 25 |
| 12 | 2 | 48 | 1 | −11 if condition A, −12 if condition B |
| 13 | 2 | 48 | 1 | 49 |
| 14 | 2 | 96 | 1 | −11 if condition A, −12 if condition B |
| 15 | 2 | 96 | 1 | 97 |

In yet another embodiment, if the combination of {SS_SCS, RMSI_SCS} as {480 kHz, 960 kHz} is supported, and SS raster is 324 RBs or 312 RBs in SS_SCS (e.g., the minimum carrier BW is 2160 MHz), TABLE 24 (or a subset of the configurations in the table) can be utilized to indicate the CORESET configuration, where condition A and condition B refer to k_SSB=0 and k_SSB>0, respectively.

TABLE 24

Subset of configuration

| Index | Multiplexing Pattern | CORESET BW (RBs) | Number of Symbols | Offset (RBs) |
|---|---|---|---|---|
| 0 | 1 | 24 | 2 | 0 |
| 1 | 1 | 24 | 2 | 14 |
| 2 | 1 | 48 | 1 | 0 |
| 3 | 1 | 48 | 1 | 38 |
| 4 | 1 | 96 | 1 | 0 |
| 5 | 1 | 96 | 1 | 22 |
| 6 | 1 | 96 | 1 | 43 |
| 7 | 1 | 96 | 1 | 64 |
| 8 | 1 | 96 | 1 | 86 |
| 9 | 2 | 24 | 1 | −11 if condition A, −12 if condition B |
| 10 | 2 | 24 | 1 | 25 |
| 11 | 2 | 48 | 1 | −11 if condition A, −12 if condition B |
| 12 | 2 | 48 | 1 | 49 |
| 13 | 2 | 96 | 1 | −11 if condition A, −12 if condition B |
| 14 | 2 | 96 | 1 | 97 |
| 15 | | | | Reserved |

In NR, the other 4 bits of the field in MIB, i.e., pdcch-ConfigSIB1, is utilized to indicate the search space configuration of the PDCCH of RMSI, where the configurations are determined based on multiplexing pattern, and the configuration on the SFN, slot, and symbol that the search space locates is specified.

In one embodiment, if the maximum number of SS/PBCH blocks can be 128 and the associated SCS can be 240 kHz, the total transmission duration of the burst set cannot be confined within 2.5 ms within the half frame, such that the configuration of 2.5 ms or 7.5 ms group offset (value O in the tables) in multiplexing pattern 1 cannot be utilized for NR HFR. For example, the configuration table of parameters for PDCCH monitoring occasions can be as in TABLE 25, wherein O and M are parameters used for calculating the SFN and slot of the PDCCH monitoring occasions, i is the SS/PBCH block index, and l is the number of symbols for CORESET.

TABLE 25

Configuration table of parameters for PDCCH monitoring occasions

| Index | O | Number of search space sets per slot | M | First symbol index of search space |
|---|---|---|---|---|
| 0 | 0 | 1 | 1 | 0 |
| 1 | 0 | 2 | 1/2 | {0, if i is even}, {7, if i is odd} |
| 2 | 0 | 2 | 1/2 | {0, if i is even}, {1, if i is odd} |
| 3 | 0 | 1 | 2 | 0 |
| 4 | 5 | 1 | 1 | 0 |
| 5 | 5 | 2 | 1/2 | {0, if i is even}, {7, if i is odd} |
| 6 | 5 | 2 | 1/2 | {0, if i is even}, {1, if i is odd} |
| 7 | 5 | 1 | 2 | 0 |
| 8 | | | | Reserved |
| 9 | | | | Reserved |
| 10 | | | | Reserved |
| 11 | | | | Reserved |
| 12 | | | | Reserved |
| 13 | | | | Reserved |
| 14 | | | | Reserved |
| 15 | | | | Reserved |

In another embodiment, if the maximum number of SS/PBCH blocks can be 128 and the associated SCS can be 480 kHz, or the maximum number of SS/PBCH blocks can be 256 and the associated SCS can be 960 kHz (as discussed in Component II), the total transmission duration of the burst set can be confined within 2.5 ms within the half frame, and the same configuration table as FR2 for multiplexing pattern 1 can be reused for NR FHR.

In another embodiment, if the maximum number of SS/PBCH blocks can be 64 and the associated SCS can be 480 kHz, or the maximum number of SS/PBCH blocks can be 128 and the associated SCS can be 960 kHz (as discussed in Component II), the total transmission duration of the burst set can be confined within 1.25 ms within the half frame, then the configuration of group offset (value O in the tables) in multiplexing pattern 1 can be changed to 1.25 and 6.25. For example, the configuration table of parameters for PDCCH monitoring occasions can be as in TABLE 26, wherein O and M are parameters used for calculating the SFN and slot of the PDCCH monitoring occasions, i is the SS/PBCH block index, and l is the number of symbols for CORESET.

TABLE 26

Configuration table of parameters for PDCCH monitoring occasions

| Index | O | Number of search space sets per slot | M | First symbol index of search space |
|---|---|---|---|---|
| 0 | 0 | 1 | 1 | 0 |
| 1 | 0 | 2 | 1/2 | {0, if i is even}, {7, if i is odd} |
| 2 | 0 | 2 | 1/2 | {0, if i is even}, {1, if i is odd} |
| 3 | 0 | 1 | 2 | 0 |
| 4 | 5 | 1 | 1 | 0 |
| 5 | 5 | 2 | 1/2 | {0, if i is even}, {7, if i is odd} |
| 6 | 5 | 2 | 1/2 | {0, if i is even}, {1, if i is odd} |
| 7 | 5 | 1 | 2 | 0 |
| 8 | 1.25 | 1 | 1 | 0 |
| 9 | 1.25 | 2 | 1/2 | {0, if i is even}, {7, if i is odd} |
| 10 | 1.25 | 2 | 1/2 | {0, if i is even}, {1, if i is odd} |
| 11 | 1.25 | 1 | 2 | 0 |
| 12 | 6.25 | 1 | 1 | 0 |
| 13 | 6.25 | 2 | 1/2 | {0, if i is even}, {7, if i is odd} |
| 14 | 6.25 | 2 | 1/2 | {0, if i is even}, {1, if i is odd} |
| 15 | 6.25 | 1 | 2 | 0 |

In another embodiment, if the maximum number of SS/PBCH blocks can be 64 and the associated SCS can be 960 kHz, the total transmission duration of the burst set can be confined within 0.625 ms within the half frame, then the configuration of group offset (value O in the tables) in multiplexing pattern 1 can be changed to 0.625 and 5.625. For example, the configuration table of parameters for PDCCH monitoring occasions can be as in TABLE 27, wherein O and M are parameters used for calculating the SFN and slot of the PDCCH monitoring occasions, i is the SS/PBCH block index, and l is the number of symbols for CORESET.

TABLE 27

Configuration table of parameters for PDCCH monitoring occasions

| Index | O | Number of search space sets per slot | M | First symbol index of search space |
|---|---|---|---|---|
| 0 | 0 | 1 | 1 | 0 |
| 1 | 0 | 2 | 1/2 | {0, if i is even}, {7, if i is odd} |
| 2 | 0 | 2 | 1/2 | {0, if i is even}, {1, if i is odd} |
| 3 | 0 | 1 | 2 | 0 |
| 4 | 5 | 1 | 1 | 0 |
| 5 | 5 | 2 | 1/2 | {0, if i is even}, {7, if i is odd} |
| 6 | 5 | 2 | 1/2 | {0, if i is even}, {1, if i is odd} |
| 7 | 5 | 1 | 2 | 0 |
| 8 | 0.625 | 1 | 1 | 0 |
| 9 | 0.625 | 2 | 1/2 | {0, if i is even}, {7, if i is odd} |
| 10 | 0.625 | 2 | 1/2 | {0, if i is even}, {1, if i is odd} |
| 11 | 0.625 | 1 | 2 | 0 |
| 12 | 5.625 | 1 | 1 | 0 |
| 13 | 5.625 | 2 | 1/2 | {0, if i is even}, {7, if i is odd} |
| 14 | 5.625 | 2 | 1/2 | {0, if i is even}, {1, if i is odd} |
| 15 | 5.625 | 1 | 2 | 0 |

In one embodiment, for multiplexing 2 and 3, the SFN, slot, and starting symbol of the search space can be determined in a similar way as in FR2, wherein the particular value of the starting symbol for NR HFR may depend on own mapping pattern of SS/PBCH block.

The present disclosure supports 60 kHz SCS of SS/PBCH block, and/or RMSI/OSI/paging, and/or RACH, for carrier frequency range below 7 GHz in NR unlicensed spectrum, and the related design aspects may at least include the following: maximum number of SS/PBCH blocks with 60 kHz SCS; mapping pattern of SS/PBCH blocks with 60 kHz SCS within a half frame; common subcarrier spacing indication in PBCH; SS/PBCH block index indication; subcarrier offset indication in PBCH; CORESET configuration indication in PBCH; search space configuration indication in PBCH; NRU band indication in PBCH; PRACH formats and configurations with 60 kHz SCS; and/or SS/PBCH block for non-standalone mode.

In NR, for carrier frequency range 0 GHz to 3 GHz, the maximum number of SS/PBCH block within a burst set is 4, where the candidate SCS for SS/PBCH block can be 15 kHz, and can also be 30 kHz only for the NR-LTE coexistence bands (e.g., n5 and n66); for carrier frequency range 3 GHz to 6 GHz, the maximum number of SS/PBCH block within a burst set is 8, where the candidate SCS for SS/PBCH block can be 15 kHz or 30 kHz; for carrier frequency range 6 GHz to 52.6 GHz, the maximum number of SS/PBCH block within a burst set is 64, where the candidate SCS for SS/PBCH block can be 120 kHz or 240 kHz.

In one embodiment, for NRU-sub7 or a sub-division of the carrier frequency range of NRU-sub7, the choice of SCS for SS/PBCH block can be determined by guaranteeing the performance against carrier frequency offset (CFO) (e.g. maximum 5 ppm) in initial cell search, and the maximum number of SS/PBCH block within a burst set can be determined by maintaining similar time-domain overhead ratio within a half frame as the ones already supported in other NR carrier frequency ranges, for the determined SCS for SS/PBCH block.

One example of this embodiment is illustrated in TABLE 28, where the maximum number of SS/PBCH blocks is determined as 16 and the maximum SCS for SS/PBCH block is determined as 60 kHz. For a given NRU-sub7 band, at least one of the following sub-embodiments can be applied (e.g. different sub-embodiment or same sub-embodiment with different SCS value(s) can be applied to different bands in NRU-sub7).

In one example, dual SCSs for SS/PBCH block can be supported for a given NRU-sub7 band, and the UE may need to blindly detect the SCS in initial cell search, wherein the dual SCSs can be e.g. 60 kHz and 30 kHz.

In another example, single SCS for SS/PBCH block can be supported for a given NRU-sub7 band, wherein the single SCS can be either 30 kHz or 60 kHz. For example, 60 kHz is the only SCS for SS/PBCH block for 5 GHz unlicensed band and 6 GHz unlicensed band, and the maximum number of SS/PBCH blocks is 16.

TABLE 28

| Carrier Frequency Range | Maximum # of SS/PBCH Blocks | Max SCS for SS/PBCH | Max CFO | Time-domain Ratio* |
| --- | --- | --- | --- | --- |
| 0-3 GHz FR1 | 4 | 15 kHz** | 15 kHz | 22.8% |
| 3-6 GHz FR1 | 8 | 30 kHz | 30 kHz | 22.8% |
| 6-52.6 GHz FR1 | 64 | 240 kHz | 263 kHz | 22.8% |
| NRU-sub7 | 16 | 60 kHz | 30 kHz | 22.8% |

*Time-domain ratio is defined as the duration of transmitting all SS/PBCH blocks within a burst set divided by a half frame
**30 kHz for 0-3 GHz is only applied to coexistence bands, and SS/PBCH block exceeds min carrier bandwidth of 5 MHz If the maximum number of SS/PBCH blocks is 16, the indication of actual transmitted SS/PBCH blocks in RMSI can be a 16-bit full bitmap for the NRU-sub7 band, e.g. higher layer parameter SSB-transmitted-SIB1 can be a 16-bit full bitmap for the NRU-sub7 band with maximum number of SS/PBCH blocks as 16. A UE may assume the i-th SS/PBCH block within the half frame is actually transmitted, if the corresponding i-th bit in the bitmap takes the value of 1 and may assume the i-th SS/PBCH block within the half frame is not actually transmitted, if the corresponding i-th bit in the bitmap takes the value of 0.

If the maximum number of SS/PBCH blocks is 16, the indication of actual transmitted SS/PBCH blocks in RRC can be a 16-bit full bitmap for the NRU-sub7 band, e.g., higher layer parameter SSB-transmitted can be a 16-bit full bitmap for the NRU-sub7 band with maximum number of SS/PBCH blocks as 16. A UE may assume the i-th SS/PBCH block within the half frame is actually transmitted, if the corresponding i-th bit in the bitmap takes the value of 1 and may assume the i-th SS/PBCH block within the half frame is not actually transmitted, if the corresponding i-th bit in the bitmap takes the value of 0.

In another embodiment, for NRU-sub7 or a sub-division of the carrier frequency range of NRU-sub7, the choice of SCS for SS/PBCH block can be determined by guaranteeing the performance against carrier frequency offset (CFO) (e.g. maximum 5 ppm) in initial cell search, but the maximum number of SS/PBCH blocks maintains the same as NR FR1. For example, the maximum number of SS/PBCH blocks is determined as 8 and the maximum SCS for SS/PBCH block can be 60 kHz. For a given NRU-sub7 band, at least one of the following sub-embodiments can be applied (e.g. different sub-embodiment or same sub-embodiment with different SCS value(s) can be applied to different bands in NRU-sub7).

In one example, dual SCSs for SS/PBCH block can be supported for a given NRU-sub7 band, and the UE may need to blindly detect the SCS in initial cell search, wherein the dual SCSs can be e.g. 60 kHz and 30 kHz. For example, 60 kHz and 30 kHz are both supported SCSs for SS/PBCH block for 5 GHz unlicensed band and 6 GHz unlicensed band, and the maximum number of SS/PBCH blocks is 8.

In another example, a single SCS for SS/PBCH block can be supported for a given NRU-sub7 band, wherein the single SCS can be either 60 kHz or 30 kHz. For example, 60 kHz is the only SCS for SS/PBCH block for 5 GHz unlicensed band and 6 GHz unlicensed band, and the maximum number of SS/PBCH blocks is 8.

In yet another embodiment, for NRU-sub7 or a sub-division of the carrier frequency range of NRU-sub7, the choice of SCS for SS/PBCH block can be determined by guaranteeing the performance against carrier frequency offset (CFO) (e.g., maximum 5 ppm) in an initial cell search, but the maximum number of SS/PBCH blocks is reduced from NR FR1. For example, the maximum number of SS/PBCH blocks is determined as 4 and the maximum SCS for SS/PBCH block can be 60 kHz. For a given NRU-sub7 band, at least one of the following sub-embodiments can be applied (e.g. different sub-embodiment or same sub-embodiment with different SCS value(s) can be applied to different bands in NRU-sub7).

In one example, dual SCSs for SS/PBCH block can be supported for a given NRU-sub7 band, and the UE may need to blindly detect the SCS in initial cell search, wherein the dual SCSs can be 60 kHz and 30 kHz. For example, 60 kHz and 30 kHz are both supported SCSs for SS/PBCH block for 5 GHz unlicensed band and 6 GHz unlicensed band, and the maximum number of SS/PBCH blocks is 4.

In another example, a single SCS for SS/PBCH block can be supported for a given NRU-sub7 band, wherein the single SCS can be either 60 kHz or 30 kHz. For example, 60 kHz is the only SCS for SS/PBCH block for 5 GHz unlicensed band and 6 GHz unlicensed band, and the maximum number of SS/PBCH blocks is 4.

The mapping pattern of SS/PBCH blocks can be designed with respect to a reference SCS (e.g., the reference SCS can be the one utilized for data transmission) such that the symbols mapped for control channels (e.g., PDCCH and/or PUCCH) and/or gap can be reserved (e.g. not mapped for SS/PBCH blocks) with respect to the reference SCS.

Figure 24:
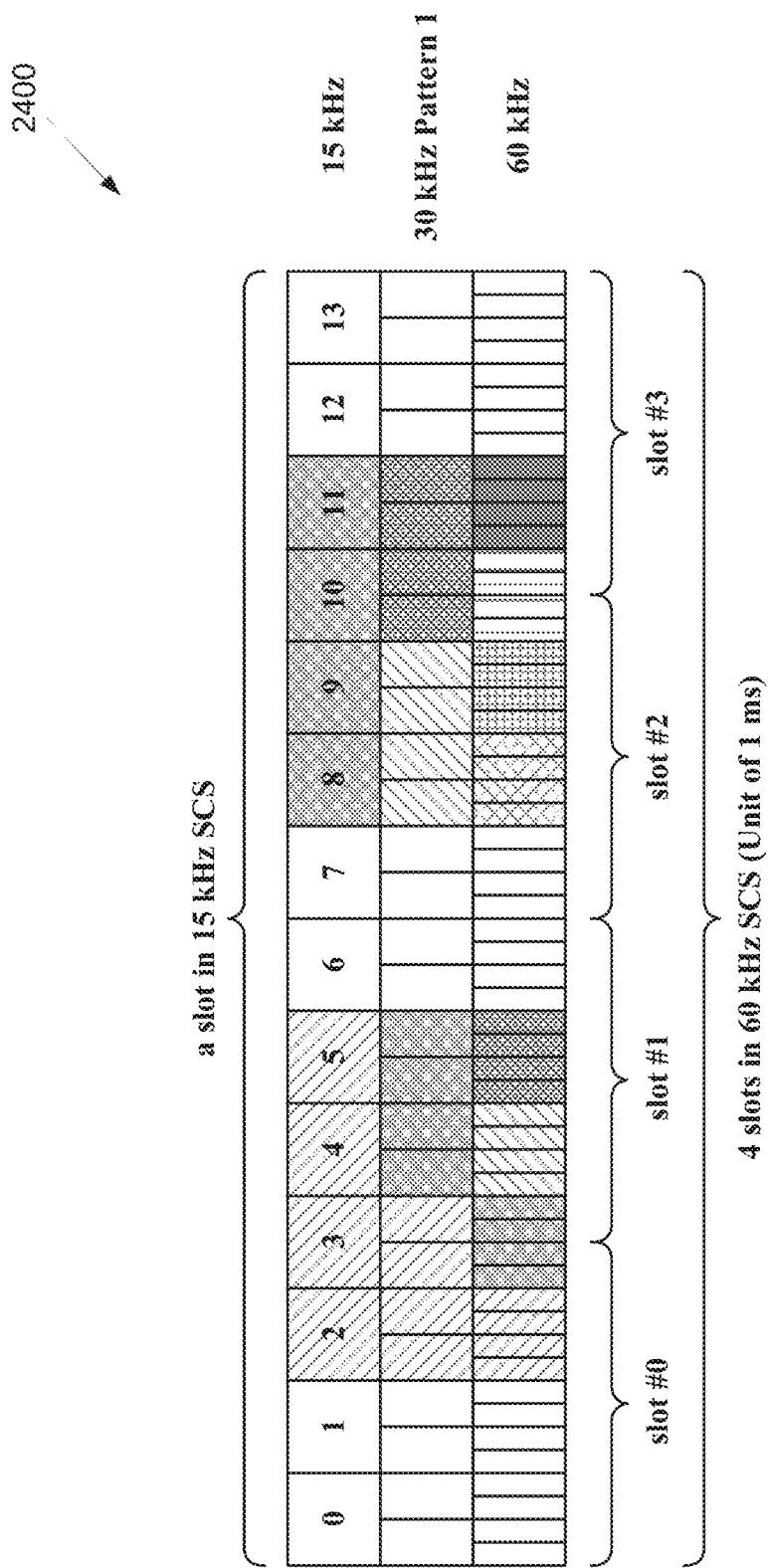
FIG. 24 illustrates yet another example mapping design according to embodiments of the present disclosure.

FIG. 24 illustrates yet another example mapping design 2400 according to embodiments of the present disclosure. The embodiment of the mapping design 2400 illustrated in FIG. 24 is for illustration only. FIG. 24 does not limit the scope of this disclosure to any particular implementation.

At least one of mapping patterns can be utilized for the mapping of SS/PBCH blocks with 60 kHz (including multiple patterns are supported simultaneously for NRU-sub7).

In one embodiment, if using 15 kHz or 30 kHz Pattern 1 as the reference SCS to design the mapping pattern of SS/PBCH blocks, the first two symbols (e.g. #0 and #1) as well the last two symbols (e.g. #12 and #13) with respect to the reference SCS of 15 kHz can be reserved. An example of this mapping design is illustrated in FIG. 24, and the mapping pattern can be determined as in the following examples.

In one example, for SCS of SS/PBCH block being 60 kHz, the first symbols of the candidate SS/PBCH blocks have indexes {8, 12, 16, 20, 32, 36, 40, 44} within every design unit of 56 symbols (e.g. 4 slots with total duration of 1 ms), if L=8 or 16.

In another example, for SCS of SS/PBCH block being 60 kHz, the first symbols of the candidate SS/PBCH blocks have indexes {8, 12, 16, 20} within every design unit of 56 symbols (e.g. 4 slots with total duration of 1 ms), if L=4.

Figure 25:
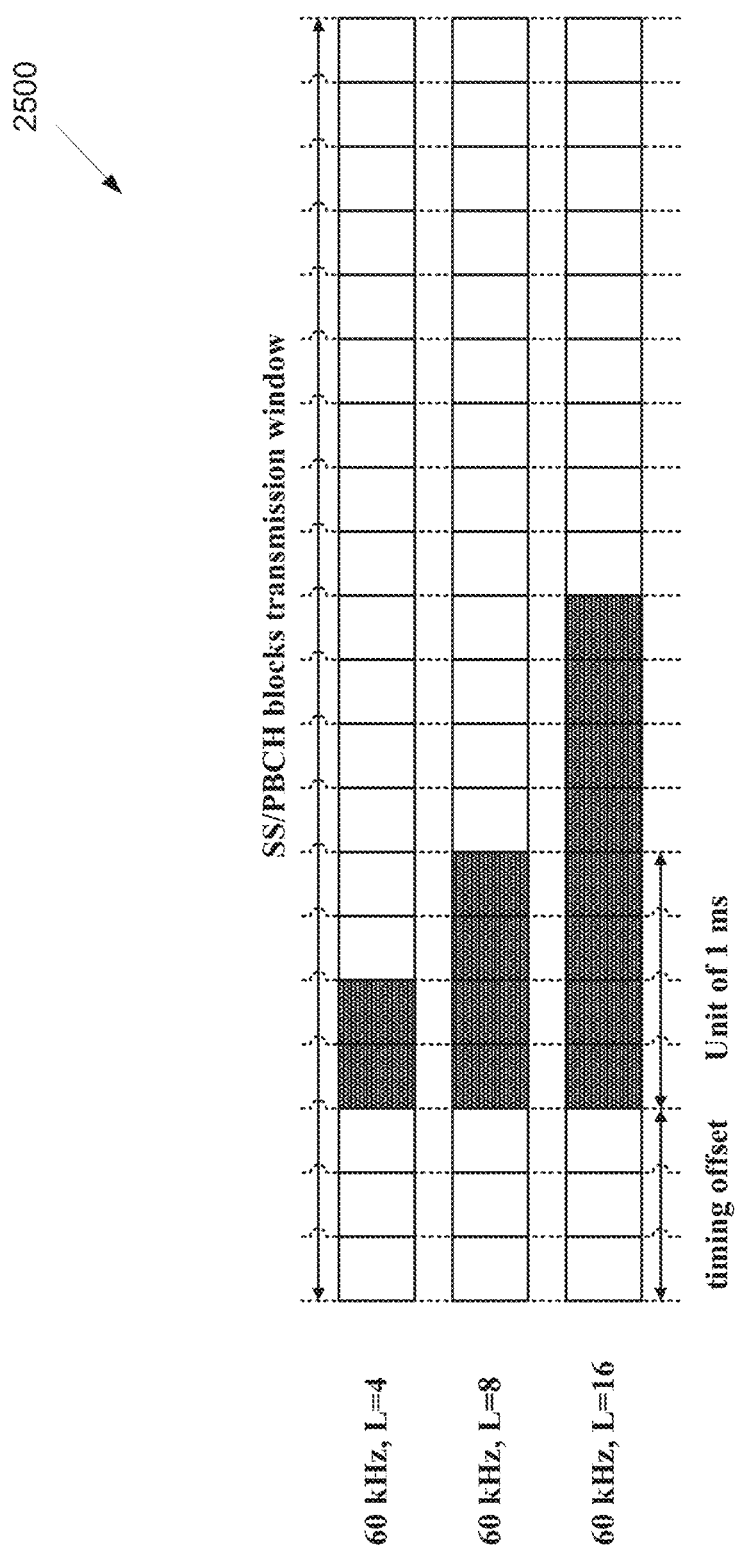
FIG. 25 illustrates yet another example mapping design according to embodiments of the present disclosure.

FIG. 25 illustrates yet another example mapping design 2500 according to embodiments of the present disclosure. The embodiment of the mapping design 2500 illustrated in FIG. 25 is for illustration only. FIG. 25 does not limit the scope of this disclosure to any particular implementation.

The mapping of the design unit, 1 ms as a slot of 15 kHz SCS as the reference SCS, into the transmission window of SS/PBCH blocks can be determined as in FIG. 25 (L is maximum number of SS/PBCH blocks in the figure), wherein the indexes of the design unit that contains the mapping pattern as illustrated in FIG. 24 are given as in the following examples.

In one example, for SCS of SS/PBCH block being 60 kHz and maximum number of SS/PBCH blocks being 4 or 8, the indexes of design units of 1 ms with a half frame are given by O+{0}, where O is the timing offset within the SS/PBCH blocks transmission window due to LBT.

In another example, for SCS of SS/PBCH block being 60 kHz and maximum number of SS/PBCH blocks being 16, the indexes of design units of 1 ms with a half frame are given by O+{0, 1}, where O is the timing offset within the SS/PBCH blocks transmission window due to LBT.

Combing the above design aspects together, the following examples of mapping pattern for SS/PBCH blocks can be obtained (symbol index 0 is the symbol 0 of the first slot of the half frame).

In one example, for a NRU-sub7 band, if 60 kHz SCS of SS/PBCH blocks is supported for a given NRU-sub7 band, and the maximum number of SS/PBCH blocks is 4 within a burst set, the first symbols of the 4 candidate SS/PBCH blocks within a half frame can have indexes {8, 12, 16, 20}+56*N_unit, where N_unit=O, and O is the timing offset within the SS/PBCH blocks transmission window due to LBT.

In another example, for a NRU-sub7 band, if 60 kHz SCS of SS/PBCH blocks is supported for a given NRU-sub7 band, and the maximum number of SS/PBCH blocks is 8 within a burst set, the first symbols of the 8 candidate SS/PBCH blocks within a half frame can have indexes {8, 12, 16, 20, 32, 36, 40, 44}+56*N_unit, where N_unit=O, and O is the timing offset within the SS/PBCH blocks transmission window due to LBT.

In yet another example, for a NRU-sub7 band, if 60 kHz SCS of SS/PBCH blocks is supported for a given NRU-sub7 band, and the maximum number of SS/PBCH blocks is 16 within a burst set, the first symbols of the 16 candidate SS/PBCH blocks within a half frame can have indexes {8, 12, 16, 20, 32, 36, 40, 44}+56*N_unit, where N_unit=O or O+1, and O is the timing offset within the SS/PBCH blocks transmission window due to LBT.

Figure 26:
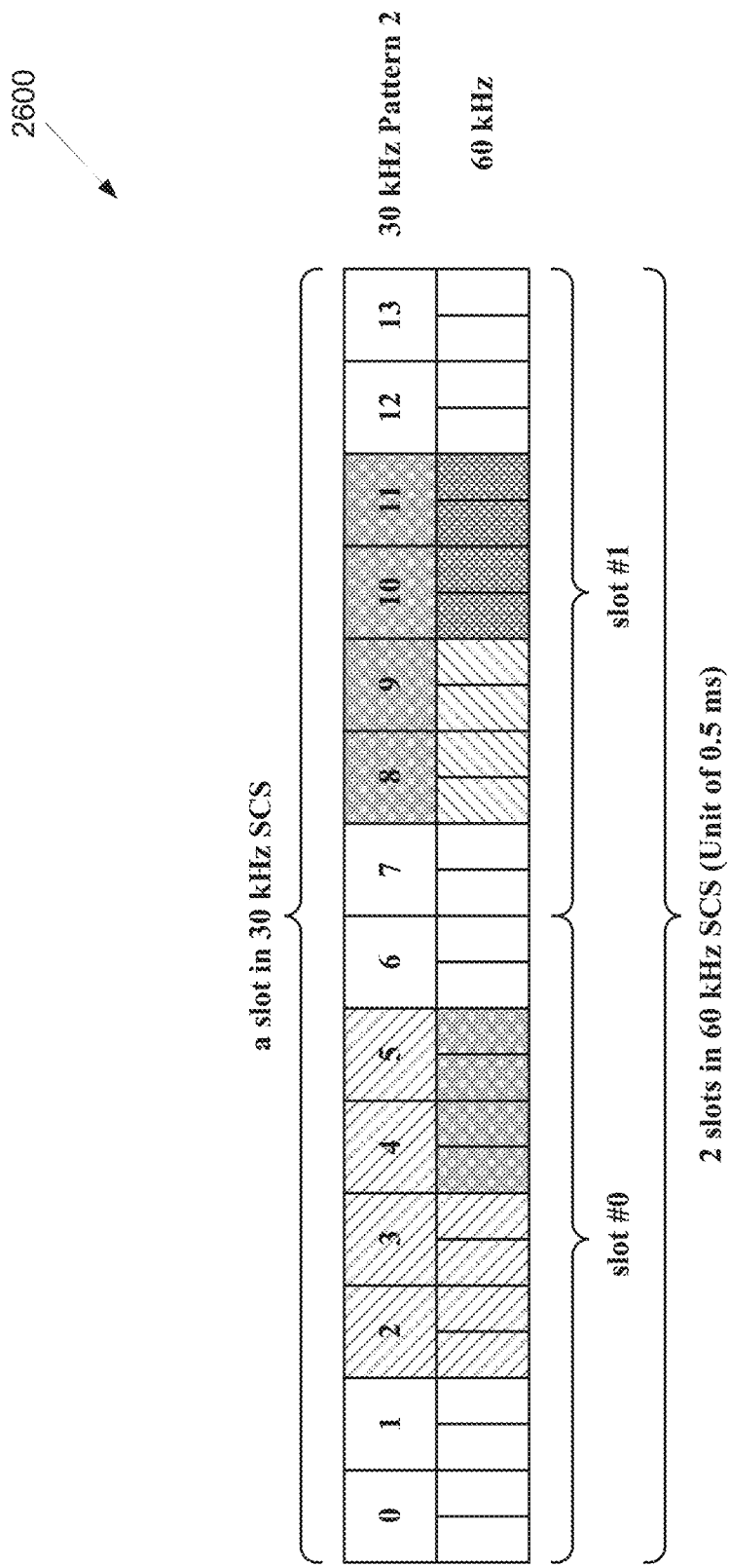
FIG. 26 illustrates yet another example mapping design according to embodiments of the present disclosure.

FIG. 26 illustrates yet another example mapping design 2600 according to embodiments of the present disclosure. The embodiment of the mapping design 2600 illustrated in FIG. 26 is for illustration only. FIG. 26 does not limit the scope of this disclosure to any particular implementation.

In another embodiment, if using 30 kHz Pattern 2 as the reference SCS to design the mapping pattern of SS/PBCH blocks, the first two symbols (e.g. #0 and #1) as well the last two symbols (e.g. #12 and #13) with respect to the reference SCS of 30 kHz can be reserved. An example of this mapping design is illustrated in FIG. 26, and mapping patterns are determined as in the following examples.

In one example, for SCS of SS/PBCH block being 60 kHz, the first symbols of the candidate SS/PBCH blocks have indexes {4, 8, 16, 20} within every design unit of 28 symbols (e.g. 2 slots with total duration of 0.5 ms).

Figure 27:
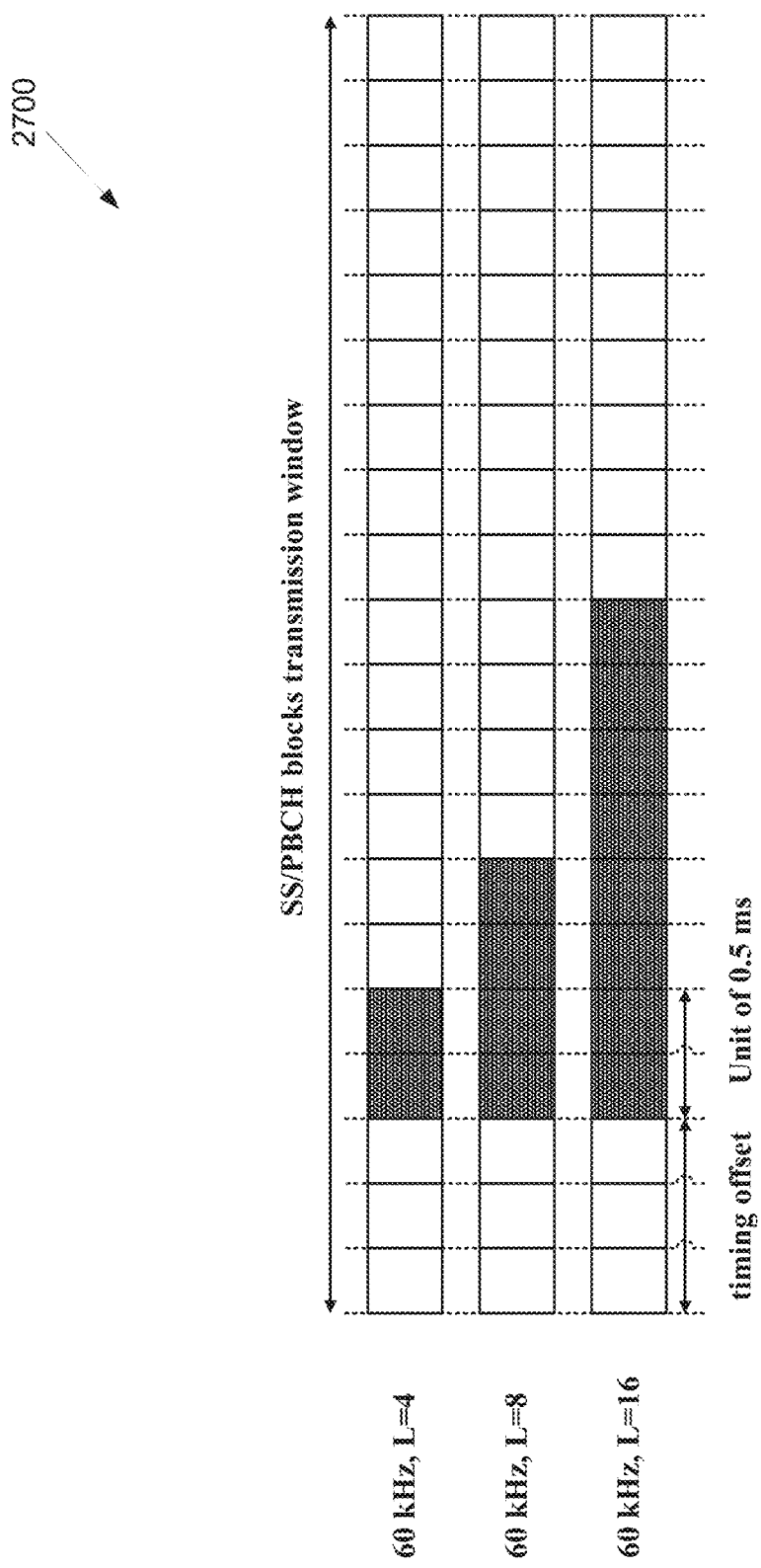
FIG. 27 illustrates yet another example mapping design according to embodiments of the present disclosure.

FIG. 27 illustrates yet another example mapping design 2700 according to embodiments of the present disclosure. The embodiment of the mapping design 2700 illustrated in FIG. 27 is for illustration only. FIG. 27 does not limit the scope of this disclosure to any particular implementation.

The mapping of the design unit, 0.5 ms as a slot of 30 kHz SCS as the reference SCS, into the transmission window of SS/PBCH blocks can be determined as illustrated in FIG. 27 (L is maximum number of SS/PBCH blocks in the figure), wherein the indexes of the design unit that contains the mapping pattern as illustrated in FIG. 26 are given as in the following examples.

In one example, for SCS of SS/PBCH block being 60 kHz and maximum number of SS/PBCH blocks being 4, the indexes of design units of 0.5 ms with a half frame are given by O+{0}, where O is the timing offset within the SS/PBCH blocks transmission window due to LBT.

In another example, for SCS of SS/PBCH block being 60 kHz and maximum number of SS/PBCH blocks being 8, the indexes of design units of 0.5 ms with a half frame are given by O+{0, 1}, where O is the timing offset within the SS/PBCH blocks transmission window due to LBT.

In yet another example, for SCS of SS/PBCH block being 60 kHz and maximum number of SS/PBCH blocks being 16, the indexes of design units of 0.5 ms with a half frame are given by O+{0, 1, 2, 3}, where O is the timing offset within the SS/PBCH blocks transmission window due to LBT.

Combing the design aspects together, the following examples of mapping pattern for SS/PBCH blocks can be obtained (symbol index 0 is the symbol 0 of the first slot of the half frame).

In one example, for a NRU-sub7 band, if 60 kHz SCS of SS/PBCH blocks is supported for a given NRU-sub7 band, and the maximum number of SS/PBCH blocks is 4 within a burst set, the first symbols of the 4 candidate SS/PBCH blocks within a half frame can have indexes {4, 8, 16, 20}+28*N_unit, where N_unit=O, and O is the timing offset within the SS/PBCH blocks transmission window due to LBT.

In another example, for a NRU-sub7 band, if 60 kHz SCS of SS/PBCH blocks is supported for a given NRU-sub7 band, and the maximum number of SS/PBCH blocks is 8 within a burst set, the first symbols of the 8 candidate SS/PBCH blocks within a half frame can have indexes {4, 8, 16, 20}+28*N_unit, where N_unit=O or O+1, and O is the timing offset within the SS/PBCH blocks transmission window due to LBT.

In yet another example, for a NRU-sub7 band, if 60 kHz SCS of SS/PBCH blocks is supported for a given NRU-sub7 band, and the maximum number of SS/PBCH blocks is 16 within a burst set, the first symbols of the 16 candidate SS/PBCH blocks within a half frame can have indexes {4, 8, 16, 20}+28*N_unit, where N_unit=0, O+1, O+2, or O+3, and O is the timing offset within the SS/PBCH blocks transmission window due to LBT.

In another embodiment, if using 60 kHz as the reference SCS and normal CP to design the mapping pattern of SS/PBCH blocks, e.g., the SCS of data and the SCS of SS/PBCH blocks are the same, the SS/PBCH blocks can be mapped to a unit of 0.25 ms (1 slot of 60 kHz SCS).

Figure 28:
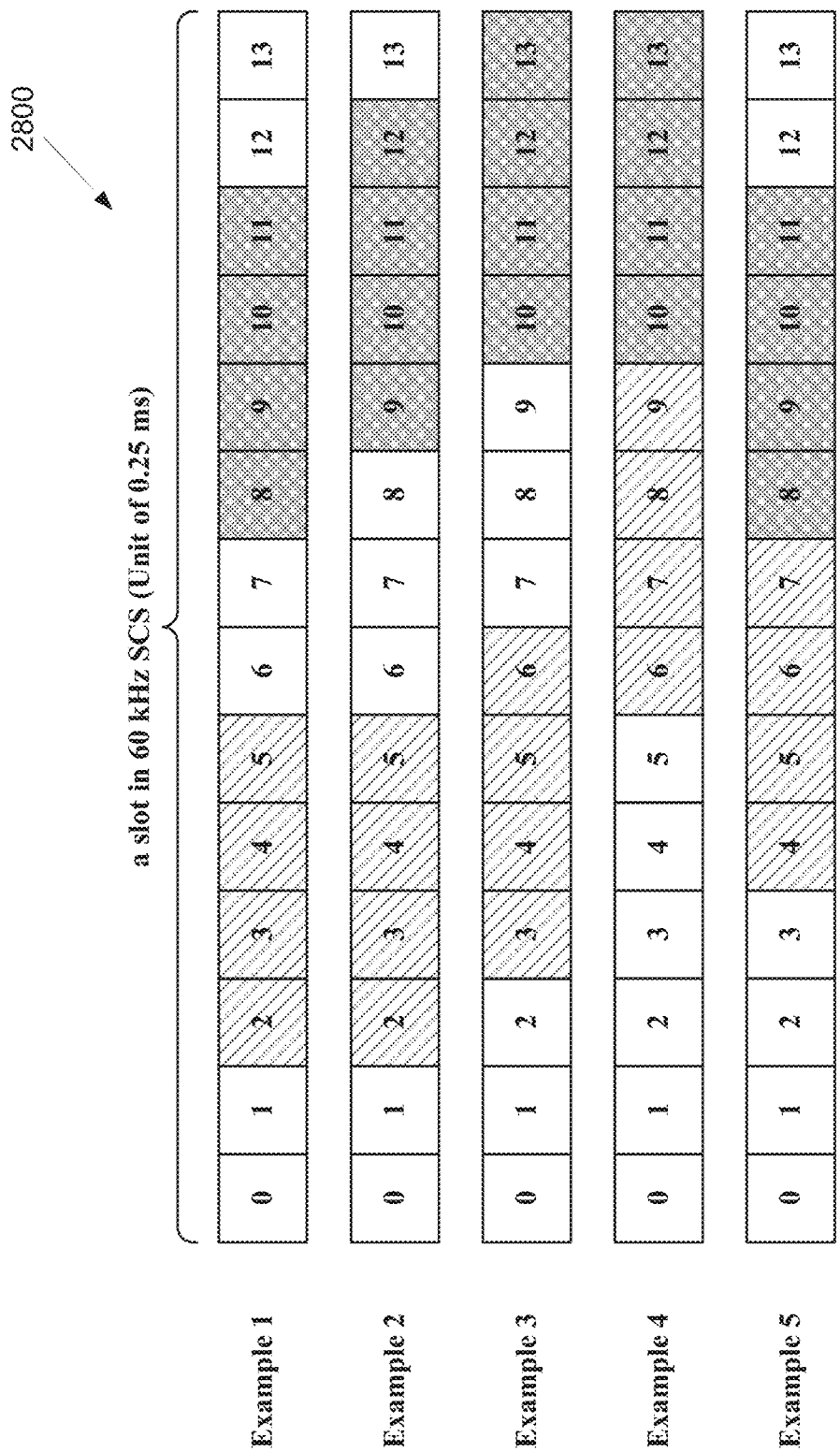
FIG. 28 illustrates yet another example mapping design according to embodiments of the present disclosure.

FIG. 28 illustrates yet another example mapping design 2800 according to embodiments of the present disclosure. The embodiment of the mapping design 2800 illustrated in FIG. 28 is for illustration only. FIG. 28 does not limit the scope of this disclosure to any particular implementation.

In one example (e.g., example 1 in FIG. 28), the first two symbols (e.g. #0 and #1) and last two symbols (e.g. #12 and #13) with respect to the reference SCS of 60 kHz can be reserved, and the first symbols of the candidate SS/PBCH blocks have indexes {2, 8} within every design unit of 14 symbols (e.g. 1 slot with total duration of 0.25 ms). The 2 symbols before each SS/PBCH block can be used for at least one of the following purpose: LBT, or multiplexing CORESET, and the 2 symbols at the end of the slot can be used for at least one of the following purpose: LBT for next slot, or transmitting configured CSI-RS.

In another example (e.g., example 2 in FIG. 28), the first symbols of the candidate SS/PBCH blocks have indexes {2, 9} within every design unit of 14 symbols (e.g. 1 slot with total duration of 0.25 ms). The 2 symbols before each SS/PBCH block can be used for at least one of the following purpose: LBT, or multiplexing CORESET, or transmitting configured CSI-RS. The mapping of two SS/PBCH blocks into the first half slot (first 7 symbols of the slot) and second half slot (second 7 symbols of the slot) is the same, such that same multiplexing pattern of SS/PBCH block with other signals (e.g. CRI-RS) and/or channels (e.g. PDCCH/PDSCH of RMAI/OSI/paging) can be the same for the first and second half slots.

In yet another example (e.g., example 3 in FIG. 28), the first symbols of the candidate SS/PBCH blocks have indexes {3, 10} within every design unit of 14 symbols (e.g. 1 slot with total duration of 0.25 ms). The 3 symbols before each SS/PBCH block can be used for at least one of the following purpose: LBT, or multiplexing CORESET, or transmitting configured CSI-RS. The mapping of two SS/PBCH blocks into the first half slot (first 7 symbols of the slot) and second half slot (second 7 symbols of the slot) is the same, such that same multiplexing pattern of SS/PBCH block with other signals (e.g. CRI-RS) and/or channels (e.g. PDCCH/PDSCH of RMAI/OSI/paging) can be the same for the first and second half slots.

In yet another example (e.g., example 4 in FIG. 28), the first symbols of the candidate SS/PBCH blocks have indexes {6, 10} within every design unit of 14 symbols (e.g. 1 slot with total duration of 0.25 ms). The first 6 symbols before SS/PBCH blocks can be used for at least one of the following purpose: LBT, or multiplexing CORESET, or transmitting configured CSI-RS.

In yet another example (e.g., example 5 in FIG. 28), the first symbols of the candidate SS/PBCH blocks have indexes {4, 8} within every design unit of 14 symbols (e.g. 1 slot with total duration of 0.25 ms). The first 4 symbols before SS/PBCH blocks can be used for at least one of the following purposes: LBT, or multiplexing CORESET, or transmitting configured CSI-RS, and the 2 symbols at the end of the slot can be used for at least one of the following purposes: LBT for next slot or transmitting configured CSI-RS.

Figure 29:
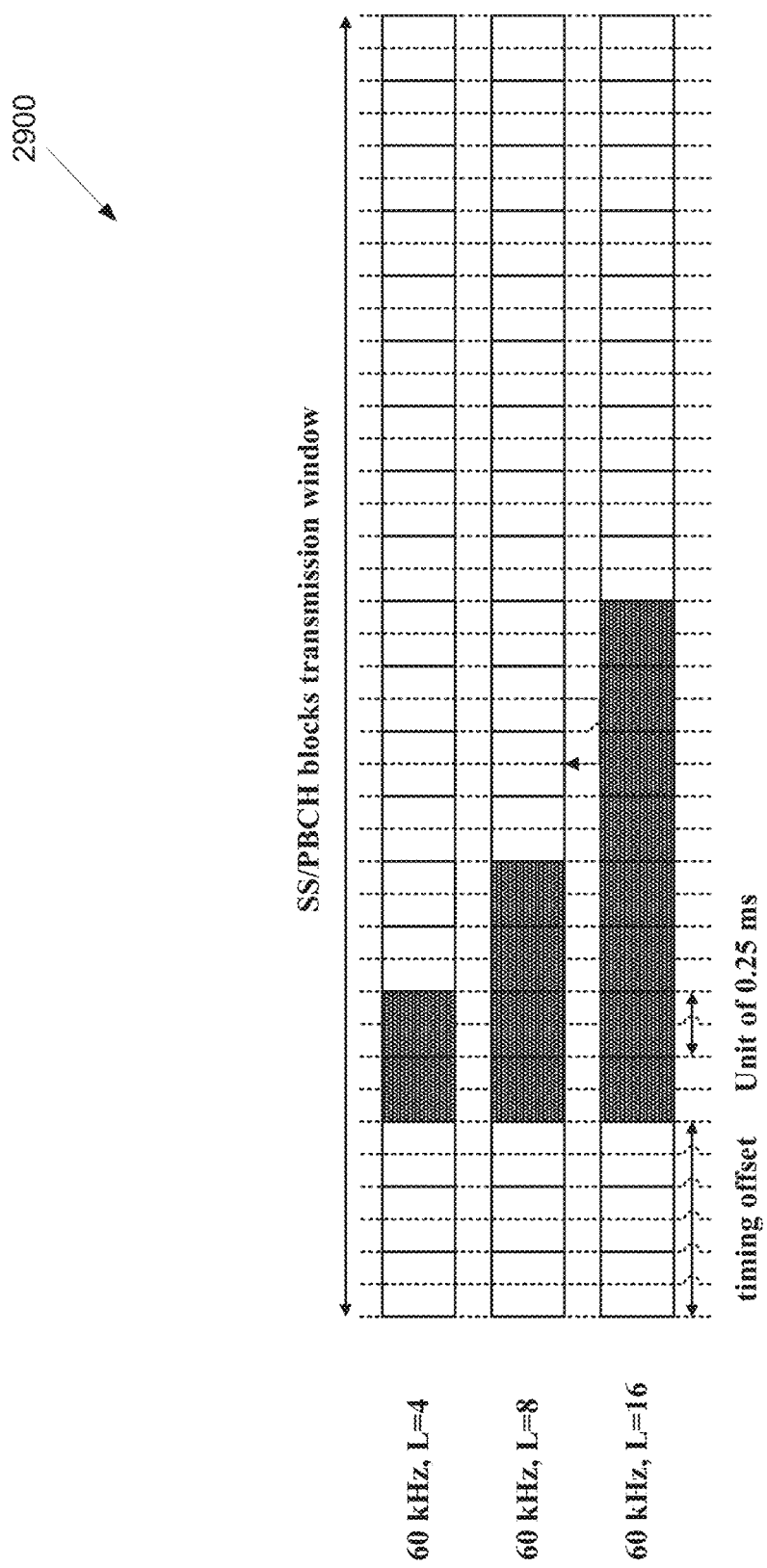
FIG. 29 illustrates an example a mapping pattern of SS/PBCH blocks according to embodiments of the present disclosure.

FIG. 29 illustrates an example a mapping pattern of SS/PBCH blocks 2900 according to embodiments of the present disclosure. The embodiment of the mapping pattern of SS/PBCH blocks 2900 illustrated in FIG. 29 is for illustration only. FIG. 29 does not limit the scope of this disclosure to any particular implementation.

The mapping of the design unit, 0.25 ms as a slot of 60 kHz SCS as the reference SCS, into the transmission window of SS/PBCH blocks can be determined as illustrated in FIG. 29 (L is maximum number of SS/PBCH blocks in the figure), wherein the indexes of the design unit that contains the mapping pattern given by examples as illustrated in FIG. 28 are given as in the following examples.

In one example, for SCS of SS/PBCH block being 60 kHz and maximum number of SS/PBCH blocks being 4, the indexes of design units of 0.25 ms with a half frame are given by O+{0, 1}, where O is the timing offset within the SS/PBCH blocks transmission window due to LBT.

In another example, for SCS of SS/PBCH block being 60 kHz and maximum number of SS/PBCH blocks being 8, the indexes of design units of 0.25 ms with a half frame are given by O+{0, 1, 2, 3}, where O is the timing offset within the SS/PBCH blocks transmission window due to LBT.

In yet another example, for SCS of SS/PBCH block being 60 kHz and maximum number of SS/PBCH blocks being 16, the indexes of design units of 0.25 ms with a half frame are given by O+{0, 1, 2, 3, 4, 5, 6, 7}, where O is the timing offset within the SS/PBCH blocks transmission window due to LBT.

In yet another embodiment, if using 60 kHz as the reference SCS to design the mapping pattern of SS/PBCH blocks, e.g., the SCS of data and the SCS of SS/PBCH blocks are the same, the SS/PBCH blocks can be mapped contiguously in time domain, e.g. to a unit of 0.5 ms (2 slot of 60 kHz SCS). For example, in general, the first symbols of the candidate SS/PBCH blocks have indexes {X, X+4, X+8, X+12} within every design unit of 28 symbols (e.g. 2 slots with total duration of 0.5 ms), wherein X is predefined.

Figure 30:
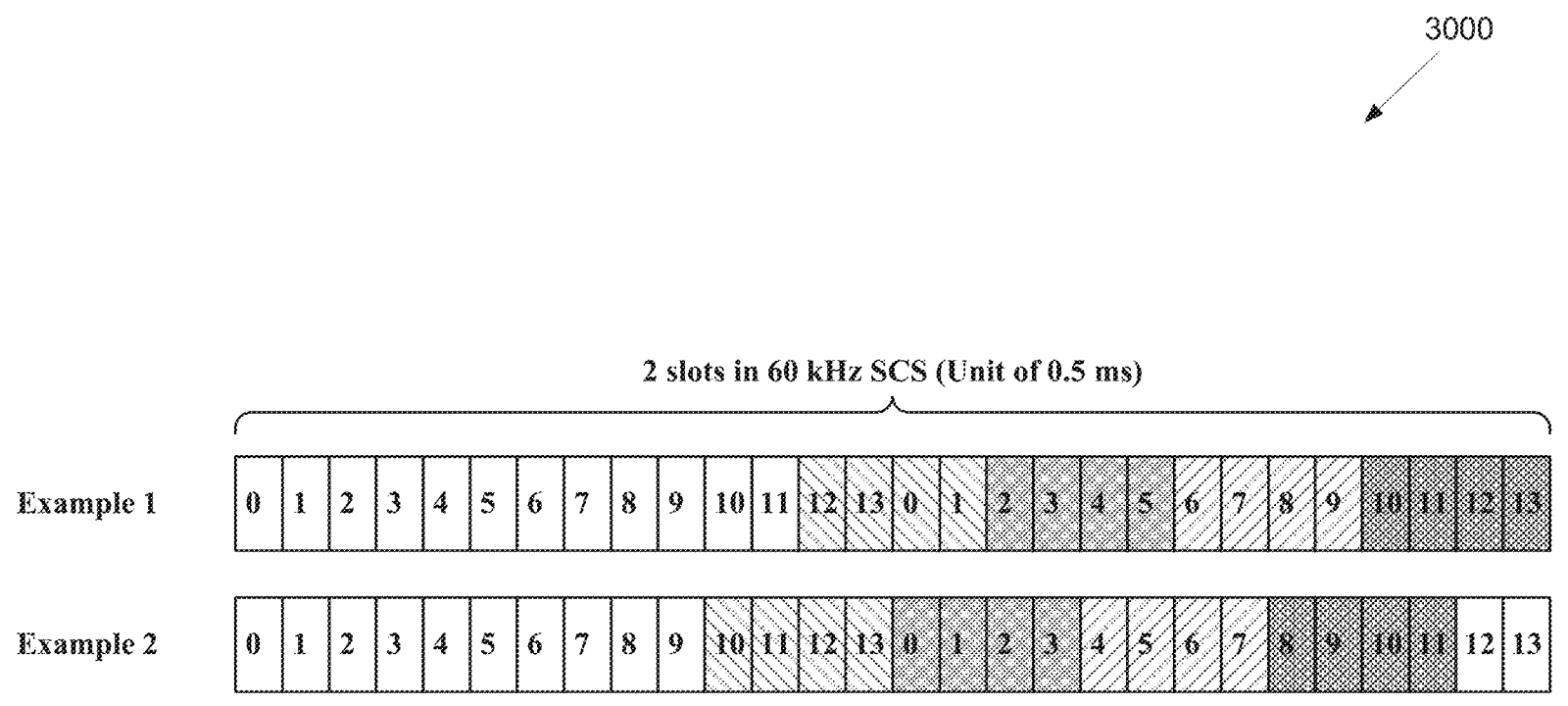

FIG. 30 illustrates another example a mapping pattern of SS/PBCH blocks 3000 according to embodiments of the present disclosure. The embodiment of the mapping pattern of SS/PBCH blocks 3000 illustrated in FIG. 30 is for illustration only. FIG. 30 does not limit the scope of this disclosure to any particular implementation.

In one example (e.g., example 1 in FIG. 30), the first symbols of the candidate SS/PBCH blocks have indexes {12, 16, 20, 24} within every design unit of 28 symbols (e.g. 2 slots with total duration of 0.5 ms). The 12 symbols before SS/PBCH blocks can be used for at least one of the following purpose: LBT, or multiplexing CORESET, or transmitting configured CSI-RS.

In another example (e.g., example 2 in FIG. 30), the first symbols of the candidate SS/PBCH blocks have indexes {10, 14, 18, 22} within every design unit of 28 symbols (e.g. 2 slots with total duration of 0.5 ms). The 10 symbols before SS/PBCH blocks can be used for at least one of the following purposes: LBT, or multiplexing CORESET, or transmitting configured CSI-RS, and the 2 symbols at the end of the slot can be used for at least one of the following purposes: LBT for next slot or transmitting configured CSI-RS.

The mapping of the design unit, 0.5 ms as 2 slots of 60 kHz SCS as the reference SCS, into the transmission window of SS/PBCH blocks can be determined as 0, wherein O is the timing offset within the SS/PBCH blocks transmission window due to LBT, and the indexes of the design unit contains the mapping pattern given by examples as illustrated in FIG. 30.

Figure 31:
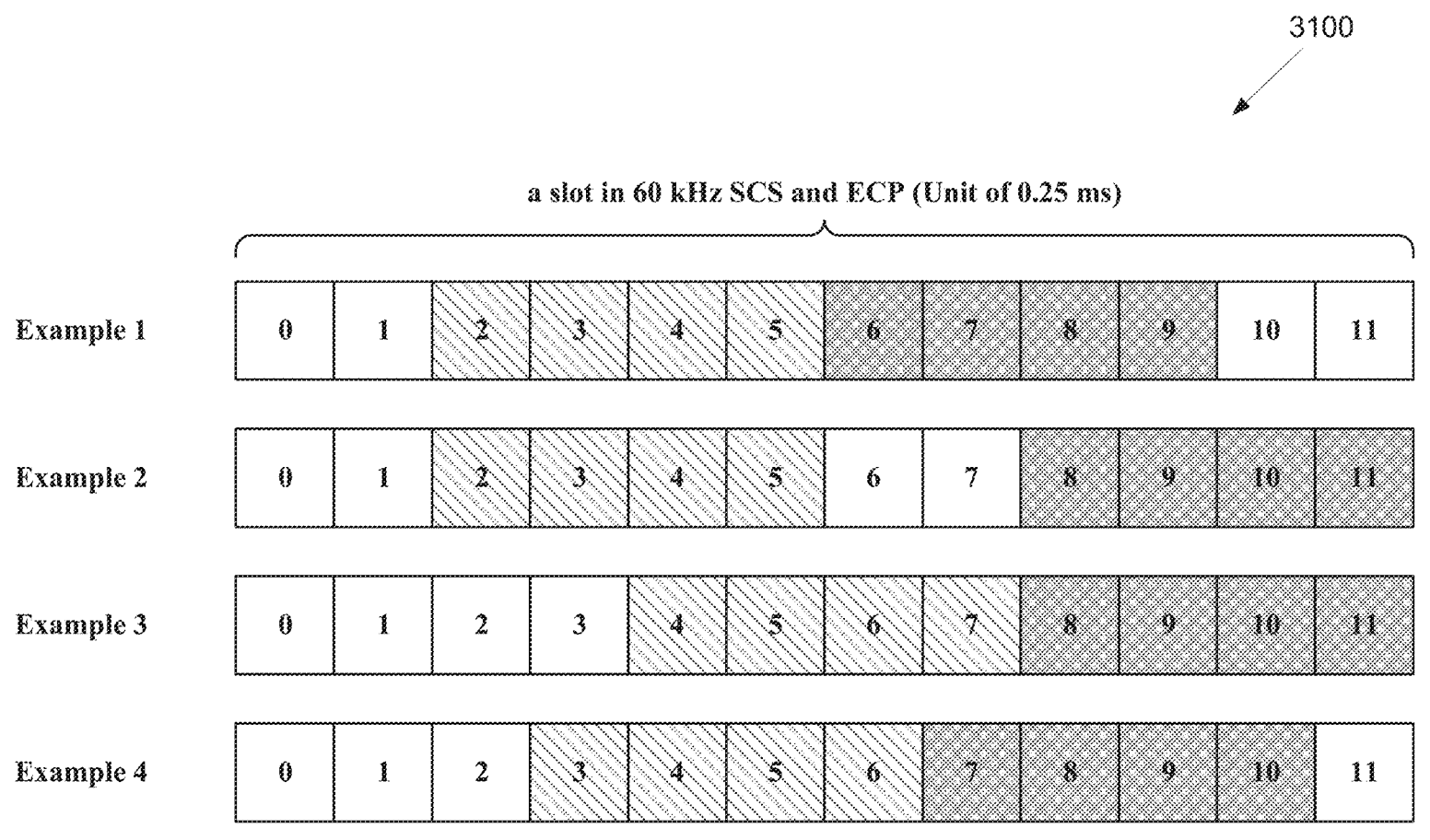

FIG. 31 illustrates yet another example a mapping pattern of SS/PBCH blocks 3100 according to embodiments of the present disclosure. The embodiment of the mapping pattern of SS/PBCH blocks 3100 illustrated in FIG. 31 is for illustration only. FIG. 31 does not limit the scope of this disclosure to any particular implementation.

In one example (e.g., example 1 in FIG. 31), the first two symbols (e.g. #0 and #1) and last two symbols (e.g. #10 and #11) with respect to the reference SCS of 60 kHz can be reserved, and the first symbols of the candidate SS/PBCH blocks have indexes {2, 6} within every design unit of 12 symbols (e.g. 1 slot with total duration of 0.25 ms). The 2 symbols before each SS/PBCH block can be used for at least one of the following purpose: LBT, or multiplexing CORESET, and the 2 symbols at the end of the slot can be used for at least one of the following purpose: LBT for next slot, or transmitting configured CSI-RS.

In another example (e.g., example 2 in FIG. 31), the first symbols of the candidate SS/PBCH blocks have indexes {2, 8} within every design unit of 12 symbols (e.g. 1 slot with total duration of 0.25 ms). The 2 symbols before each SS/PBCH block can be used for at least one of the following purpose: LBT, or multiplexing CORESET, or transmitting configured CSI-RS. The mapping of two SS/PBCH blocks into the first half slot (first 6 symbols of the slot) and second half slot (second 6 symbols of the slot) is the same, such that same multiplexing pattern of SS/PBCH block with other signals (e.g. CRI-RS) and/or channels (e.g. PDCCH/PDSCH of RMAI/OSI/paging) can be the same for the first and second half slots.

In another example (e.g., example 3 in FIG. 31), the first symbols of the candidate SS/PBCH blocks have indexes {4, 8} within every design unit of 12 symbols (e.g. 1 slot with total duration of 0.25 ms). The 4 symbols before each SS/PBCH block can be used for at least one of the following purpose: LBT, or multiplexing CORESET, or transmitting configured CSI-RS.

In another example (e.g., example 4 in FIG. 31), the first symbols of the candidate SS/PBCH blocks have indexes {3, 7} within every design unit of 12 symbols (e.g. 1 slot with total duration of 0.25 ms). The 3 symbols before each SS/PBCH block can be used for at least one of the following purposes: LBT, or multiplexing CORESET, or transmitting configured CSI-RS, and the 1 symbol at the end of the slot can be used for at least one of the following purposes: LBT for next slot or transmitting configured CSI-RS.

The mapping of the design unit, 0.25 ms as a slot of 60 kHz SCS as the reference SCS, into the transmission window of SS/PBCH blocks can be determined as in FIG. 29 (L is maximum number of SS/PBCH blocks in the figure), wherein the indexes of the design unit that contains the mapping pattern given by examples in FIG. 31 are given as in the following examples.

In one example, for SCS of SS/PBCH block being 60 kHz and maximum number of SS/PBCH blocks being 4, the indexes of design units of 0.25 ms with a half frame are given by O+{0, 1}, where O is the timing offset within the SS/PBCH blocks transmission window due to LBT.

In another example, for SCS of SS/PBCH block being 60 kHz and maximum number of SS/PBCH blocks being 8, the indexes of design units of 0.25 ms with a half frame are given by O+{0, 1, 2, 3}, where O is the timing offset within the SS/PBCH blocks transmission window due to LBT.

In yet another example, for SCS of SS/PBCH block being 60 kHz and maximum number of SS/PBCH blocks being 16, the indexes of design units of 0.25 ms with a half frame are given by O+{0, 1, 2, 3, 4, 5, 6, 7}, where O is the timing offset within the SS/PBCH blocks transmission window due to LBT.

In yet another embodiment, if using 60 kHz as the reference SCS and ECP to design the mapping pattern of SS/PBCH blocks, e.g., the SCS of data and the SCS of SS/PBCH blocks are the same, the SS/PBCH blocks can be mapped contiguously in time domain, e.g. to a unit of 0.5 ms (2 slot of 60 kHz SCS). For example, in general, the first symbols of the candidate SS/PBCH blocks have indexes {X, X+4, X+8, X+12} within every design unit of 24 symbols (e.g., 2 slots with total duration of 0.5 ms), wherein X is predefined.

Figure 32:
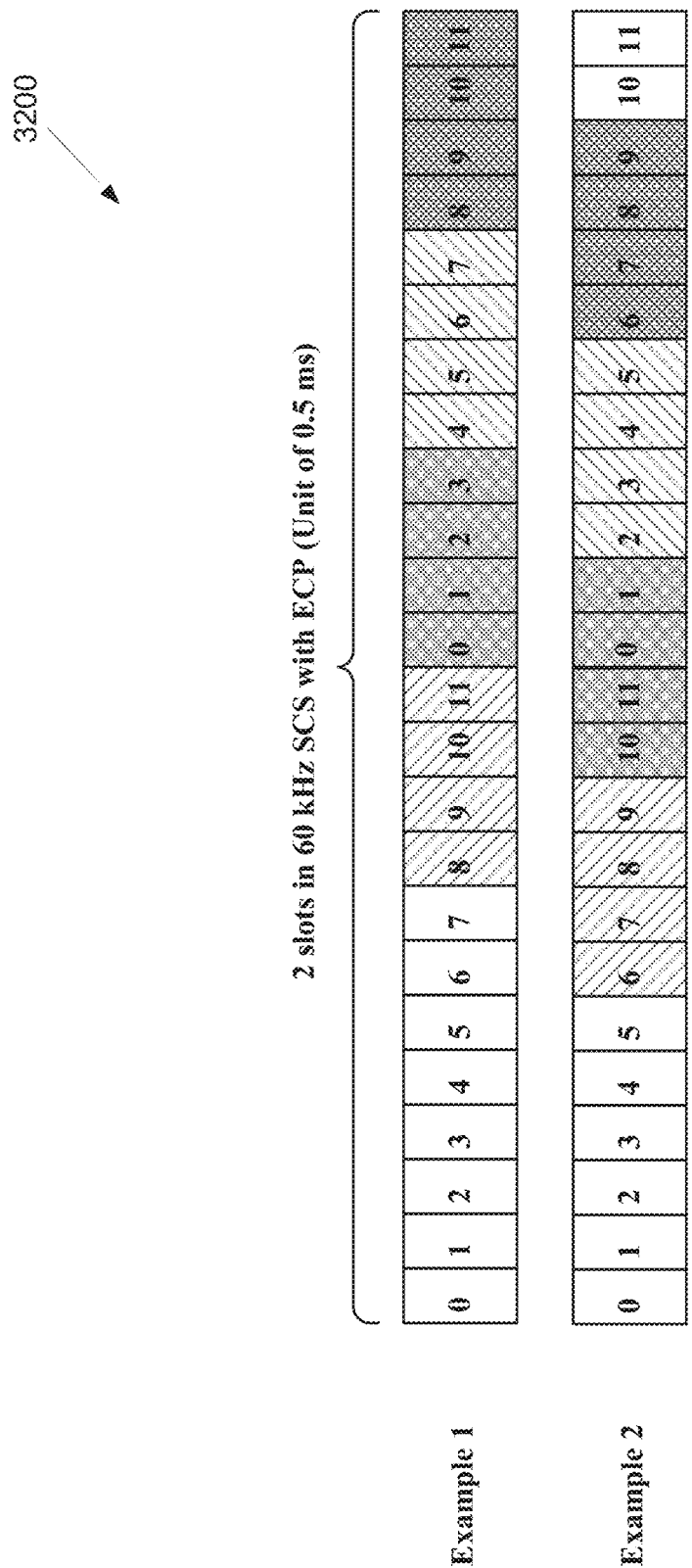
FIG. 32 illustrates yet another example a mapping pattern of SS/PBCH blocks according to embodiments of the present disclosure.

FIG. 32 illustrates yet another example a mapping pattern of SS/PBCH blocks 3200 according to embodiments of the present disclosure. The embodiment of the mapping pattern of SS/PBCH blocks 3200 illustrated in FIG. 32 is for illustration only. FIG. 32 does not limit the scope of this disclosure to any particular implementation.

In one example (e.g., example 1 in FIG. 32), the first symbols of the candidate SS/PBCH blocks have indexes {8, 12, 16, 20} within every design unit of 24 symbols (e.g. 2 slots with total duration of 0.5 ms). The 8 symbols before SS/PBCH blocks can be used for at least one of the following purpose: LBT, or multiplexing CORESET, or transmitting configured CSI-RS.

In another example (e.g., example 2 in FIG. 32), the first symbols of the candidate SS/PBCH blocks have indexes {6, 10, 14, 18} within every design unit of 24 symbols (e.g. 2 slots with total duration of 0.5 ms). The 6 symbols before SS/PBCH blocks can be used for at least one of the following purposes: LBT, or multiplexing CORESET, or transmitting configured CSI-RS, and the 2 symbols at the end of the slot can be used for at least one of the following purposes: LBT for next slot or transmitting configured CSI-RS.

The mapping of the design unit, 0.5 ms as 2 slots of 60 kHz SCS as the reference SCS, into the transmission window of SS/PBCH blocks can be determined as O, wherein O is the timing offset within the SS/PBCH blocks transmission window due to LBT, and the indexes of the design unit contains the mapping pattern given by examples as illustrated in FIG. 32.

In NR, a one-bit field in MIB, i.e., subCarrierSpacing-Common, is utilized to indicate the subcarrier spacing for RMSI, Msg 2/4 of RACH procedure for initial access, and broadcast SI-messages. For FR1, the subcarrier spacing can be either 15 kHz or 30 kHz, and for FR2, the subcarrier spacing can be either 60 kHz or 120 kHz.

In one embodiment, for NRU-sub7, the same one-bit field can be utilized to indicate the common value for the subcarrier spacing for RMSI, Msg 2/4 of RACH procedure for initial access (if supported in NRU), and broadcast SI-messages, but with potentially same or different indicated values. For example, the one-bit field can be utilized to indicate one from {30 kHz, 60 kHz} for NRU-sub7.

In another embodiment, for NRU-sub7, the one-bit field subCarrierSpacingCommon can be combined with other reserved bit or unused bit(s)/codepoints from other field(s) in the PBCH content of NRU-sub7 to indicate the common value for the subcarrier spacing for RMSI, Msg 2/4 of RACH procedure for initial access (if supported in NRU), and broadcast SI-messages, such that the one-bit field can indicate more than 2 values. For example, the one-bit field can be combined with another reserved/unused bit or unused codepoints to indicate one of 3 or 4 SCS values. For example, the set of SCS values to be indicated can be {15 kHz, 30 kHz, 60 kHz}.

In yet another embodiment, for NRU-sub7, the common subcarrier spacing for RMSI, Msg 2/4 of the random access procedure for initial access (if supported in NRU), and broadcast SI-messages can be fixed and the one-bit field subCarrierSpacingCommon can be reserved or utilized for other indication for NRU-sub7. For example, for a given NRU-sub7 band (e.g. 5 GHz unlicensed band and/or 6 GHz unlicensed band), the common subcarrier spacing for RMSI, Msg 2/4 of RACH procedure for initial access (if supported in NRU), and broadcast SI-messages can be predefined as the same as the subcarrier spacing of SS/PBCH block (e.g., the common SCS is 60 kHz), and no indication is required in MIB for NRU-sub7.

In NR, the SS/PBCH block index is carried by the DMRS sequence of PBCH and potentially the PBCH content. For L=64, the 3 MSBs of SS/PBCH block index are indicated by the PBCH content, and the 3 LSBs of SS/PBCH block index are carried by the DMRS sequence of PBCH; for L=8, the 3 bits of SS/PBCH block index are carried by the DMRS sequence of PBCH; for L=4, the 2 bits of SS/PBCH block index are carried by the DMRS sequence of PBCH.

In one embodiment, for NRU-sub7, if the maximum number of SS/PBCH blocks is 8, the same mechanism can be utilized for carrying the SS/PBCH block index. For example, the 3 bits of SS/PBCH block index are carried by the DMRS sequence of PBCH.

In another embodiment, for NRU-sub7, if the maximum number of SS/PBCH blocks is 16, the SS/PBCH block index can be carried using at least one of the following examples (e.g., multiple examples can be supported at the same for different sub-division of the carrier frequency ranges of NRU-sub7).

In one example, the 4 bits of SS/PBCH block index are carried by the DMRS sequence of PBCH.

In another example, the MSB of SS/PBCH block index is indicated by the PBCH content, and the 3 LSBs of SS/PBCH block index are carried by the DMRS sequence of PBCH (e.g. keep the same sequence design of DMRS of PBCH).

In yet another example, the 3 LSBs of SS/PBCH block index are carried by the DMRS sequence of PBCH (e.g. keep the same sequence design of DMRS of PBCH), and the MSB can be carried in one of the following sub-examples.

In one instance, the MSB can be carried by the sequence frequency-domain mapping order of DMRS of PBCH (e.g., either mapping from lowest RE to highest RE or mapping from highest RE to lowest RE).

In another instance, the MSB can be carried by the sequence frequency-domain and time-domain mapping order of DMRS of PBCH (e.g. either frequency-first-and-time-second mapping order or time-first-and-frequency-second mapping order).

In yet another instance, the MSB can be carried by the CRC mask code of PBCH.

In yet another instance, the MSB can be carried by changing the RE locations mapped for PBCH in different symbols (e.g. either no shift or a predefined shift pattern for different symbols mapped for PBCH).

In yet another embodiment, for NRU-sub7, if the maximum number of SS/PBCH blocks is 4, the same mechanism can be utilized for carrying the SS/PBCH block index, and the saved 1 bit can be utilized for indicating other information. For example, the 2 bits of SS/PBCH block index are carried by the DMRS sequence of PBCH, and, the 2 bits of SS/PBCH block index can be combined with the timing offset to be carried by the DMRS sequence of PBCH.

In NR, one 4-bit field in MIB, i.e., ssb-SubcarrierOffset, is utilized to indicate the subcarrier offset between the RB grids of SS/PBCH block and RMSI CORESET for NR FR1, and this field together with another bit generated in the physical layer are utilized to indicate the subcarrier offset between the RB grids of SS/PBCH block and RMSI CORESET for NR FR2.

In one embodiment, for NRU-sub7, if the candidate SCS for the common value for the subcarrier spacing for RMSI, Msg 2/4 of RACH procedure for initial access (if supported in NRU), and broadcast SI-messages is only one (as discussed in Component IV), at most 12 values on the subcarrier offset are required to indicate and 4 bits are sufficient to indicate. For example, the field ssb-SubcarrierOffset in MIB can still be utilized to indicate the subcarrier offset.

In another embodiment, for NRU-sub7, if the candidate SCS for the common values for the subcarrier spacing for RMSI, Msg 2/4 of RACH procedure for initial access (if supported in NRU), and broadcast SI-messages are two (e.g. {30 kHz, 60 kHz}), which is indicated by 1 separate bit in MIB (as discussed in Component IV), at most 24 values on the subcarrier offset are required to indicate and 5 bits are sufficient to indicate. For example, the field ssb-SubcarrierOffset in MIB, together with another reserved or unused bit can be utilized to indicate the subcarrier offset.

In another embodiment, for NRU-sub7, if the candidate SCS for the common values for the subcarrier spacing for RMSI, Msg 2/4 of RACH procedure for initial access (if supported in NRU), and broadcast SI-messages are three (e.g., {15 kHz, 30 kHz, 60 kHz}), which is indicated by 2 separate bits (as discussed in Component IV), at most 36 on the subcarrier offset are required to indicate and at most 6 bits are sufficient to indicate. For one example, the field ssb-SubcarrierOffset in MIB, together with another 2 reserved and/or unused bits can be utilized to indicate the subcarrier offset. For another example, the field ssb-SubcarrierOffset in MIB, together with another 1 reserved or unused bit can be utilized to indicate the subcarrier offset up to 24 values.

In NR, 4 bits of the field in MIB, i.e., pdcch-ConfigSIB1, is utilized to indicate the CORESET configuration of RMSI, where the configurations of the multiplexing pattern, CORESET BW, number of symbols for CORESET, and RB-level offset between SS/PBCH block and CORESET are jointly coded using the 4 bits. This configuration can be reused for broadcast OSI and paging as well in the initial access procedure. The configuration table is determined per the combination of subcarrier spacing of SS/PBCH block and PDCCH in CORESET.

In general, for multiplexing pattern 1 of the SS/PBCH block and CORESET, the required number of configurations on the RB-level offset between SS/PBCH block and CORESET, #RB_offset, can be determined as follow: #RB_offset= [SS_Raster/(((Carrier_BW−CORESET_BW+1)*RMSI_SCS/SS_SCS)], where SS_Raster is the synchronization raster in term of RB in SS/PBCH subcarrier spacing, Carrier_BW is the bandwidth of the carrier in term of RB in RMSI subcarrier spacing, CORESET_BW is the bandwidth of the RMSI CORESET in term of RB in RMSI subcarrier spacing, RMSI_SCS is the subcarrier spacing of RMSI, SS_SCS is the subcarrier spacing of SS/PBCH block. The choices of the #RB_offset offset values can be determined as symmetric or approximately symmetric with respect to the configuration where SS/PBCH block and RMSI CORESET are center-aligned.

In general, for multiplexing pattern 2 and 3 of the SS/PBCH block and CORESET, the required number of configurations on the RB-level offset between SS/PBCH block and CORESET, #RB_offset, can be 2, wherein the two configurations can be determined according to: {CORESET_BW, −SSB_BW*SS_SCS/RMSI_SCS} if the subcarrier offset k_SSB=0 and SS_SCS=RMSI_SCS; {CORESET_BW, −SSB_BW*SS_SCS/RMSI_SCS−1} if the subcarrier offset k_SSB≠0 and SS_SCS=RMSI_SCS; {CORESET_BW+1, −SSB_BW*SS_SCS/RMSI_SCS−1} if the subcarrier offset k_SSB=0 and SS_SCS≠RMSI_SCS; and/or {CORESET_BW+1, −SSB_BW*SS_SCS/RMSI_SCS−2} if the subcarrier offset k_SSB=0 and SS_SCS≠RMSI_SCS, where SSB_BW is the bandwidth of SS/PBCH block in term of own subcarrier spacing.

For NRU-sub7, if the combination of {SS_SCS, RMSI_SCS} as {60 kHz, 60 kHz} is supported, and the minimum carrier BW is 20 MHz, then, the theoretical upper bound of SS raster can be 4 RBs (in the SCS of 60 kHz)+Channel Raster, where Channel Raster can be either 100 kHz or 15 kHz.

In one embodiment, only multiplexing pattern 1 is supported for NRU-sub7.

In one example, the channel raster can be with full flexibility, and TABLE 29 summarizes the required number of RB offsets with respect to different SS raster value (wherein the SS raster is aligned with a subset of the ones for NR licensed spectrum) and CORESET BW for multiplexing pattern 1.

In one example, TABLE 30A can be utilized to indicate the RMSI CORESET configuration (e.g. using SS raster as 2.88 MHz).

In another example, the RMSI CORESET configuration with CORESET BW of 24 PRBs only is as in TABLE 30B or TABLE 30C. Note that there is 1 bit saved in TABLE 30B, and this bit can be utilized for other purpose.

In another example, the channel raster can be limited to a certain range, such that only single configuration is sufficient for a given CORESET_BW and given carrier (e.g., 20 MHz carrier as in 5 GHz unlicensed band).

In one example, for each combination of {CORESET_BW, number of CORESET symbols}, one configuration from TABLE 30A is supported.

In another embodiment, multiplexing pattern 3 can be supported for NRU-sub7, in addition to multiplexing pattern 1. In one instance, if CORESET_BW=24 RBs, the required configuration for multiplexing pattern 3 are {24, −20} if k_SSB=0; and are {24, −21} if k_SSB≠0. In another instance, if CORESET_BW=48 RBs, the required configuration for multiplexing pattern 3 are {48, −20} if k_SSB=0; and are {48, −21} if k_SSB≠0. In yet another instance, if CORESET_BW=96 RBs, the required configuration for multiplexing pattern 3 are {96, −20} if k_SSB=0; and are {96, −21} if k_SSB≠0.

TABLE 29

RB_offset and SS raster

| | | SS Raster | | | |
|---|---|---|---|---|---|
| #RB_offset | | 1.44 MHz | 2.88 MHz | 1.20 MHz | 2.40 MHz |
| CORESET | 24 | 2 | 4 | 2 | 4 |
| BW | 48 | 1 | 1 | 1 | 1 |
| (RBs) | 96 | 1 | 1 | 1 | 1 |

TABLE 30A

Configuration

| Index | Multiplexing Pattern | CORESET BW (RBs) | Number of CORESET Symbols | Offset (RBs) |
|---|---|---|---|---|
| 0 | 1 | 24 | 2 | 0 |
| 1 | 1 | 24 | 2 | 1 |
| 2 | 1 | 24 | 2 | 2 |
| 3 | 1 | 24 | 2 | 3 |
| 4 | 1 | 24 | 3 | 0 |
| 5 | 1 | 24 | 3 | 1 |
| 6 | 1 | 24 | 3 | 2 |
| 7 | 1 | 24 | 3 | 3 |
| 8 | 1 | 48 | 1 | 14 |
| 9 | 1 | 48 | 2 | 14 |
| 10 | 1 | 48 | 3 | 14 |
| 11 | 1 | 96 | 1 | 38 |
| 12 | 1 | 96 | 2 | 38 |
| 13 | 1 | 96 | 3 | 38 |
| 14 | Reserved | | | |
| 15 | Reserved | | | |

TABLE 30B

Configuration

| Index | Multiplexing Pattern | CORESET BW (RBs) | Number of CORESET Symbols | Offset (RBs) |
|---|---|---|---|---|
| 0 | 1 | 24 | 2 | 0 |
| 1 | 1 | 24 | 2 | 1 |
| 2 | 1 | 24 | 2 | 2 |
| 3 | 1 | 24 | 2 | 3 |
| 4 | 1 | 24 | 3 | 0 |
| 5 | 1 | 24 | 3 | 1 |
| 6 | 1 | 24 | 3 | 2 |
| 7 | 1 | 24 | 3 | 3 |
| 8 | Reserved | | | |
| 9 | Reserved | | | |
| 10 | Reserved | | | |
| 11 | Reserved | | | |
| 12 | Reserved | | | |
| 13 | Reserved | | | |
| 14 | Reserved | | | |
| 15 | Reserved | | | |

TABLE 30C

Configuration

| Index | Multiplexing Pattern | CORESET BW (RBs) | Number of CORESET Symbols | Offset (RBs) |
|---|---|---|---|---|
| 0 | 1 | 24 | 1 | 0 |
| 1 | 1 | 24 | 1 | 1 |
| 2 | 1 | 24 | 1 | 2 |
| 3 | 1 | 24 | 1 | 3 |
| 4 | 1 | 24 | 2 | 0 |
| 5 | 1 | 24 | 2 | 1 |
| 6 | 1 | 24 | 2 | 2 |
| 7 | 1 | 24 | 2 | 3 |
| 8 | 1 | 24 | 3 | 0 |
| 9 | 1 | 24 | 3 | 1 |
| 10 | 1 | 24 | 3 | 2 |
| 11 | 1 | 24 | 3 | 3 |
| 12 | Reserved | | | |
| 13 | Reserved | | | |
| 14 | Reserved | | | |
| 15 | Reserved | | | |

For NRU-sub7, if the combination of {SS_SCS, RMSI_SCS} as {30 kHz, 60 kHz} is supported, and the minimum carrier BW is 20 MHz, then, the theoretical upper bound of SS raster can be 31 RBs (in the SCS of 30 kHz)+Channel Raster, where Channel Raster can be either 100 kHz or 15 kHz. In one embodiment, only multiplexing pattern 1 is supported for NRU-sub7. In another embodiment, multiplexing pattern 2 can be supported for NRU-sub7, in addition to multiplexing pattern 1.

TABLE 31 summarizes the required number of RB offsets with respect to different SS raster value (wherein the SS raster is aligned with a subset of the ones for NR licensed spectrum) and CORESET BW for multiplexing pattern 1. In one example, TABLE 32A can be utilized to indicate the RMSI CORESET configuration (e.g., using SS raster as 5.76 MHz), wherein the table size is larger than 4 bits. In another example, a subset of indices of TABLE 32A can be utilized to indicate the RMSI CORESET configuration (e.g., only the ones with CORESET BW of 24 PRBs and a particular example is as in TABLE 32B), wherein the table size can fit in 4 bits.

TABLE 31

RB_offset and SS raster

| #RB_offset | SS Raster | | | |
|---|---|---|---|---|
| | 8.64 MHz | 5.76 MHz | 2.88 MHz | 1.44 MHz |
| CORESET BW (RBs) | 24 | 12 | 8 | 4 | 2 |
| | 48 | 3 | 3 | 2 | 1 |
| | 96 | 1 | 1 | 1 | 1 |

TABLE 32A

Configuration

| Index | Multiplexing Pattern | CORESET BW (RBs) | Number of CORESET Symbols | Offset (RBs) |
|---|---|---|---|---|
| 0 | 1 | 24 | 2 | 4 |
| 1 | 1 | 24 | 2 | 5 |
| 2 | 1 | 24 | 2 | 6 |
| 3 | 1 | 24 | 2 | 7 |
| 4 | 1 | 24 | 2 | 8 |
| 5 | 1 | 24 | 2 | 9 |
| 6 | 1 | 24 | 2 | 10 |
| 7 | 1 | 24 | 2 | 11 |
| 8 | 1 | 24 | 3 | 4 |
| 9 | 1 | 24 | 3 | 5 |
| 10 | 1 | 24 | 3 | 6 |
| 11 | 1 | 24 | 3 | 7 |
| 12 | 1 | 24 | 3 | 8 |
| 13 | 1 | 24 | 3 | 9 |
| 14 | 1 | 24 | 3 | 10 |
| 15 | 1 | 24 | 3 | 11 |
| 16 | 1 | 48 | 1 | 0 |
| 17 | 1 | 48 | 1 | 19 |
| 18 | 1 | 48 | 1 | 38 |
| 19 | 1 | 48 | 2 | 0 |
| 20 | 1 | 48 | 2 | 19 |
| 21 | 1 | 48 | 2 | 38 |
| 22 | 1 | 48 | 3 | 0 |
| 23 | 1 | 48 | 3 | 19 |
| 24 | 1 | 48 | 3 | 38 |
| 25 | 1 | 96 | 1 | 43 |
| 26 | 1 | 96 | 2 | 43 |
| 27 | 1 | 96 | 3 | 43 |

TABLE 32B

Configuration

| Index | Multiplexing Pattern | CORESET BW (RBs) | Number of CORESET Symbols | Offset (RBs) |
|---|---|---|---|---|
| 0 | 1 | 24 | 2 | 4 |
| 1 | 1 | 24 | 2 | 5 |
| 2 | 1 | 24 | 2 | 6 |
| 3 | 1 | 24 | 2 | 7 |
| 4 | 1 | 24 | 2 | 8 |
| 5 | 1 | 24 | 2 | 9 |
| 6 | 1 | 24 | 2 | 10 |
| 7 | 1 | 24 | 2 | 11 |
| 8 | 1 | 24 | 3 | 4 |
| 9 | 1 | 24 | 3 | 5 |
| 10 | 1 | 24 | 3 | 6 |
| 11 | 1 | 24 | 3 | 7 |
| 12 | 1 | 24 | 3 | 8 |
| 13 | 1 | 24 | 3 | 9 |
| 14 | 1 | 24 | 3 | 10 |
| 15 | 1 | 24 | 3 | 11 |

For NRU-sub7, if the combination of {SS_SCS, RMSI_SCS} as {60 kHz, 30 kHz} is supported, and the minimum carrier BW is 20 MHz, then, the theoretical upper bound of SS raster can be 4 RBs (in the SCS of 60 kHz)+Channel Raster, where Channel Raster can be either 100 kHz or 15 kHz.

In one embodiment, only multiplexing pattern 1 is supported for NRU-sub7. In one example, TABLE 33 summarizes the required number of RB offsets with respect to different SS raster value (wherein the SS raster is aligned with a subset of the ones for NR licensed spectrum) and CORESET BW for multiplexing pattern 1.

In another embodiment, multiplexing pattern 2 can be supported for NRU-sub7, in addition to multiplexing pattern 1.

In one example, TABLE 34A can be utilized to indicate the RMSI CORESET configuration (e.g. using SS raster as 2.88 MHz).

In another example, a subset of indices of TABLE 34A can be utilized to indicate the RMSI CORESET configuration (e.g., only the ones with CORESET BW of 48 PRBs and a particular example is as illustrated in TABLE 34B).

TABLE 33

RB_offset and SS raster

| #RB_offset | SS Raster | | | |
|---|---|---|---|---|
| | 1.44 MHz | 2.88 MHz | 1.20 MHz | 2.40 MHz |
| CORESET BW (RBs) | 48 | 2 | 3 | 2 | 3 |
| | 96 | 1 | 1 | 1 | 1 |

TABLE 34A

Configuration

| Index | Multiplexing Pattern | CORESET BW (RBs) | Number of CORESET Symbols | Offset (RBs) |
|---|---|---|---|---|
| 0 | 1 | 48 | 1 | 0 |
| 1 | 1 | 48 | 1 | 4 |
| 2 | 1 | 48 | 1 | 8 |
| 3 | 1 | 48 | 2 | 0 |
| 4 | 1 | 48 | 2 | 4 |

TABLE 34A-continued

Configuration

| Index | Multiplexing Pattern | CORESET BW (RBs) | Number of CORESET Symbols | Offset (RBs) |
|---|---|---|---|---|
| 5 | 1 | 48 | 2 | 8 |
| 6 | 1 | 48 | 3 | 0 |
| 7 | 1 | 48 | 3 | 4 |
| 8 | 1 | 48 | 3 | 8 |
| 9 | 1 | 96 | 1 | 28 |
| 10 | 1 | 96 | 2 | 28 |
| 11 | 1 | 96 | 3 | 28 |
| 12 | | Reserved | | |
| 13 | | Reserved | | |
| 14 | | Reserved | | |
| 15 | | Reserved | | |

TABLE 34B

Configuration

| Index | Multiplexing Pattern | CORESET BW (RBs) | Number of CORESET Symbols | Offset (RBs) |
|---|---|---|---|---|
| 0 | 1 | 48 | 1 | 0 |
| 1 | 1 | 48 | 1 | 4 |
| 2 | 1 | 48 | 1 | 8 |
| 3 | 1 | 48 | 2 | 0 |
| 4 | 1 | 48 | 2 | 4 |
| 5 | 1 | 48 | 2 | 8 |
| 6 | 1 | 48 | 3 | 0 |
| 7 | 1 | 48 | 3 | 4 |
| 8 | 1 | 48 | 3 | 8 |
| 9 | | Reserved | | |
| 10 | | Reserved | | |
| 11 | | Reserved | | |
| 12 | | Reserved | | |
| 13 | | Reserved | | |
| 14 | | Reserved | | |
| 15 | | Reserved | | |

In NR, the other 4 bits of the field in MIB, i.e., pdcch-ConfigSIB1, is utilized to indicate the search space configuration of the PDCCH of RMSI, where the configurations are determined based on multiplexing pattern, and the configuration on the SFN, slot, and symbol that the search space locates is specified.

In one embodiment, when there are 2 search space sets per slot, the location of the second search space can be starting from the beginning of the second half slot (e.g., symbol index 7 for normal CP and symbol index 6 for extended CP). For example, for a given group offset O, when the number of search space set per slot is 2, and M=½, the first symbol index of search space can be 0 if SS/PBCH block index is even and X if SS/PBCH block index is odd, wherein X=7 for normal CP and X=6 for extended CP.

In one example, for NRU-sub7, if the maximum number of SS/PBCH blocks can be 8 and the associated SCS can be 60 kHz, the total transmission duration of the burst set can be confined within 1 ms within the half frame. In this case, the group offset value (e.g. value O in the table), can be either revised and/or added by another two values 1 ms and 6 ms. For example, the configuration table of parameters for PDCCH monitoring occasions can be as in TABLE 35A, wherein O and M are parameters used for calculating the SFN and slot of the PDCCH monitoring occasions, i is the SS/PBCH block index, and l is the number of symbols for CORESET. In one sub-example, a subset of the indices in TABLE 35A can be utilized to indicate the search space configuration, e.g. indices with 1, 5, 9, and 13 are not supported (i.e., the ones with first symbol as X for SS/PBCH block index i as odd are not supported, and a particular example is as in TABLE 35B). In this example, X=7 for normal CP and X=6 for extended CP.

TABLE 35A

A subset of the indices

| Index | O | Number of search space sets per slot | M | First symbol index of search space |
|---|---|---|---|---|
| 0 | 0 | 1 | 1 | 0 |
| 1 | 0 | 2 | 1/2 | {0, if i is even}, {X, if i is odd} |
| 2 | 0 | 2 | 1/2 | {0, if i is even}, {1, if i is odd} |
| 3 | 0 | 1 | 2 | 0 |
| 4 | 1 | 1 | 1 | 0 |
| 5 | 1 | 2 | 1/2 | {0, if i is even}, {X, if i is odd} |
| 6 | 1 | 2 | 1/2 | {0, if i is even}, {1, if i is odd} |
| 7 | 1 | 1 | 2 | 0 |
| 8 | 5 | 1 | 1 | 0 |
| 9 | 5 | 2 | 1/2 | {0, if i is even}, {X, if i is odd} |
| 10 | 5 | 2 | 1/2 | {0, if i is even}, {1, if i is odd} |
| 11 | 5 | 1 | 2 | 0 |
| 12 | 6 | 1 | 1 | 0 |
| 13 | 6 | 2 | 1/2 | {0, if i is even}, {X, if i is odd} |
| 14 | 6 | 2 | 1/2 | {0, if i is even}, {1, if i is odd} |
| 15 | 6 | 1 | 2 | 0 |

TABLE 35B

A subset of the indices

| Index | O | Number of search space sets per slot | M | First symbol index of search space |
|---|---|---|---|---|
| 0 | 0 | 1 | 1 | 0 |
| 1 | 0 | 2 | 1/2 | {0, if i is even}, {1, if i is odd} |
| 2 | 0 | 1 | 2 | 0 |
| 3 | 1 | 1 | 1 | 0 |
| 4 | 1 | 2 | 1/2 | {0, if i is even}, {1, if i is odd} |
| 5 | 1 | 1 | 2 | 0 |
| 6 | 5 | 1 | 1 | 0 |
| 7 | 5 | 2 | 1/2 | {0, if i is even}, {1, if i is odd} |
| 8 | 5 | 1 | 2 | 0 |
| 9 | 6 | 1 | 1 | 0 |
| 10 | 6 | 2 | 1/2 | {0, if i is even}, {1, if i is odd} |
| 11 | 6 | 1 | 2 | 0 |
| 12 | | | | Reserved |
| 13 | | | | Reserved |
| 14 | | | | Reserved |
| 15 | | | | Reserved |

In another example, for NRU-sub7, if the combination of the maximum number of SS/PBCH blocks and the associated SCS cannot be 16 and 60 kHz, respectively, the total transmission duration of the burst set can be confined within 2 ms within the half frame, and the same configuration table as NR FR1 for multiplexing pattern 1 can be reused for NRU-sub7.

In yet another example, for NRU-sub7, if the maximum number of SS/PBCH blocks can be 4 and the associated SCS can be 60 kHz, the total transmission duration of the burst set can be confined within 0.5 ms within the half frame. In this case, the group offset value (e.g. value O in the table), can be either revised and/or added by another two values 0.5 ms and 5.5 ms. For example, the configuration table of parameters for PDCCH monitoring occasions can be as in TABLE 36A, wherein O and M are parameters used for calculating the SFN and slot of the PDCCH monitoring occasions, i is the SS/PBCH block index, and l is the number of symbols for CORESET. In one sub-example, a subset of the indices in TABLE 36A can be utilized to indicate the search space configuration, e.g. indices with 1, 5, 9, and 13 are not supported (i.e., the ones with first symbol as X for SS/PBCH block index i as odd are not supported, and a particular example is as in TABLE 36B). In this example, X=7 for normal CP and X=6 for extended CP.

TABLE 36A

A subset of the indices

| Index | O | Number of search space sets per slot | M | First symbol index of search space |
|---|---|---|---|---|
| 0 | 0 | 1 | 1 | 0 |
| 1 | 0 | 2 | 1/2 | {0, if i is even}, {X, if i is odd} |
| 2 | 0 | 2 | 1/2 | {0, if i is even}, {1, if i is odd} |
| 3 | 0 | 1 | 2 | 0 |
| 4 | 0.5 | 1 | 1 | 0 |
| 5 | 0.5 | 2 | 1/2 | {0, if i is even}, {X, if i is odd} |
| 6 | 0.5 | 2 | 1/2 | {0, if i is even}, {1, if i is odd} |
| 7 | 0.5 | 1 | 2 | 0 |
| 8 | 5 | 1 | 1 | 0 |
| 9 | 5 | 2 | 1/2 | {0, if i is even}, {X, if i is odd} |
| 10 | 5 | 2 | 1/2 | {0, if i is even}, {1, if i is odd} |
| 11 | 5 | 1 | 2 | 0 |
| 12 | 5.5 | 1 | 1 | 0 |
| 13 | 5.5 | 2 | 1/2 | {0, if i is even}, {X, if i is odd} |
| 14 | 5.5 | 2 | 1/2 | {0, if i is even}, {1, if i is odd} |
| 15 | 5.5 | 1 | 2 | 0 |

TABLE 36B

A subset of the indices

| Index | O | Number of search space sets per slot | M | First symbol index of search space |
|---|---|---|---|---|
| 0 | 0 | 1 | 1 | 0 |
| 1 | 0 | 2 | 1/2 | {0, if i is even}, {1, if i is odd} |
| 2 | 0 | 1 | 2 | 0 |
| 3 | 0.5 | 1 | 1 | 0 |
| 4 | 0.5 | 2 | 1/2 | {0, if i is even}, {1, if i is odd} |
| 5 | 0.5 | 1 | 2 | 0 |
| 6 | 5 | 1 | 1 | 0 |
| 7 | 5 | 2 | 1/2 | {0, if i is even}, {1, if i is odd} |
| 8 | 5 | 1 | 2 | 0 |
| 9 | 5.5 | 1 | 1 | 0 |
| 10 | 5.5 | 2 | 1/2 | {0, if i is even}, {1, if i is odd} |
| 11 | 5.5 | 1 | 2 | 0 |

TABLE 36B-continued

A subset of the indices

| Index | O | Number of search space sets per slot | M | First symbol index of search space |
|---|---|---|---|---|
| 12 | | | | Reserved |
| 13 | | | | Reserved |
| 14 | | | | Reserved |
| 15 | | | | Reserved |

In one embodiment, 1 reserved bit in PBCH payload can be utilized to indicate the detected cell-defining SS/PBCH block is on licensed or unlicensed spectrum (e.g., equivalent as indicating the SS raster is associated with a licensed or unlicensed spectrum). This indication can help a UE to distinguish band number when there is an overlapping bandwidth between a licensed band and an unlicensed band, e.g., in different geography regions.

In one sub-embodiment, this indication using 1 reserved bit can be used for distinguishing NR FR1 and NRU-sub7 only, since this is only frequency range that may have an overlapping bandwidth between a licensed band and an unlicensed band, and no indication is needed between NR FR2 and NRU.

The indication of licensed or unlicensed band can facilitate determining the content of other fields in PBCH payload as well. For example, by indicating the band is a NR licensed band, the candidate values for subCarrierSpacingCommon can refer to {15 kHz, 30 kHz}, and by indicating the band is a NR unlicensed band, the candidate values for subCarrierSpacingCommon can refer to {30 kHz, 60 kHz}. For another example, if a maximum number of SS/PBCH blocks is 8 for both NR FR1 and NRU-sub7, by indicating the band is a NR unlicensed band, the UE can use TABLE 35A or TABLE 35B as the configuration table of parameters for PDCCH monitoring occasions (or equivalent as indicating O=1 or 6), if the maximum number of SS/PBCH block is 8, and by indicating the band is a NR licensed band, the UE can use the same configuration table of parameters for PDCCH monitoring occasions as in NR FR1 (or equivalent as indicating O=2 or 7).

NR supports short PRACH preamble formats of length $L_{RA}=139$ with subcarrier spacing of $15 \cdot 2^\mu$ kHz, wherein $\mu=0$, 1, 2 or 3. The supported short PRACH preamble formats for NR are detailed in TABLE 37, wherein the constant $\kappa=64$, and the time unit for PRACH and CP length is $T_s=1/(480 \text{ kHz}*4096)$. Specifically, NR supports PRACH with SCS of 15 kHz and 30 kHz for FR1, and 60 kHz and 120 kHz for FR2.

TABLE 37

Short PRACH preamble format

| Format | Preamble sequence length | PRACH SCS | PRACH length | CP length | Support for restricted sets |
|---|---|---|---|---|---|
| A1 | 139 | $15 \cdot 2^\mu$ kHz | $2 \cdot 2048\kappa \cdot 2^{-\mu}$ | $288\kappa \cdot 2^{-\mu}$ | — |
| A2 | 139 | $15 \cdot 2^\mu$ kHz | $4 \cdot 2048\kappa \cdot 2^{-\mu}$ | $576\kappa \cdot 2^{-\mu}$ | — |
| A3 | 139 | $15 \cdot 2^\mu$ kHz | $6 \cdot 2048\kappa \cdot 2^{-\mu}$ | $864\kappa \cdot 2^{-\mu}$ | — |
| B1 | 139 | $15 \cdot 2^\mu$ kHz | $2 \cdot 2048\kappa \cdot 2^{-\mu}$ | $216\kappa \cdot 2^{-\mu}$ | — |
| B2 | 139 | $15 \cdot 2^\mu$ kHz | $4 \cdot 2048\kappa \cdot 2^{-\mu}$ | $360\kappa \cdot 2^{-\mu}$ | — |
| B3 | 139 | $15 \cdot 2^\mu$ kHz | $6 \cdot 2048\kappa \cdot 2^{-\mu}$ | $504\kappa \cdot 2^{-\mu}$ | — |
| B4 | 139 | $15 \cdot 2^\mu$ kHz | $12 \cdot 2048\kappa \cdot 2^{-\mu}$ | $936\kappa \cdot 2^{-\mu}$ | — |
| C0 | 139 | $15 \cdot 2^\mu$ kHz | $2048\kappa \cdot 2^{-\mu}$ | $1240\kappa \cdot 2^{-\mu}$ | — |
| C2 | 139 | $15 \cdot 2^\mu$ kHz | $4 \cdot 2048\kappa \cdot 2^{-\mu}$ | $2048\kappa \cdot 2^{-\mu}$ | — |

In one embodiment, for NRU-sub 7, PRACH formats with 60 kHz SCS can be supported. In one sub-embodiment, the PRACH formats with 60 kHz SCS for NRU-sub 7 can use the same sequence generation procedure, same number of PRACH preamble symbols, and same PRACH preamble CP length, as the PRACH preamble formats with 60 kHz SCS in NR. For example, NRU-sub 7 can support the NR PRACH formats with at least one of formats A1, A2, A3, B1, B2, B3, B4, C0, and C2 in TABLE 37 with µ=2, using the same sequence generation process, same number of PRACH preamble symbols, and same PRACH preamble CP length.

Supporting 60 kHz SCS for PRACH in NRU-sub 7 may lead to a faster PRACH procedure, easier to comply with the occupied channel bandwidth (OCB) regulation, and good compatibility with the 60 kHz SCS for SS/PBCH block (e.g., for the association between SS/PBCH block and PRACH occasion). However, since NR only supports 15 kHz and 30 kHz SCS for PRACH preamble in FR1, enhancements are needed to support 60 kHz PRACH SCS for NRU-sub 7.

One important design consideration is the supported combination of PRACH preamble SCS and PUSCH SCS. In particular, NR only supports PUSCH SCS of 60 kHz and 120 kHz, when the PRACH SCS is 60 kHz, both of which are defined FR2.

In one embodiment, NRU-sub 7 can support the combination of PRACH with 60 kHz SCS and PUSCH with 60 kHz SCS, similar to NR. In this case, the resource block (RB) allocation for PRACH preamble expressed in the number of RBs for PUSCH is 12.

In another embodiment, NRU-sub 7 can also support the combination of PRACH with 60 kHz SCS, and PUSCH with 30 kHz SCS. In this case, the RB allocation for PRACH preamble expressed in the number of RBs for PUSCH is 24.

In yet another embodiment, NRU-sub 7 can also support the combination of PRACH with 60 kHz SCS, and PUSCH with 15 kHz SCS. In this case, the RB allocation for PRACH preamble expressed in number of RBs for PUSCH is 48.

The supported combination of PRACH SCS and PUSCH SCS also affects the OFDM baseband signal generation for PRACH, through parameter $\bar{k}$. In one embodiment, $\bar{k}$ can be 2 when PRACH SCS is 60 kHz for NRU-sub 7, and PUSCH SCS is one of {60, 30, 15} kHz. Therefore, in one embodiment, in addition to supporting the combinations of PRACH SCS and PUSCH SCS as defined in NR, NRU-sub 7 can also support one or multiple of the combinations in TABLE 38.

TABLE 38

Combination of parameters

| PRACH preamble sequence length | PRACH SCS (kHz) | PUSCH SCS (kHz) | PRACH expressed in number of RBs for PUSCH | k |
|---|---|---|---|---|
| 139 | 60 | 60 | 12 | 2 |
| 139 | 60 | 30 | 24 | 2 |
| 139 | 60 | 15 | 48 | 2 |

In NR, the PRACH preamble subcarrier spacing is configured by higher layer through the RRC parameter msg1-SubcarriserSpacing, which only supports values of 15 kHz and 30 kHz for FR1 (sub-6 GHz). Therefore, another design consideration is how NRU-sub 7 configures PRACH preamble SCS of 60 kHz.

In one embodiment, the PRACH preamble SCS of NRU-sub 7 can be configured by RRC layer through the RRC parameter, which can support values of {15 kHz, 30 kHz, 60 kHz} for sub 7 GHz NR-U. In this case, the RRC layer can indicate the UE to use 60 kHz SCS PRACH explicitly through higher layer parameter.

In another embodiment, NRU-sub 7 can reuse the same RRC parameter as in NR that configures the PRACH SCS, which supports values of 15 kHz and 30 kHz; while the UE can determine to use PRACH with 60 kHz SCS, if the SS/PBCH block that the PRACH is associated with also has SCS of 60 kHz, otherwise UE determines PRACH SCS through the RRC layer configuration, which can be either 15 kHz or 30 kHz. In this case, the 60 kHz SCS for NRU-sub 7 is determined implicitly.

Another design consideration is how to determine the PRACH time-domain resource, when NRU-sub 7 uses 60 kHz SCS. In NR, the PRACH time-domain resource is determined by the RRC parameter prach-ConfigurationIndex and the corresponding PRACH configuration table, from which the preamble format, PRACH configuration period, SFN mod configuration period, start symbol index, number of PRACH slots within a subframe (for NR FR1), number of time domain PRACH occasions within a RACH slot, and PRACH duration can be determined. In particular, since NR only supports SCS of 15 kHz and 30 kHz for PRACH, the "number of PRACH slots within a subframe" for PRACH configuration table can only take values of 1 or 2. By contrast, for NRU-sub 7 with 60 kHz PRACH SCS, the number of PRACH slots within a subframe can be up to 4. The following options are possible to indicate the time-domain resource for NRU-sub 7 with 60 kHz SCS from the PRACH configuration table.

In one embodiment, NRU-sub 7 can reuse the same PRACH configuration (e.g., preamble format, PRACH configuration period, SFN mod configuration period, start symbol index, number of PRACH slots within a subframe, and PRACH duration) as in the PRACH configuration table for NRFR1, while the PRACH slots to use can be determined explicitly from the entry "number of PRACH slots within a subframe" when the PRACH SCS is 60 kHz.

In one sub-embodiment, when PRACH SCS is 60 kHz and "number of PRACH slots within a subframe" is 1 from the PRACH configuration table, out of the 4 slots of 60 kHz SCS within the subframe which are indexed by 0, 1, 2, and 3, one slot can be used for PRACH, whose index can be chosen from one of the following {0, 1, 2, 3}. In another sub-embodiment, when PRACH SCS is 60 kHz and "number of PRACH slots within a subframe" is 2 from the PRACH configuration table, out of the 4 slots of 60 kHz SCS within the subframe which are indexed by 0, 1, 2, and 3, two slots can be used by PRACH, whose indexes can be chosen from one of the following {(0,1), (1,2), (2,3), (0,2), (0,3), (1,3)}.

In another sub-embodiment, this option does not require modifying the PRACH configuration table contents of NR FR1, except that the PRACH configuration index may be re-arranged, and/or the number of configuration indexes can be decreased if only short PRACH preamble formats are supported. In another sub-embodiment, the naming of the entries in the PRACH configuration table may be modified for NRU-sub 7, as long as similar meanings are preserved.

In another embodiment, NRU-sub 7 can modify the "number of PRACH slots within a subframe" entry in PRACH configuration table for NR FR1, into referring to the "number of PRACH slots within a slot of 30 kHz". In one sub-embodiment, when PRACH SCS is 60 kHz and "number of PRACH slots within a slot of 30 kHz" is 1 from the PRACH configuration table, out of the 2 60 kHz slots within a 30 kHz slot, one 60 kHz slot can be used for PRACH, which can be either the first or second 60 kHz slot within the 30 kHz slot. In another sub-embodiment, when PRACH SCS is 60 kHz and "number of PRACH slots within a slot of 30 kHz" is 2 from the PRACH configuration table, both 60 kHz slots within the 30 kHz slot are used.

In yet another sub-embodiment, the "subframe number" entry in the PRACH configuration table of NR FR1 can be changed into "slot number" wherein the slot is of 30 kHz SCS. In particular, for "subframe number" entry that reads as {n_0, n_1, . . . , n_m} in PRACH configuration table of NR FR1, the "slot number" entry for NRU-sub 7 can be correspondingly changed into {n_0, n_1, . . . , n_m, n_0+10, n_1+10, . . . , n_m+10}.

In yet another sub-embodiment, PRACH SCS of 15 kHz can be either un-supported for NRU-sub 7 in this case; or if PRACH SCS of 15 kHz is supported, the slot(s) indicated in the "slot number" entry may be utilized for PRACH of 15 kHz SCS, irrespective of the "number of PRACH slots within a slot of 30 kHz" entry. In another sub-embodiment, the naming of the entries in the PRACH configuration table may be modified for NRU-sub 7, as long as similar meanings are preserved.

In yet another embodiment, NRU-sub 7 can add additional entries to the PRACH configuration table of NR FR1, to indicate PRACH time-domain resources for 60 kHz SCS, wherein the number of PRACH slots within a subframe can be up to 4. In one sub-embodiment, when PRACH SCS is 60 kHz and "number of PRACH slots within a subframe" is 1 from the PRACH configuration table, out of the 4 slots within the subframe which are indexed by 0, 1, 2, and 3, 1 slot can be used for PRACH, whose index can be chosen from one of the following {0, 1, 2, 3}.

In another sub-embodiment, when PRACH SCS is 60 kHz and "number of PRACH slots within a subframe" is 2 from the PRACH configuration table, out of the 4 slots within the subframe which are indexed by 0, 1, 2, and 3, 2 slots can be used by PRACH, whose indexes can be chosen from one of the following {(0, 1), (1,2), (2,3), (0,2), (0,3), (1,3)}. In another sub-embodiment, when PRACH SCS is 60 kHz and "number of PRACH slots within a subframe" is 3 from the PRACH configuration table, out of the 4 slots within the subframe which are indexed by 0, 1, 2, and 3, 3 slots can be used for PRACH, whose index can be chosen from one of the following {(0, 1, 2), (0,1,3), (0,2,3), (1,2,3)}.

In another sub-embodiment, when PRACH SCS is 60 kHz and "number of PRACH slots within a subframe" is 4 from the PRACH configuration table, all the 4 slots of 60 kHz SCS can be used by PRACH. In another sub-embodiment, the naming of the entries in the PRACH configuration table may be modified for NRU-sub 7, as long as similar meanings are preserved. As an example, besides supporting the PRACH configuration table of NR FR1, NRU-sub 7 can add a subset or all of the additional entries as shown in TABLE 39, wherein the number of PRACH slots within a subframe can be 3 or 4. In addition, the PRACH configuration period, subframe number, and starting symbol as shown in TABLE 39 can be modified to support 60 kHz PRACH SCS of NRU-sub 7.

TABLE 39

PRACH Configuration table

| PRACH Configuration Index | Preamble format | $n_{SFN}$ mod x = y | | Subframe number | Starting symbol | Number of PRACH slots within a subframe | Number of time-domain PRACH occasions within a RACH slot | PRACH duration |
|---|---|---|---|---|---|---|---|---|
| | | x | y | | | | | |
| 1 | A1 | 16 | 1 | 9 | 0 | 4 | 6 | 2 |
| 2 | A1 | 8 | 1 | 9 | 0 | 4 | 6 | 2 |
| 3 | A1 | 4 | 1 | 9 | 0 | 3 | 6 | 2 |
| 4 | A1 | 2 | 1 | 2, 3, 4, 7, 8, 9 | 0 | 3 | 6 | 2 |
| 5 | A1 | 2 | 1 | 8, 9 | 0 | 4 | 6 | 2 |
| 6 | A1 | 2 | 1 | 7, 9 | 0 | 3 | 6 | 2 |
| 7 | A1 | 2 | 1 | 7, 9 | 7 | 3 | 3 | 2 |
| 8 | A1 | 2 | 1 | 4, 9 | 7 | 3 | 3 | 2 |
| 9 | A1 | 2 | 1 | 4, 9 | 0 | 4 | 6 | 2 |
| 10 | A1 | 2 | 1 | 9 | 0 | 3 | 6 | 2 |
| 11 | A1 | 1 | 0 | 9 | 0 | 4 | 6 | 2 |
| 12 | A1 | 1 | 0 | 9 | 7 | 3 | 3 | 2 |
| 13 | A1 | 1 | 0 | 9 | 0 | 3 | 6 | 2 |
| 14 | A1 | 1 | 0 | 8, 9 | 0 | 4 | 6 | 2 |
| 15 | A1 | 1 | 0 | 4, 9 | 0 | 3 | 6 | 2 |
| 16 | A1 | 1 | 0 | 7, 9 | 7 | 3 | 3 | 2 |
| 17 | A1 | 1 | 0 | 3, 4, 8, 9 | 0 | 3 | 6 | 2 |
| 18 | A1 | 1 | 0 | 3, 4, 8, 9 | 0 | 4 | 6 | 2 |
| 19 | A1 | 1 | 0 | 0, 1, 2, 3, 4, 5, 6, 7, 8, 9 | 7 | 3 | 3 | 2 |
| 20 | A1 | 1 | 0 | 1, 3, 5, 7, 9 | 0 | 3 | 6 | 2 |
| 21 | A2 | 16 | 1 | 9 | 0 | 4 | 3 | 4 |
| 22 | A2 | 16 | 1 | 4, 9 | 0 | 4 | 3 | 4 |
| 23 | A2 | 8 | 1 | 9 | 0 | 4 | 3 | 4 |
| 24 | A2 | 8 | 1 | 4, 9 | 0 | 4 | 3 | 4 |
| 25 | A2 | 4 | 1 | 9 | 0 | 3 | 3 | 4 |
| 26 | A2 | 2 | 1 | 8, 9 | 0 | 4 | 3 | 4 |
| 27 | A2 | 2 | 1 | 7, 9 | 9 | 3 | 1 | 4 |
| 28 | A2 | 2 | 1 | 4, 9 | 9 | 3 | 1 | 4 |
| 29 | A2 | 2 | 1 | 4, 9 | 0 | 4 | 3 | 4 |
| 30 | A2 | 2 | 1 | 9 | 0 | 3 | 3 | 4 |
| 31 | A2 | 1 | 0 | 9 | 0 | 4 | 3 | 4 |
| 32 | A2 | 1 | 0 | 9 | 9 | 3 | 1 | 4 |
| 33 | A2 | 1 | 0 | 9 | 0 | 3 | 3 | 4 |
| 34 | A2 | 1 | 0 | 8, 9 | 0 | 4 | 3 | 4 |
| 35 | A2 | 1 | 0 | 4, 9 | 0 | 3 | 3 | 4 |

TABLE 39-continued

PRACH Configuration table

| PRACH Configuration Index | Preamble format | $n_{SFN} \mod x = y$ | | Subframe number | Starting symbol | Number of PRACH slots within a subframe | Number of time-domain PRACH occasions within a RACH slot | PRACH duration |
|---|---|---|---|---|---|---|---|---|
| | | x | y | | | | | |
| 36 | A2 | 1 | 0 | 7, 9 | 9 | 3 | 1 | 4 |
| 37 | A2 | 1 | 0 | 3, 4, 8, 9 | 0 | 3 | 3 | 4 |
| 38 | A2 | 1 | 0 | 3, 4, 8, 9 | 0 | 4 | 3 | 4 |
| 39 | A2 | 1 | 0 | 0, 1, 2, 3, 4, 5, 6, 7, 8, 9 | 9 | 3 | 1 | 4 |
| 40 | A2 | 1 | 0 | 1, 3, 5, 7, 9 | 0 | 3 | 3 | 4 |
| 41 | A3 | 16 | 1 | 9 | 0 | 4 | 2 | 6 |
| 42 | A3 | 8 | 1 | 9 | 0 | 4 | 2 | 6 |
| 43 | A3 | 4 | 1 | 9 | 0 | 3 | 2 | 6 |
| 44 | A3 | 2 | 1 | 2, 3, 4, 7, 8, 9 | 0 | 3 | 2 | 6 |
| 45 | A3 | 2 | 1 | 8, 9 | 0 | 4 | 2 | 6 |
| 46 | A3 | 2 | 1 | 7, 9 | 0 | 3 | 2 | 6 |
| 47 | A3 | 2 | 1 | 7, 9 | 7 | 3 | 1 | 6 |
| 48 | A3 | 2 | 1 | 4, 9 | 7 | 3 | 1 | 6 |
| 49 | A3 | 2 | 1 | 4, 9 | 0 | 4 | 2 | 6 |
| 50 | A3 | 2 | 1 | 9 | 0 | 3 | 2 | 6 |
| 51 | A3 | 1 | 0 | 9 | 0 | 4 | 2 | 6 |
| 52 | A3 | 1 | 0 | 9 | 7 | 3 | 1 | 6 |
| 53 | A3 | 1 | 0 | 9 | 0 | 3 | 2 | 6 |
| 54 | A3 | 1 | 0 | 8, 9 | 0 | 4 | 2 | 6 |
| 55 | A3 | 1 | 0 | 4, 9 | 0 | 3 | 2 | 6 |
| 56 | A3 | 1 | 0 | 7, 9 | 7 | 3 | 1 | 6 |
| 57 | A3 | 1 | 0 | 3, 4, 8, 9 | 0 | 3 | 2 | 6 |
| 58 | A3 | 1 | 0 | 3, 4, 8, 9 | 0 | 4 | 2 | 6 |
| 59 | A3 | 1 | 0 | 0, 1, 2, 3, 4, 5, 6, 7, 8, 9 | 7 | 3 | 1 | 6 |
| 60 | A3 | 1 | 0 | 1, 3, 5, 7, 9 | 0 | 3 | 2 | 6 |
| 61 | B1 | 16 | 1 | 9 | 2 | 4 | 6 | 2 |
| 62 | B1 | 8 | 1 | 9 | 2 | 4 | 6 | 2 |
| 63 | B1 | 4 | 1 | 9 | 2 | 3 | 6 | 2 |
| 64 | B1 | 2 | 1 | 2, 3, 4, 7, 8, 9 | 2 | 3 | 6 | 2 |
| 65 | B1 | 2 | 1 | 8, 9 | 2 | 4 | 6 | 2 |
| 66 | B1 | 2 | 1 | 7, 9 | 2 | 3 | 6 | 2 |
| 67 | B1 | 2 | 1 | 7, 9 | 8 | 3 | 3 | 2 |
| 68 | B1 | 2 | 1 | 4, 9 | 8 | 3 | 3 | 2 |
| 69 | B1 | 2 | 1 | 4, 9 | 2 | 4 | 6 | 2 |
| 70 | B1 | 2 | 1 | 9 | 2 | 3 | 6 | 2 |
| 71 | B1 | 1 | 0 | 9 | 2 | 4 | 6 | 2 |
| 72 | B1 | 1 | 0 | 9 | 8 | 3 | 3 | 2 |
| 73 | B1 | 1 | 0 | 9 | 2 | 3 | 6 | 2 |
| 74 | B1 | 1 | 0 | 8, 9 | 2 | 4 | 6 | 2 |
| 75 | B1 | 1 | 0 | 4, 9 | 2 | 3 | 6 | 2 |
| 76 | B1 | 1 | 0 | 7, 9 | 8 | 3 | 3 | 2 |
| 77 | B1 | 1 | 0 | 3, 4, 8, 9 | 2 | 3 | 6 | 2 |
| 78 | B1 | 1 | 0 | 3, 4, 8, 9 | 2 | 4 | 6 | 2 |
| 79 | B1 | 1 | 0 | 0, 1, 2, 3, 4, 5, 6, 7, 8, 9 | 8 | 3 | 3 | 2 |
| 80 | B1 | 1 | 0 | 1, 3, 5, 7, 9 | 2 | 3 | 6 | 2 |
| 81 | B4 | 16 | 1 | 9 | 0 | 4 | 1 | 12 |
| 82 | B4 | 8 | 1 | 9 | 0 | 4 | 1 | 12 |
| 83 | B4 | 4 | 1 | 9 | 2 | 3 | 1 | 12 |
| 84 | B4 | 2 | 1 | 2, 3, 4, 7, 8, 9 | 0 | 3 | 1 | 12 |
| 85 | B4 | 2 | 1 | 8, 9 | 0 | 4 | 1 | 12 |
| 86 | B4 | 2 | 1 | 7, 9 | 2 | 3 | 1 | 12 |
| 87 | B4 | 2 | 1 | 4, 9 | 2 | 3 | 1 | 12 |
| 88 | B4 | 2 | 1 | 4, 9 | 0 | 4 | 1 | 12 |
| 89 | B4 | 2 | 1 | 9 | 2 | 3 | 1 | 12 |
| 90 | B4 | 1 | 0 | 9 | 0 | 4 | 1 | 12 |
| 91 | B4 | 1 | 0 | 9 | 2 | 3 | 1 | 12 |
| 92 | B4 | 1 | 0 | 8, 9 | 0 | 4 | 1 | 12 |
| 93 | B4 | 1 | 0 | 4, 9 | 2 | 3 | 1 | 12 |
| 94 | B4 | 1 | 0 | 7, 9 | 2 | 3 | 1 | 12 |
| 95 | B4 | 1 | 0 | 3, 4, 8, 9 | 2 | 3 | 1 | 12 |
| 96 | B4 | 1 | 0 | 3, 4, 8, 9 | 0 | 4 | 1 | 12 |
| 97 | B4 | 1 | 0 | 0, 1, 2, 3, 4, 5, 6, 7, 8, 9 | 2 | 3 | 1 | 12 |
| 98 | B4 | 1 | 0 | 1, 3, 5, 7, 9 | 2 | 3 | 1 | 12 |
| 99 | A1/B1 | 2 | 1 | 8, 9 | 2 | 4 | 6 | 2 |
| 100 | A1/B1 | 2 | 1 | 7, 9 | 2 | 3 | 6 | 2 |
| 101 | A1/B1 | 2 | 1 | 7, 9 | 8 | 3 | 3 | 2 |
| 102 | A1/B1 | 2 | 1 | 4, 9 | 8 | 3 | 3 | 2 |
| 103 | A1/B1 | 2 | 1 | 4, 9 | 2 | 4 | 6 | 2 |
| 104 | A1/B1 | 2 | 1 | 9 | 2 | 3 | 6 | 2 |
| 105 | A1/B1 | 1 | 0 | 9 | 2 | 4 | 6 | 2 |
| 106 | A1/B1 | 1 | 0 | 9 | 8 | 3 | 3 | 2 |
| 107 | A1/B1 | 1 | 0 | 9 | 2 | 3 | 6 | 2 |

TABLE 39-continued

PRACH Configuration table

| PRACH Configuration Index | Preamble format | $n_{SFN} \bmod x = y$ | | Subframe number | Starting symbol | Number of PRACH slots within a subframe | Number of time-domain PRACH occasions within a RACH slot | PRACH duration |
|---|---|---|---|---|---|---|---|---|
| | | x | y | | | | | |
| 108 | A1/B1 | 1 | 0 | 8, 9 | 2 | 4 | 6 | 2 |
| 109 | A1/B1 | 1 | 0 | 4, 9 | 2 | 3 | 6 | 2 |
| 110 | A1/B1 | 1 | 0 | 7, 9 | 8 | 3 | 3 | 2 |
| 111 | A1/B1 | 1 | 0 | 3, 4, 8, 9 | 2 | 4 | 6 | 2 |
| 112 | A1/B1 | 1 | 0 | 0, 1, 2, 3, 4, 5, 6, 7, 8, 9 | 8 | 3 | 3 | 2 |
| 113 | A1/B1 | 1 | 0 | 1, 3, 5, 7, 9 | 2 | 3 | 6 | 2 |
| 114 | A2/B2 | 2 | 1 | 8, 9 | 0 | 4 | 3 | 4 |
| 115 | A2/B2 | 2 | 1 | 7, 9 | 6 | 3 | 2 | 4 |
| 116 | A2/B2 | 2 | 1 | 4, 9 | 6 | 3 | 2 | 4 |
| 117 | A2/B2 | 2 | 1 | 4, 9 | 0 | 4 | 3 | 4 |
| 118 | A2/B2 | 2 | 1 | 9 | 0 | 3 | 3 | 4 |
| 119 | A2/B2 | 1 | 0 | 9 | 0 | 4 | 3 | 4 |
| 120 | A2/B2 | 1 | 0 | 9 | 6 | 3 | 2 | 4 |
| 121 | A2/B2 | 1 | 0 | 9 | 0 | 3 | 3 | 4 |
| 122 | A2/B2 | 1 | 0 | 8, 9 | 0 | 4 | 3 | 4 |
| 123 | A2/B2 | 1 | 0 | 4, 9 | 0 | 3 | 3 | 4 |
| 124 | A2/B2 | 1 | 0 | 7, 9 | 6 | 3 | 2 | 4 |
| 125 | A2/B2 | 1 | 0 | 3, 4, 8, 9 | 0 | 3 | 3 | 4 |
| 126 | A2/B2 | 1 | 0 | 3, 4, 8, 9 | 0 | 4 | 3 | 4 |
| 127 | A2/B2 | 1 | 0 | 0, 1, 2, 3, 4, 5, 6, 7, 8, 9 | 6 | 3 | 2 | 4 |
| 128 | A2/B2 | 1 | 0 | 1, 3, 5, 7, 9 | 0 | 4 | 3 | 4 |
| 129 | A3/B3 | 2 | 1 | 8, 9 | 0 | 4 | 2 | 6 |
| 130 | A3/B3 | 2 | 1 | 7, 9 | 0 | 3 | 2 | 6 |
| 131 | A3/B3 | 2 | 1 | 7, 9 | 2 | 3 | 2 | 6 |
| 132 | A3/B3 | 2 | 1 | 4, 9 | 2 | 3 | 2 | 6 |
| 133 | A3/B3 | 2 | 1 | 4, 9 | 0 | 4 | 2 | 6 |
| 134 | A3/B3 | 2 | 1 | 9 | 0 | 3 | 2 | 6 |
| 135 | A3/B3 | 1 | 0 | 9 | 0 | 4 | 2 | 6 |
| 136 | A3/B3 | 1 | 0 | 9 | 2 | 3 | 2 | 6 |
| 137 | A3/B3 | 1 | 0 | 9 | 0 | 3 | 2 | 6 |
| 138 | A3/B3 | 1 | 0 | 8, 9 | 0 | 4 | 2 | 6 |
| 139 | A3/B3 | 1 | 0 | 4, 9 | 0 | 3 | 2 | 6 |
| 140 | A3/B3 | 1 | 0 | 7, 9 | 2 | 3 | 2 | 6 |
| 141 | A3/B3 | 1 | 0 | 3, 4, 8, 9 | 0 | 4 | 2 | 6 |
| 142 | A3/B3 | 1 | 0 | 0, 1, 2, 3, 4, 5, 6, 7, 8, 9 | 2 | 3 | 2 | 6 |
| 143 | A3/B3 | 1 | 0 | 1, 3, 5, 7, 9 | 0 | 3 | 2 | 6 |
| 144 | C0 | 16 | 1 | 9 | 2 | 4 | 6 | 2 |
| 145 | C0 | 8 | 1 | 9 | 2 | 4 | 6 | 2 |
| 146 | C0 | 4 | 1 | 9 | 2 | 3 | 6 | 2 |
| 147 | C0 | 2 | 1 | 2, 3, 4, 7, 8, 9 | 2 | 3 | 6 | 2 |
| 148 | C0 | 2 | 1 | 8, 9 | 2 | 4 | 6 | 2 |
| 149 | C0 | 2 | 1 | 7, 9 | 2 | 3 | 6 | 2 |
| 150 | C0 | 2 | 1 | 7, 9 | 8 | 3 | 3 | 2 |
| 151 | C0 | 2 | 1 | 4, 9 | 8 | 3 | 3 | 2 |
| 152 | C0 | 2 | 1 | 4, 9 | 2 | 4 | 6 | 2 |
| 153 | C0 | 2 | 1 | 9 | 2 | 3 | 6 | 2 |
| 154 | C0 | 1 | 0 | 9 | 2 | 4 | 6 | 2 |
| 155 | C0 | 1 | 0 | 9 | 8 | 3 | 3 | 2 |
| 156 | C0 | 1 | 0 | 9 | 2 | 3 | 6 | 2 |
| 157 | C0 | 1 | 0 | 8, 9 | 2 | 4 | 6 | 2 |
| 158 | C0 | 1 | 0 | 4, 9 | 2 | 3 | 6 | 2 |
| 159 | C0 | 1 | 0 | 7, 9 | 8 | 3 | 3 | 2 |
| 160 | C0 | 1 | 0 | 3, 4, 8, 9 | 2 | 3 | 6 | 2 |
| 161 | C0 | 1 | 0 | 3, 4, 8, 9 | 2 | 4 | 6 | 2 |
| 162 | C0 | 1 | 0 | 0, 1, 2, 3, 4, 5, 6, 7, 8, 9 | 8 | 3 | 3 | 2 |
| 163 | C0 | 1 | 0 | 1, 3, 5, 7, 9 | 2 | 3 | 6 | 2 |
| 164 | C2 | 16 | 1 | 9 | 2 | 4 | 2 | 6 |
| 165 | C2 | 8 | 1 | 9 | 2 | 4 | 2 | 6 |
| 166 | C2 | 4 | 1 | 9 | 2 | 3 | 2 | 6 |
| 167 | C2 | 2 | 1 | 2, 3, 4, 7, 8, 9 | 2 | 3 | 2 | 6 |
| 168 | C2 | 2 | 1 | 8, 9 | 2 | 4 | 2 | 6 |
| 169 | C2 | 2 | 1 | 7, 9 | 2 | 3 | 2 | 6 |
| 170 | C2 | 2 | 1 | 7, 9 | 8 | 3 | 1 | 6 |
| 171 | C2 | 2 | 1 | 4, 9 | 8 | 3 | 1 | 6 |
| 172 | C2 | 2 | 1 | 4, 9 | 2 | 4 | 2 | 6 |
| 173 | C2 | 2 | 1 | 9 | 2 | 3 | 2 | 6 |
| 174 | C2 | 1 | 0 | 9 | 2 | 4 | 2 | 6 |
| 175 | C2 | 1 | 0 | 9 | 8 | 3 | 1 | 6 |
| 176 | C2 | 1 | 0 | 9 | 2 | 3 | 2 | 6 |
| 177 | C2 | 1 | 0 | 8, 9 | 2 | 4 | 2 | 6 |
| 178 | C2 | 1 | 0 | 4, 9 | 2 | 3 | 2 | 6 |
| 179 | C2 | 1 | 0 | 7, 9 | 8 | 3 | 1 | 6 |

TABLE 39-continued

PRACH Configuration table

| PRACH Configuration Index | Preamble format | $n_{SFN}$ mod x = y | | Subframe number | Starting symbol | Number of PRACH slots within a subframe | Number of time-domain PRACH occasions within a RACH slot | PRACH duration |
|---|---|---|---|---|---|---|---|---|
| | | x | y | | | | | |
| 180 | C2 | 1 | 0 | 3, 4, 8, 9 | 2 | 3 | 2 | 6 |
| 181 | C2 | 1 | 0 | 3, 4, 8, 9 | 2 | 4 | 2 | 6 |
| 182 | C2 | 1 | 0 | 0, 1, 2, 3, 4, 5, 6, 7, 8, 9 | 8 | 3 | 1 | 6 |
| 183 | C2 | 1 | 0 | 1, 3, 5, 7, 9 | 2 | 3 | 2 | 6 |
| 184 | C2 | 8 | 1 | 9 | 8 | 4 | 1 | 6 |
| 185 | C2 | 4 | 1 | 9 | 8 | 3 | 1 | 6 |

Another design consideration is how to determine the PRACH frequency-domain resource, when NRU-sub 7 uses 60 kHz SCS. For NR, the frequency resources to transmit PRACH preambles can be determined from parameter prach-FDM, which gives the number of FDM'ed PRACH occasions in one time instance, with supported values of {1, 2, 4, 8}; as well as prach-frequency-start, which provides offset of the lowest PRACH transmission occasion in frequency domain with respect to PRB 0 of the UL BWP. For NR-U, even with 60 kHz SCS, the PRACH preamble with 12 consecutive RBs is up to 8.64 MHz bandwidth, which may need further enhancements to satisfy the OCB regulation. In one example, NRU-sub 7 PRACH fulfill the OCB regulation through proper resource allocation in frequency domain within certain bandwidth, wherein the bandwidth can be the initial active UL BWP, while PRACH in frequency domain can follow interlaced, interleaved, or direction repetition type of resource allocations.

In one embodiment, for NRU-sub 7, the frequency resource to transmit PRACH preambles can be at least partially determined from parameter prach-FDM and prach-frequency-start, with similar definitions of NR FR1. In one sub-embodiment, prach-FDM can support values of {1, 2, 4, 8} same as NR FR1. In another sub-embodiment, prach-FDM can support a subset of values of {1, 2, 4, 8}, such as {1, 2} or {1, 2, 4}. In another sub-embodiment, prach-FDM can support different values from NR. In another sub-embodiment, when NR-U PRACH is enhanced through interlace/repetition-type of resource allocation in frequency domain, the lowest frequency resource of the interlace/repetition to transmit PRACH preambles can be determined from the parameter prach-FDM and prach-frequency-start.

In one embodiment, for NRU-sub 7, the OCB regulation can be fulfilled by using 60 kHz SCS and allocating multiple FDM'ed PRACH occasions to a UE within the initial active UL BWP. For example, with 60 kHz SCS for PRACH, 2 FDM'ed PRACH occasions, OCB regulation can be fulfilled for initial active UL BWP of 20 MHz.

In another embodiment, when NR-U PRACH is enhanced to fulfill the OCB regulation through interlaced, interleaved, or direction repetition type of resource allocations, the remaining frequency resources to transmit PRACH preamble can be determined either explicitly through introducing new higher layer parameters to indicate the structure of interlace/repetition; or implicitly through existing L1 or higher layer parameters (e.g., prach-FDM, prach-frequency-start, initial active UL BWP bandwidth, etc.), and some pre-defined mapping rules that map these parameters to the structure/allocation of the interlaces/repetitions for NRU-sub 7 PRACH resources in frequency domain.

The unlicensed spectrum can be operated in a license assisted access mode, e.g., non-standalone mode, and the numerology of SS/PBCH block for non-standalone mode can be configured by higher layer. For example, for sub-7 unlicensed band operated in a non-standalone mode, the numerology of SS/PBCH block can be configurable from {15 kHz SCS with NCP, 30 kHz SCS with NCP, 60 kHz SCS with NCP, 60 kHz with ECP}, or a subset of {15 kHz SCS with NCP, 30 kHz SCS with NCP, 60 kHz SCS with NCP, 60 kHz with ECP}. For another example, for sub-7 unlicensed band operated in a non-standalone mode, the numerology of SS/PBCH block can be fixed as 60 kHz SCS with NCP. For yet another example, for sub-7 unlicensed band operated in a non-standalone mode, the numerology of SS/PBCH block can be fixed as 60 kHz SCS with ECP.

In one embodiment, the SS/PBCH block in non-standalone mode is the same as the standalone mode. The reserved symbols, originally for multiplexing the CORESET of RMSI/OSI/paging can be utilized for transmitting configured CSI-RS or reserved for LBT, or truncated.

Figure 33:
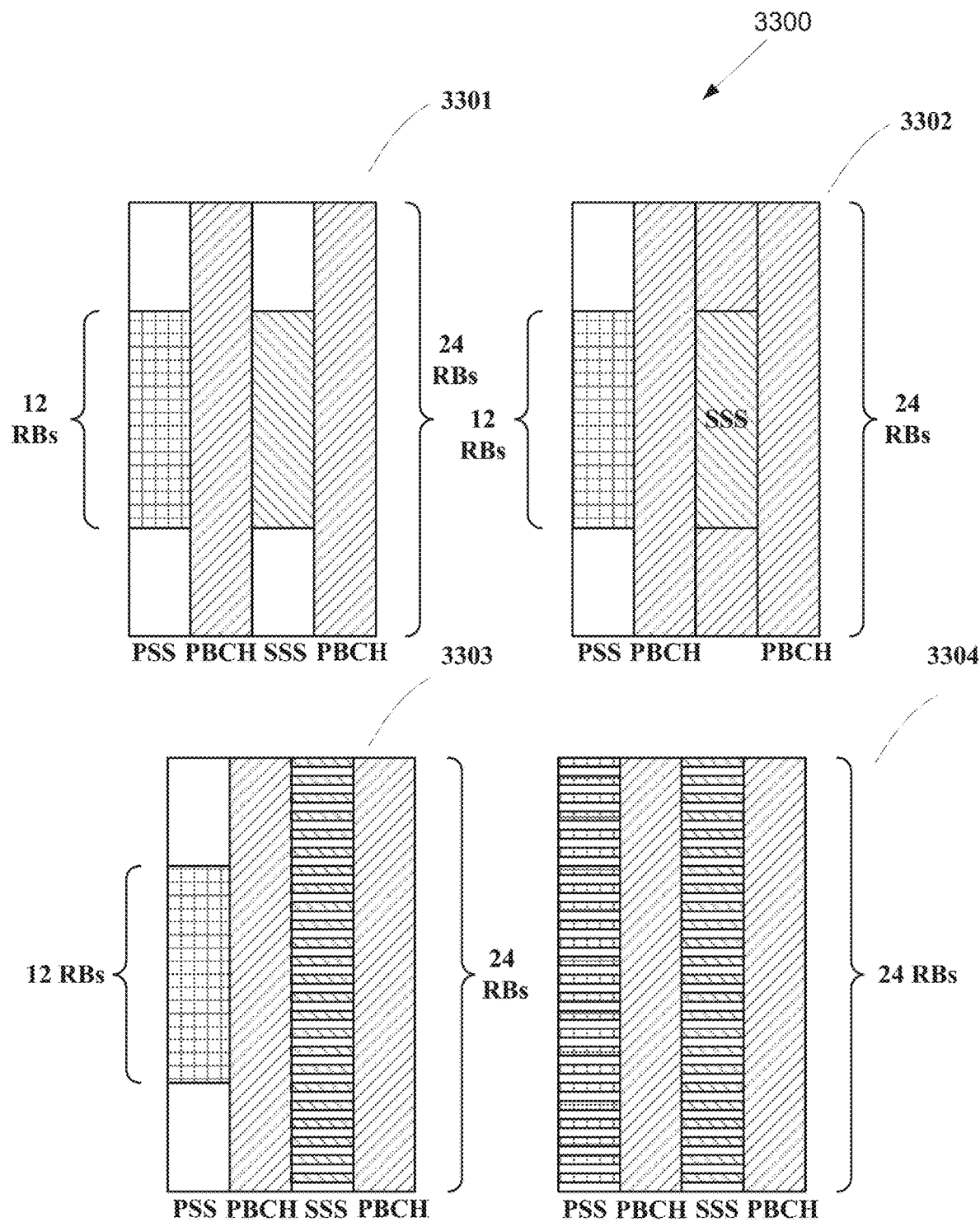
FIG. 33 illustrates an example BW of SS/PBCH block according to embodiments of the present disclosure.

FIG. 33 illustrates an example BW of SS/PBCH block 3300 according to embodiments of the present disclosure. The embodiment of the BW of SS/PBCH block 3300 illustrated in FIG. 33 is for illustration only. FIG. 33 does not limit the scope of this disclosure to any particular implementation.

In one example, to avoid the ambiguity of timing in the initial access, the SS/PBCH block for non-standalone mode is not transmitted on the predefined synchronization rasters.

In another example, to maximize the channel occupancy of SS/PBCH block, the BW of SS/PBCH block can be enlarged from 20 to 24 PRBs. Examples illustrating the enlarging of the BW of SS/PBCH block are shown in FIG. 33.

In one example, (e.g., 3301 in FIG. 33), the RBs mapped to the two sides of SSS in the standalone SS/PBCH block are mapped to symbols containing PBCH such that the BW of PBCH is 24 RBs.

In one example (e.g., 3302 in FIG. 33), add another 2 RBs mapped for PBCH to each side of the symbols containing PBCH or SSS in the standalone SS/PBCH block such that the BW of PBCH is 24 RBs.

In one example (e.g., 3303 in FIG. 33), on top of the modification in 3301, the SSS is mapped in an interleaving way (e.g. mapped to REs with even index or odd index only) such that the BW of PBCH and SSS are both 24 RBs.

In one example (e.g., 3304 in FIG. 33), on top of the modification in 3303, the PSS is mapped in an interleaving way (e.g. mapped to REs with even index or odd index only) such that the BW of PSS, SSS, and PBCH are all 24 RBs.

In another embodiment, the SS/PBCH block in non-standalone mode is different from the standalone mode.

In one example, a SS/PBCH block contains only SSS and PBCH (including SS/PBCH block's associated DMRS), and no PSS is in the SS/PBCH block for non-standalone mode. For example, the SS/PBCH block for non-standalone mode is the one for standalone mode with symbol for PSS truncated, such that there are only 3 consecutive symbols consisting the block.

In another example, to avoid the ambiguity of timing in the initial access, the SS/PBCH block for non-standalone mode is not transmitted on the predefined synchronization rasters.

Figure 34:
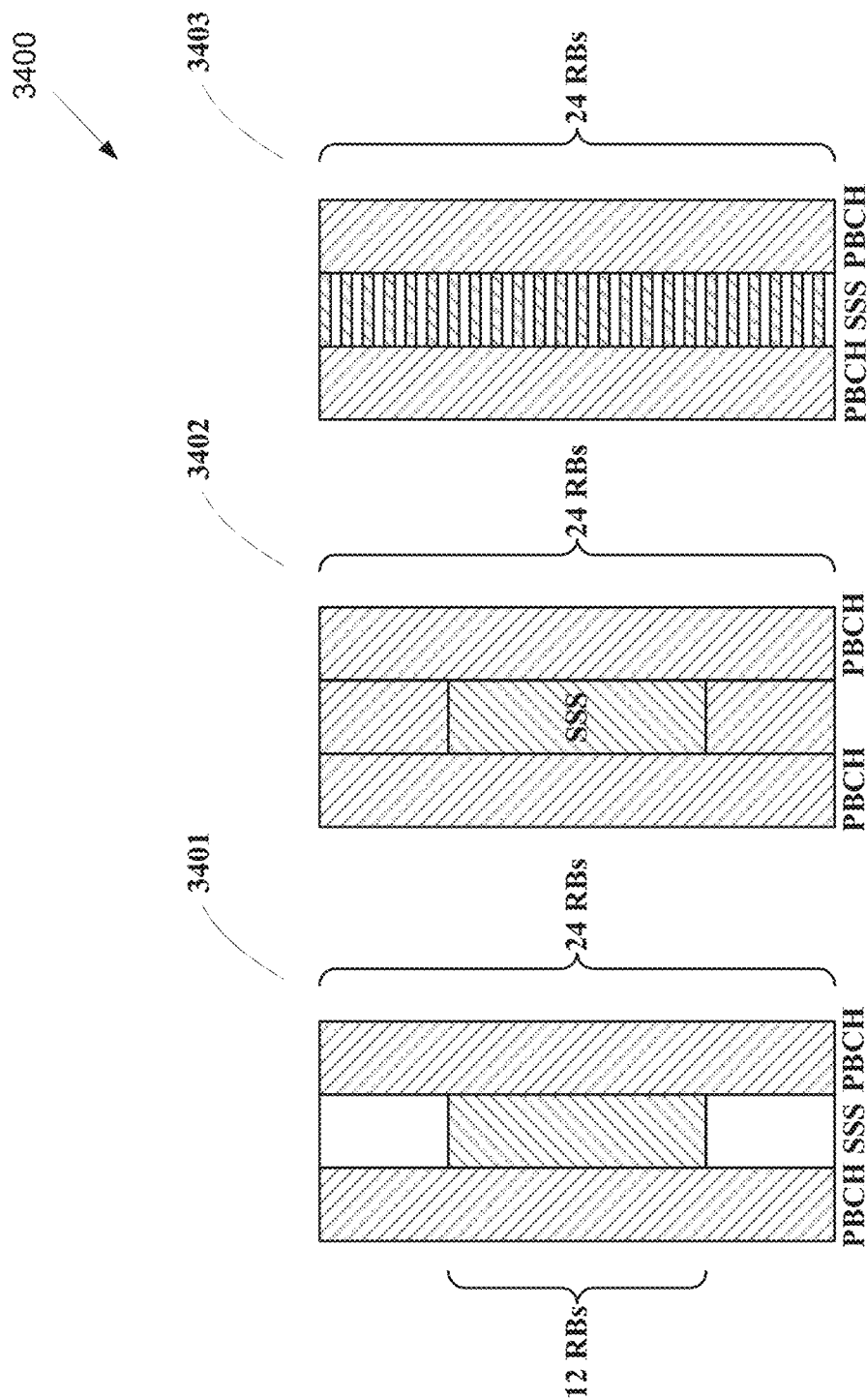
FIG. 34 illustrates another example BW of SS/PBCH block according to embodiments of the present disclosure.

FIG. 34 illustrates another example BW of SS/PBCH block 3400 according to embodiments of the present disclosure. The embodiment of the BW of SS/PBCH block 3400 illustrated in FIG. 34 is for illustration only. FIG. 34 does not limit the scope of this disclosure to any particular implementation.

In yet another example, to maximize the channel occupancy of SS/PBCH block, the BW of SS/PBCH block can be enlarged from 20 to 24 PRBs. Examples illustrating the enlarging of the BW of SS/PBCH block are shown in FIG. 34.

In one example (e.g., 3401 in FIG. 34), the RBs mapped to the two sides of SSS in the standalone SS/PBCH block are mapped to symbols containing PBCH such that the BW of PBCH is 24 RBs.

In one example, (e.g., 3402 in FIG. 34), add another 2 RBs mapped for PBCH to each side of the symbols containing PBCH or SSS in the standalone SS/PBCH block such that the BW of PBCH is 24 RBs.

In one example, (e.g., 3403 in FIG. 34) on top of the modification in 3401, the SSS is mapped in an interleaving way (e.g. mapped to REs with even index or odd index only) such that the BW of PBCH and SSS are both 24 RBs.

In one example, the mapping of SS/PBCH blocks for non-standalone mode to the slot(s) can be predefined, wherein each SS/PBCH block contains 3 consecutive symbols (either with 20 RBs BW or 24 RBs BW).

In one example, the mapping of symbols for SSS and PBCH can be same as the mapping pattern in standalone mode, and the symbol mapped for PSS in the standalone mode can be used for other purpose, such as at least one of performing LBT, or transmitting configured CSI-RS.

Figure 35:
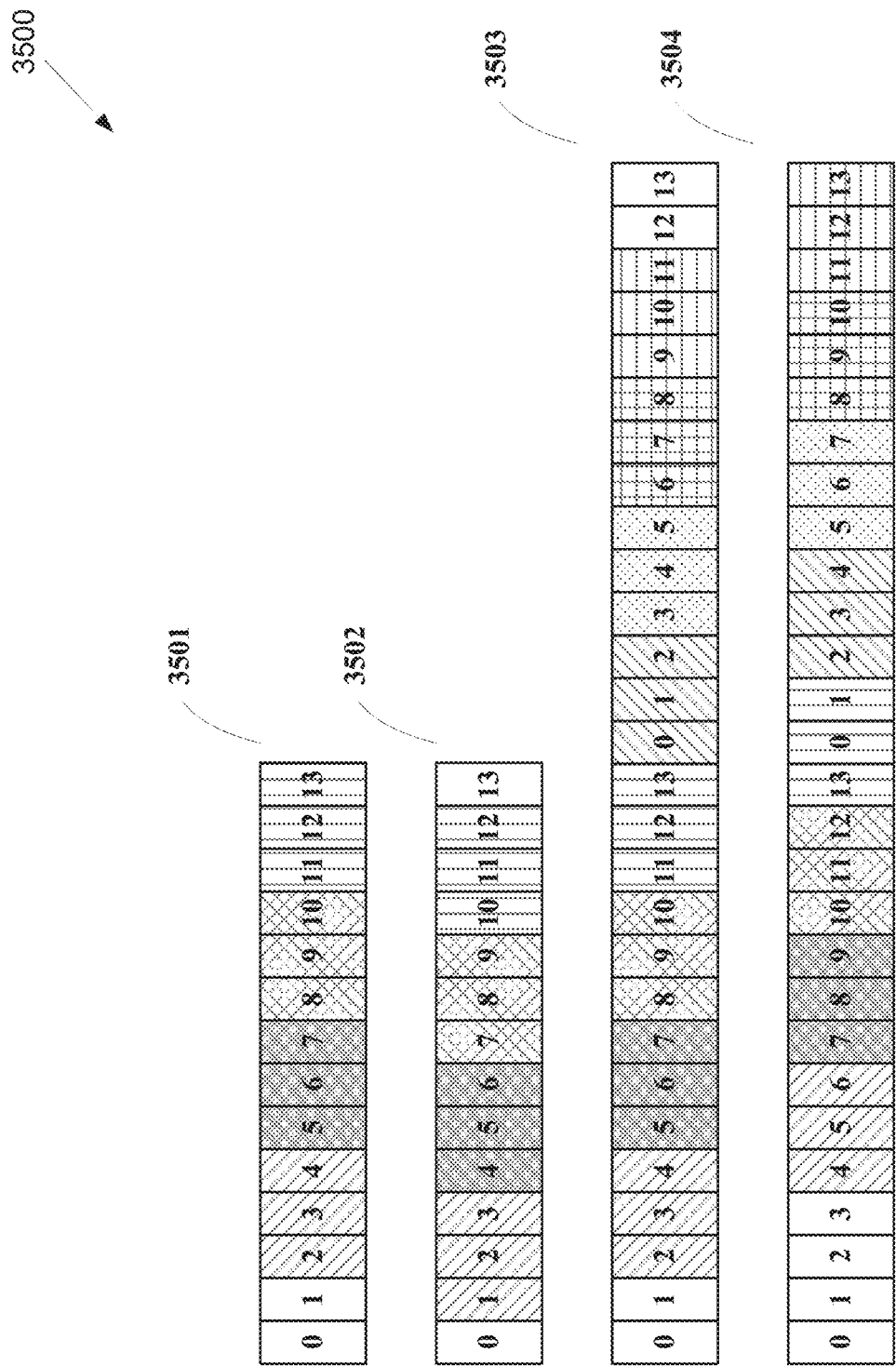
FIG. 35 illustrates an example mapping of SS/PBCH block according to embodiments of the present disclosure.

FIG. 35 illustrates an example mapping of SS/PBCH block 3500 according to embodiments of the present disclosure. The embodiment of the mapping of SS/PBCH block 3500 illustrated in FIG. 35 is for illustration only. FIG. 35 does not limit the scope of this disclosure to any particular implementation.

Figure 36:
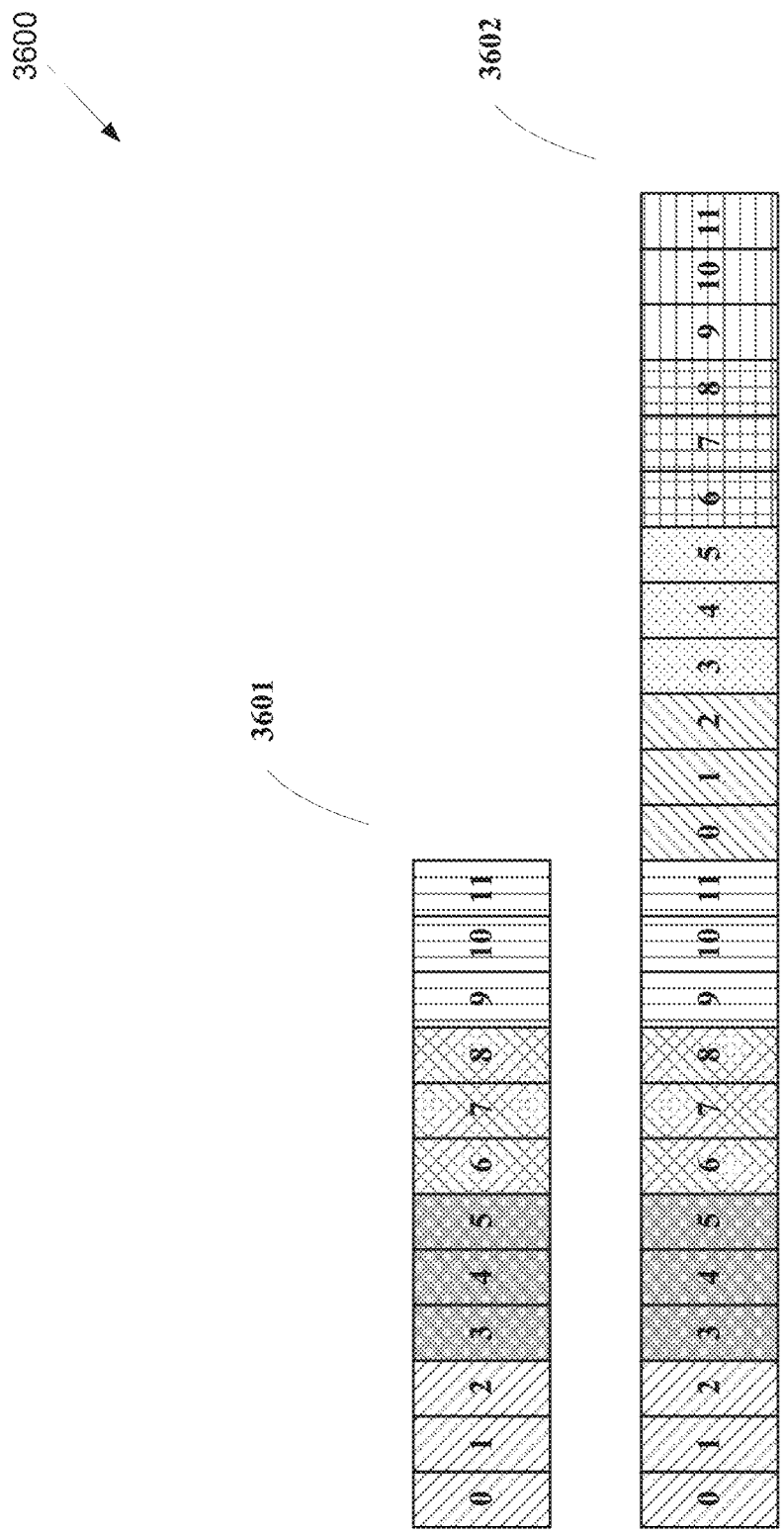
FIG. 36 illustrates another example mapping of SS/PBCH block according to embodiments of the present disclosure.

FIG. 36 illustrates another example mapping of SS/PBCH block 3600 according to embodiments of the present disclosure. The embodiment of the mapping of SS/PBCH block 3600 illustrated in FIG. 36 is for illustration only. FIG. 36 does not limit the scope of this disclosure to any particular implementation.

Figure 37:
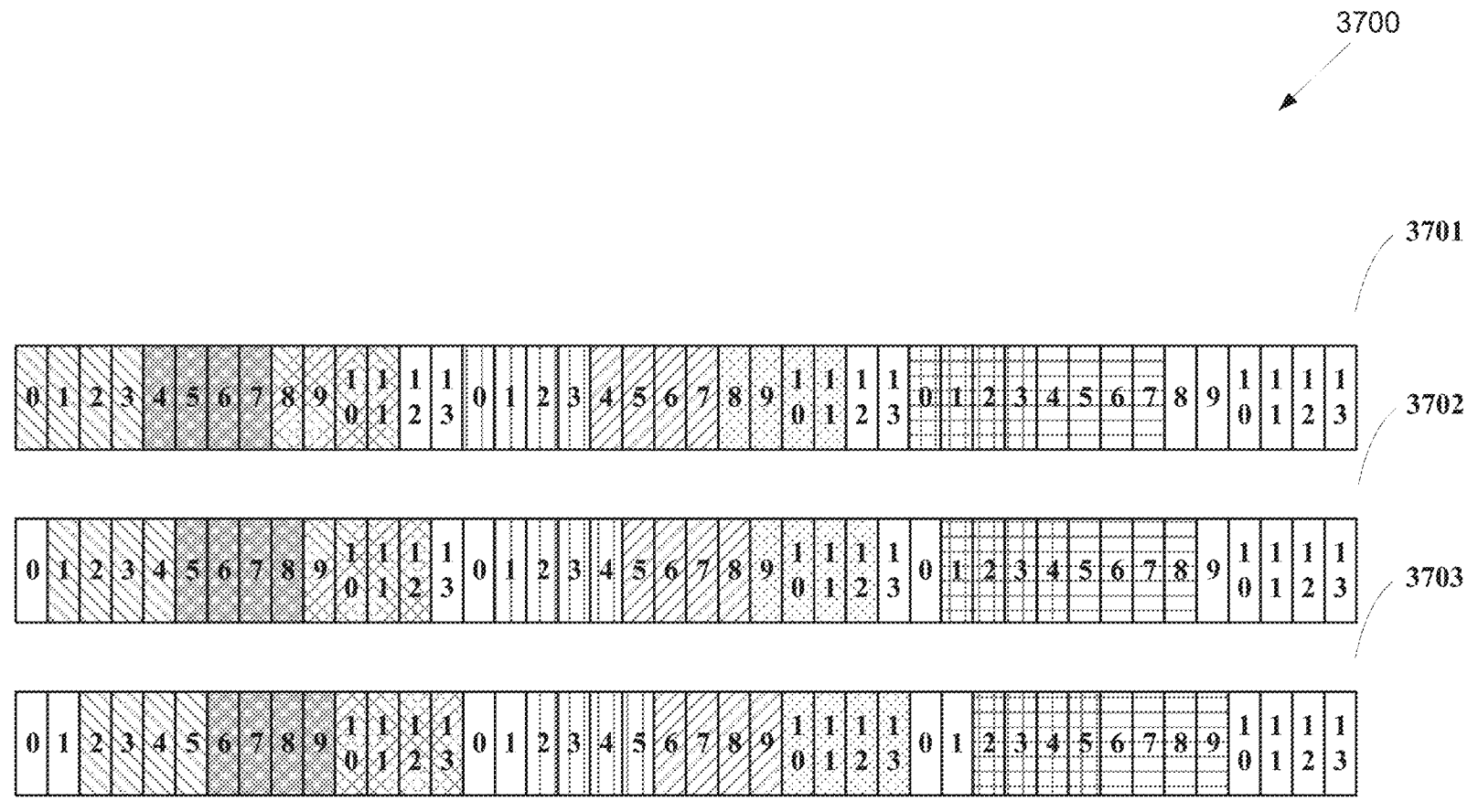

FIG. 37 illustrates yet another example mapping of SS/PBCH block 3700 according to embodiments of the present disclosure. The embodiment of the mapping of SS/PBCH block 3700 illustrated in FIG. 37 is for illustration only. FIG. 37 does not limit the scope of this disclosure to any particular implementation.

In yet another embodiment, the mapping of SS/PBCH blocks for non-standalone mode can be as compact as possible such that there is no gap between neighboring blocks within the burst, or no gap between neighboring blocks within a slot within the burst. Some examples are illustrated in FIG. 35 and FIG. 36 for SS/PBCH blocks with 3 symbols, for normal CP and extended CP, respectively. Some extra examples are illustrated in FIG. 37 for SS/PBCH blocks with 4 symbols.

Other than using larger SCS for SS/PBCH block (SSB) to meet OCB requirement of a carrier (e.g. using 60 kHz for FR1), there can be other approaches.

In one example, this approach can apply for non-standalone operation, wherein a SS/PBCH block without multiplexed other signal/channel cannot meet OCB requirement. In another example, this approach can apply for PCells, and the PDCCH/PDSCH of broadcast information (e.g., RMSI) is not multiplexed within the same slot as the SS/PBCH block. In yet another example, this approach can apply for non-cell defining SS/PBCH blocks (e.g., the indication is in the PBCH of the SS/PBCH block).

Figure 38A:
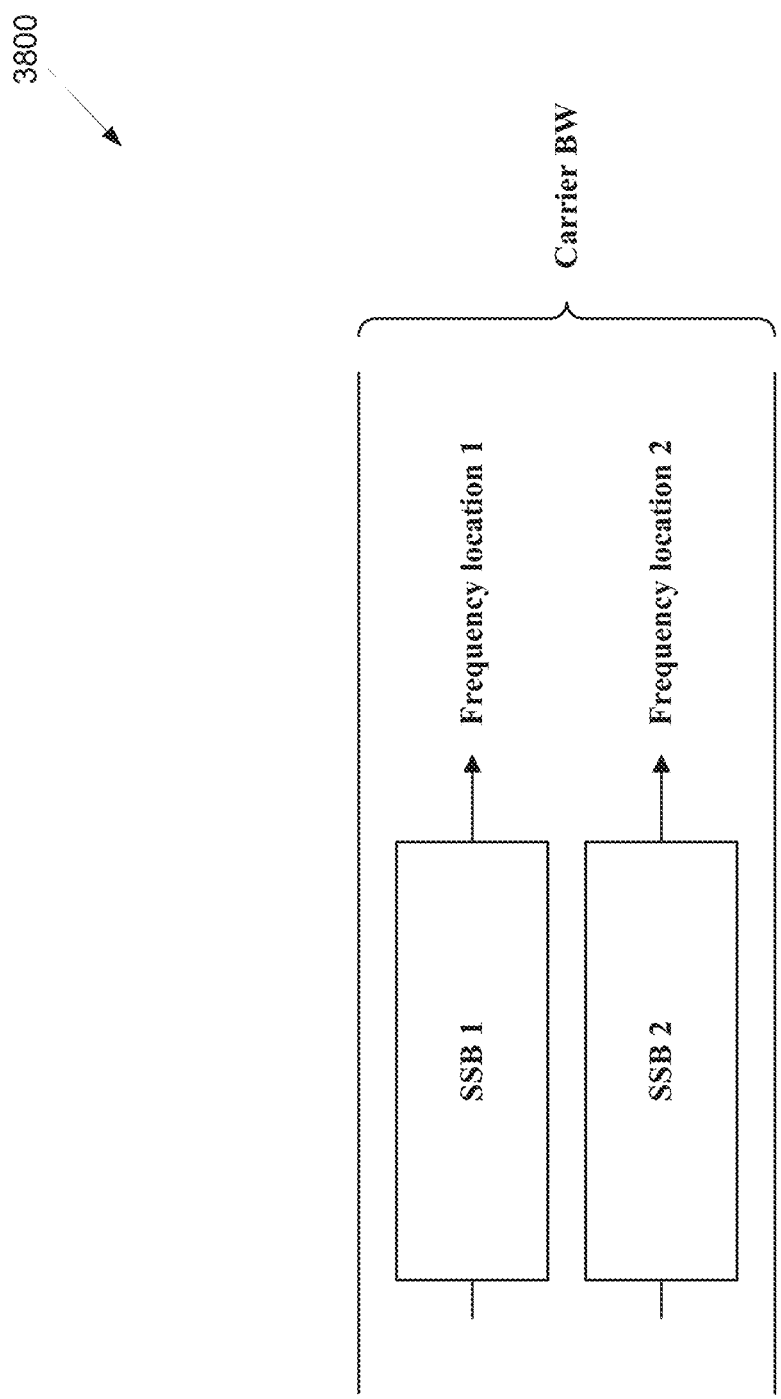
FIG. 38A illustrates an example location of SS/PBCH blocks according to embodiments of the present disclosure.

FIG. 38A illustrates an example location of SS/PBCH blocks 3800 according to embodiments of the present disclosure. The embodiment of the location of SS/PBCH blocks 3800 illustrated in FIG. 38A is for illustration only. FIG. 38A does not limit the scope of this disclosure to any particular implementation.

In one example, there can be multiple SS/PBCH blocks FDMed within a carrier to meet the OCB requirement, for example, two SS/PBCH blocks with SCS of 30 kHz to meet the OCB requirement of a carrier with 20 MHz BW. An illustration of this approach is shown in FIG. 38A.

In one example of the locations of multiple SS/PBCH blocks, the multiple SS/PBCH blocks are located apart from each other such that the OCB requirement can be satisfied (e.g., there can be potential gaps between neighboring SS/PBCH blocks in frequency domain).

In another example of the locations of multiple SS/PBCH blocks, the multiple SS/PBCH blocks are located next to each other and the OCB requirement can be satisfied (e.g. there is no gap between neighboring SS/PBCH blocks in frequency domain).

In one example of the cell ID on different SS/PBCH blocks, the multiple SS/PBCH blocks are using different cell IDs, such that the signals and channels in different SS/PBCH blocks within the same band are different.

In another example of the cell ID on different SS/PBCH blocks, the multiple SS/PBCH blocks are using the same cell ID, such that the signals and channels in different SS/PBCH blocks within the same band are the same. From a UE's point of view, the multiple SS/PBCH blocks together define a cell.

In one example, all the frequency locations for the multiple SS/PBCH blocks are on the SS rasters. In one consideration of this example, there is an indication of the location of another SS/PBCH block in the same carrier. For example, the frequency location is expressed in a SS raster. For another example, the other SS/PBCH block with location indicated is the neighboring SS/PBCH block.

In another example, only one of the multiple SS/PBCH blocks is on the SS raster, and the others may or may not be located on the SS raster. For this example, there is an indication of frequency locations of other SS/PBCH blocks in the SS/PBCH block on the SS raster. For example, the frequency location is expressed in a channel raster.

Figure 38B:
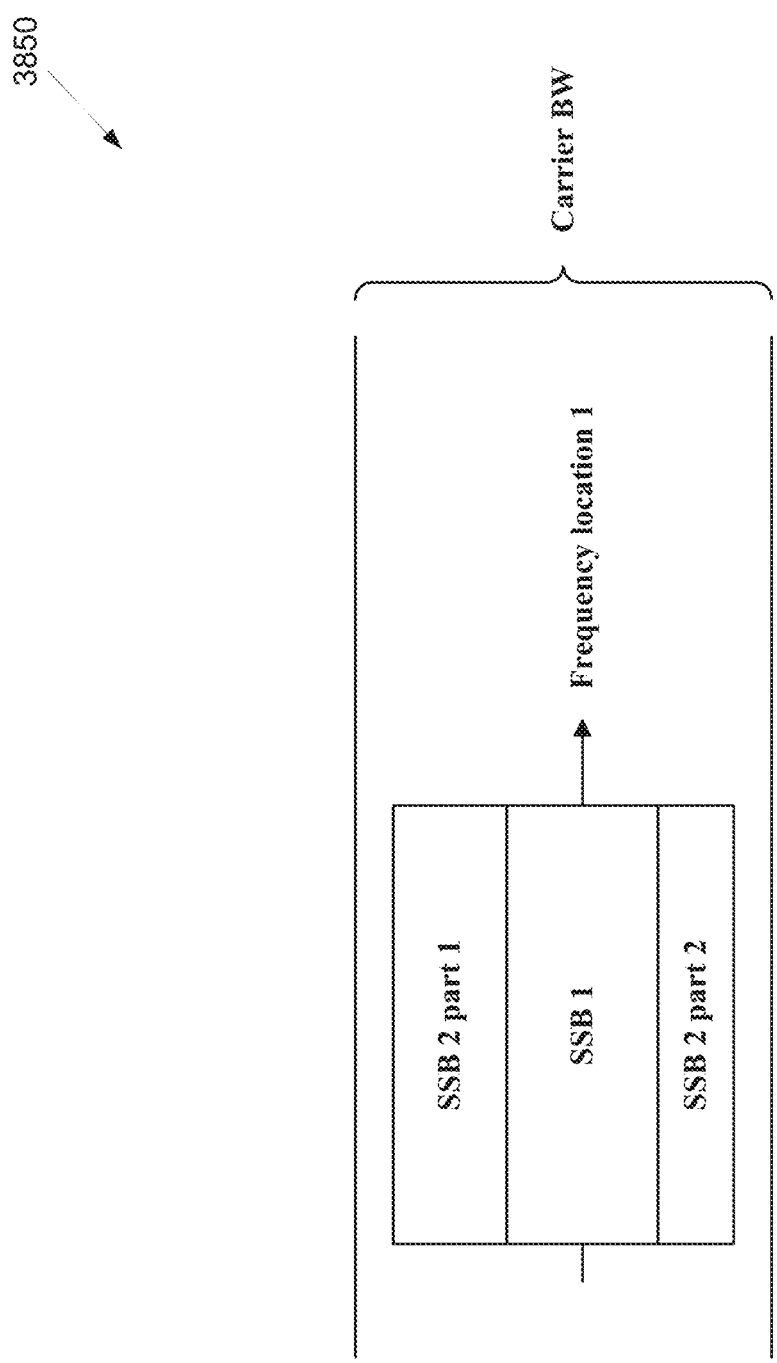
FIG. 38B illustrates another example location of SS/PBCH blocks according to embodiments of the present disclosure.

FIG. 38B illustrates another example location of SS/PBCH blocks 3850 according to embodiments of the present disclosure. The embodiment of the location of SS/PBCH blocks 3850 illustrated in FIG. 38B is for illustration only. FIG. 38B does not limit the scope of this disclosure to any particular implementation.

In another approach, there can be multiple SS/PBCH blocks within a carrier, and some of the SS/PBCH blocks can be divided into multiple parts and multiplexed together in a FDM manner to meet the OCB requirement, for example, a first SS/PBCH block with SCS of 30 kHz FDMed with 2 parts of a second SS/PBCH block on each side of the first SS/PBCH block to meet the OCB requirement of a carrier with 20 MHz BW. An illustration of this approach is shown in FIG. 38B.

In one example of the frequency locations of multiple SS/PBCH blocks, at least one of them is located on the SS raster for initial access purpose (e.g. Frequency location 1 in FIG. 38B).

In one example, there is an indication, in a SS/PBCH block, on the frequency location of each part for other SS/PBCH bock (e.g. the frequency location of SSB2 part 1 and part 2 in FIG. 38B).

In another example, there is an indication, in a SS/PBCH block, on the frequency location of other SS/PBCH block, and single frequency location indication is sufficient (e.g. the location of lowest RB or middle RB), since the BW of the other SS/PBCH block is fixed.

In yet another example, there is no indication of the frequency location of other SS/PBCH block, and the relative location of the other SS/PBCH block is fixed, e.g. SSB2 part 1 and part 2 both have 10 RB bandwidth and located on each side of SSB1 in FIG. 38B.

In one example of the cell ID on different SS/PBCH blocks, the multiple SS/PBCH blocks are using different cell IDs, such that the signals and channels in different SS/PBCH blocks within the same band are different.

In another example of the cell ID on different SS/PBCH blocks, the multiple SS/PBCH blocks are using the same cell ID, such that the signals and channels in different SS/PBCH blocks within the same band are the same. From a UE's point of view, the multiple SS/PBCH blocks together define a cell.

Figure 39:
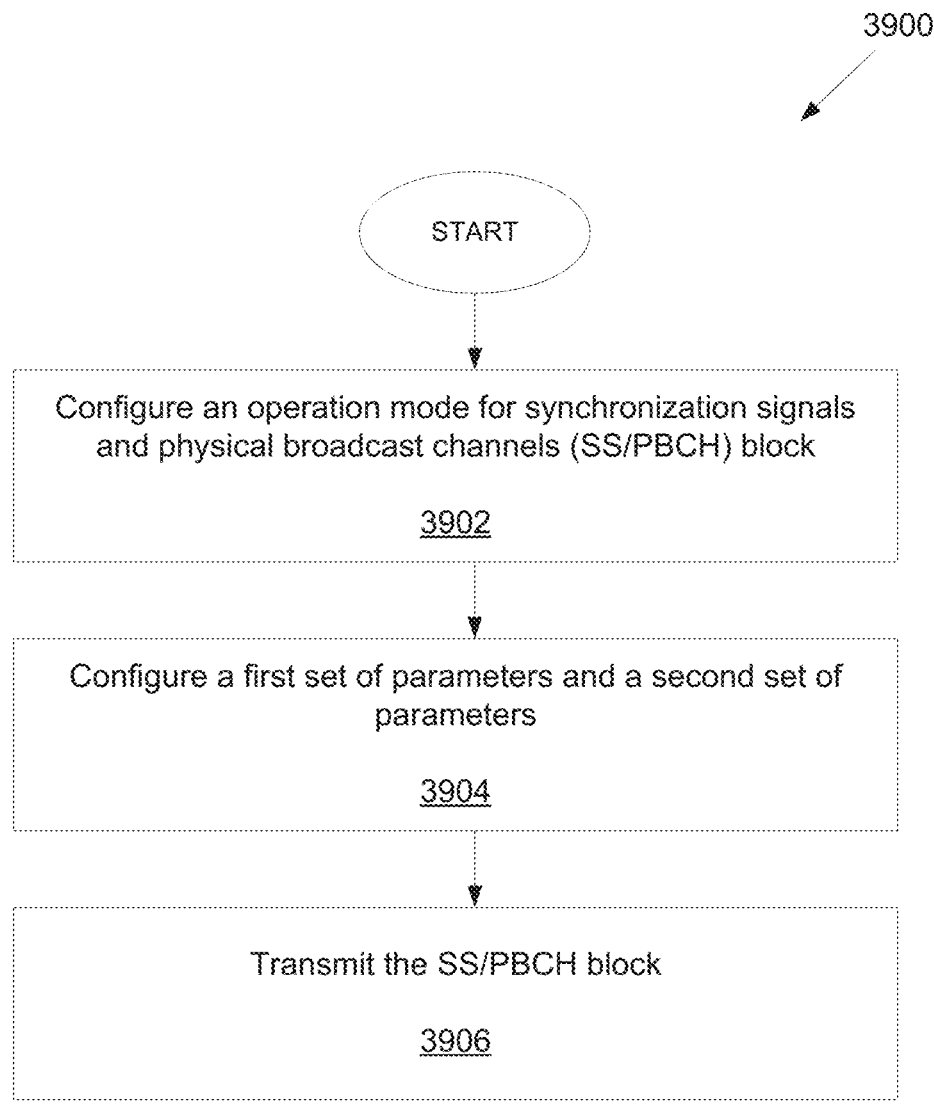
FIG. 39 illustrates a flow chart of a method for supporting larger subcarrier spacing according to embodiments of the present disclosure.

FIG. 39 illustrates a flow chart of a method 3900 for supporting larger subcarrier spacing, as may be performed by a base station (BS) (e.g., 101-103 as illustrated in FIG. 1) according to embodiments of the present disclosure. The embodiment of the method 3900 illustrated in FIG. 39 is for illustration only. FIG. 39 does not limit the scope of this disclosure to any particular implementation.

As illustrated in FIG. 39, the method 3900 begins at step 3902. In step 3902, the BS configures an operation mode for synchronization signals and physical broadcast channels (SS/PBCH) block as a first operation mode in which the SS/PBCH block is used on a licensed-assisted-access (LAA) secondary cell (Scell) or a second operation mode in which the SS/PBCH block is at least used on a primary cell (Pcell).

In one embodiment, the SS/PBCH block structure configured for the first operation mode is one symbol shorter than the SS/PBCH block structure configured for the second operation mode and a symbol mapped to a primary synchronization signal (PSS) in the SS/PBCH block structure configured for the second operation mode is truncated in the SS/PBCH block structure configured for the first operation mode.

In one embodiment, the SS/PBCH block time-domain mapping pattern configured for the first operation mode includes consecutive symbols in a slot mapped to SS/PBCH blocks, the slot being mapped to at least more than two SS/PBCH blocks and the SS/PBCH block time-domain mapping pattern configured for the second operation mode includes non-consecutive symbols in a slot mapped to SS/PBCH blocks, the slot being mapped to up to two SS/PBCH blocks.

In such embodiments, for the SS/PBCH block time-domain mapping pattern configured for the first operation mode, three SS/PBCH blocks are mapped to symbols 0, 4, and 7, respectively, as a start symbol in the slot when the SS/PBCH block structure is configured to include 4 symbols and four SS/PBCH blocks are mapped to symbols 0, 3, 6, and 9, respectively, as a start symbol in the slot when the SS/PBCH block structure is configured to include 3 symbols.

In some embodiment, in step 3902, the BS may further configure a numerology of the SS/PBCH block including a subcarrier spacing (SCS) for the first and second set of parameters configured for the first and second operation mode respectively. In such embodiments, a first SCS configured for the SS/PBCH block in the first operation mode is larger than a second SCS configured for the SS/PBCH block in the second operation mode, an SCS of 60 kHz is configured for the SS/PBCH block in the first operation mode, and an SCS of 30 kHz is configured for the SS/PBCH block in the second operation mode.

In some embodiment, in step 3902, the BS may further comprises configuring parameters of a control resource set (CORESET) for monitoring common search space (CSS) of a physical downlink control channel (PDCCH) including scheduling information for remaining minimum system information (RMSI) when the SS/PBCH block is configured in the second operation mode. In such embodiment, the parameters of the CORESET includes at least one of an SCS of the CORESET that is the SCS of the SS/PBCH block, a bandwidth of the CORESET configured as 24, a number of symbols for the CORESET configured from 1, 2, or 3, and a frequency offset, configured from 0, 1, 2, or 3, between a first resource block (RB) of the CORESET and a first resource block of the SS/PBCH block.

In step 3904, the BS configures a set of parameters as a first set of parameters for the SS/PBCH block when the operation mode of the SS/PBCH block is configured as the first operation mode or a second set of parameters for the SS/PBCH block when the operation mode of the SS/PBCH block is configured as the second operation mode, wherein the first and second set of parameters include different information each other, the information comprising at least one of an SS/PBCH block structure or an SS/PBCH block time-domain mapping pattern.

In step 3906, the BS transmits, to a user equipment (UE), the SS/PBCH block over downlink channels using the configured set of parameters based on the configured operation mode.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:

a transceiver configured to receive, from a base station (BS), synchronization signals and physical broadcast channels (SS/PBCH) block over downlink channels using a set of parameters based on an operation mode, wherein:
the operation mode is configured for the SS/PBCH block as a first operation mode in which the SS/PBCH block is used on a licensed-assisted-access (LAA) secondary cell (Scell) or a second operation mode in which the SS/PBCH block is at least used on a primary cell (Pcell),
the set of parameters is configured as a first set of parameters for the SS/PBCH block when the operation mode of the SS/PBCH block is configured as the first operation mode or a second set of parameters for the SS/PBCH block when the operation mode of the SS/PBCH block is configured as the second operation mode, and
the first and second set of parameters include different information from each other, the information comprising at least one of an SS/PBCH block structure or an SS/PBCH block time-domain mapping pattern.

2. The UE of claim 1, wherein:
the SS/PBCH block structure configured for the first operation mode is one symbol shorter than the SS/PBCH block structure configured for the second operation mode; and
a symbol mapped to a primary synchronization signal (PSS) in the SS/PBCH block structure configured for the second operation mode is truncated in the SS/PBCH block structure configured for the first operation mode.

3. The UE of claim 1, wherein:
the SS/PBCH block time-domain mapping pattern configured for the first operation mode includes consecutive symbols in a slot mapped to SS/PBCH blocks, the slot being mapped to at least more than two SS/PBCH blocks; and
the SS/PBCH block time-domain mapping pattern configured for the second operation mode includes non-consecutive symbols in a slot mapped to SS/PBCH blocks, the slot being mapped to up to two SS/PBCH blocks.

4. The UE of claim 3, wherein, for the SS/PBCH block time-domain mapping pattern configured for the first operation mode:
three SS/PBCH blocks are mapped to symbols 0, 4, and 7, respectively, as a start symbol in the slot when the SS/PBCH block structure is configured to include 4 symbols; and
four SS/PBCH blocks are mapped to symbols 0, 3, 6, and 9, respectively, as a start symbol in the slot when the SS/PBCH block structure is configured to include 3 symbols.

5. The UE of claim 1, further comprising at least one processor operably connected to the transceiver, the at least one processor configured to determine a numerology of the SS/PBCH block including a subcarrier spacing (SCS) for the first and second set of parameters configured for the first and second operation mode respectively, and wherein a first SCS configured for the SS/PBCH block in the first operation mode is larger than a second SCS configured for the SS/PBCH block in the second operation mode.

6. The UE of claim 5, wherein an SCS of 60 kHz is configured for the SS/PBCH block in the first operation mode, and an SCS of 30 kHz is configured for the SS/PBCH block in the second operation mode.

7. The UE of claim 1, further comprising at least one processor operably connected to the transceiver, the at least one processor configured to determine parameters of a control resource set (CORESET) for monitoring common search space (CSS) of a physical downlink control channel (PDCCH) including scheduling information for remaining minimum system information (RMSI) when the SS/PBCH block is configured in the second operation mode,
wherein the parameters of the CORESET includes at least one of an SCS of the CORESET that is the SCS of the SS/PBCH block, a bandwidth of the CORESET configured as 24, a number of symbols for the CORESET configured from 1, 2, or 3, and a frequency offset, configured from 0, 1, 2, or 3, between a first resource block (RB) of the CORESET and a first resource block of the SS/PBCH block.

8. A base station (BS) in a wireless communication system, the BS comprising:
at least one processor configured to:
configure an operation mode for synchronization signals and physical broadcast channels (SS/PBCH) block as a first operation mode in which the SS/PBCH block is used on a licensed-assisted-access (LAA) secondary cell (Scell) or a second operation mode in which the SS/PBCH block is at least used on a primary cell (Pcell);
configure a set of parameters as a first set of parameters for the SS/PBCH block when the operation mode of the SS/PBCH block is configured as the first operation mode or a second set of parameters for the SS/PBCH block when the operation mode of the SS/PBCH block is configured as the second operation mode, wherein the first and second set of parameters include different information from each other, the information comprising at least one of an SS/PBCH block structure or an SS/PBCH block time-domain mapping pattern; and
a transceiver operably connected to the at least one processor, the transceiver configured to transmit, to a user equipment (UE), the SS/PBCH block over downlink channels using the configured set of parameters based on the configured operation mode.

9. The BS of claim 8, wherein:
the SS/PBCH block structure configured for the first operation mode is one symbol shorter than the SS/PBCH block structure configured for the second operation mode; and
a symbol mapped to a primary synchronization signal (PSS) in the SS/PBCH block structure configured for the second operation mode is truncated in the SS/PBCH block structure configured for the first operation mode.

10. The BS of claim 8, wherein:
the SS/PBCH block time-domain mapping pattern configured for the first operation mode includes consecutive symbols in a slot mapped to SS/PBCH blocks, the slot being mapped to at least more than two SS/PBCH blocks; and
the SS/PBCH block time-domain mapping pattern configured for the second operation mode includes non-consecutive symbols in a slot mapped to SS/PBCH blocks, the slot being mapped to up to two SS/PBCH blocks.

11. The BS of claim 10, wherein, for the SS/PBCH block time-domain mapping pattern configured for the first operation mode:

three SS/PBCH blocks are mapped to symbols 0, 4, and 7, respectively, as a start symbol in the slot when the SS/PBCH block structure is configured to include 4 symbols; and four SS/PBCH blocks are mapped to symbols 0, 3, 6, and 9, respectively, as a start symbol in the slot when the SS/PBCH block structure is configured to include 3 symbols.

12. The BS of claim 8, wherein the at least one processor is further configured to configure a numerology of the SS/PBCH block including a subcarrier spacing (SCS) for the first and second set of parameters configured for the first and second operation mode respectively, and wherein a first SCS configured for the SS/PBCH block in the first operation mode is larger than a second SCS configured for the SS/PBCH block in the second operation mode.

13. The BS of claim 12, wherein an SCS of 60 kHz is configured for the SS/PBCH block in the first operation mode, and an SCS of 30 kHz is configured for the SS/PBCH block in the second operation mode.

14. The BS of claim 8, wherein the at least one processor is further configured to configure parameters of a control resource set (CORESET) for monitoring common search space (CSS) of a physical downlink control channel (PDCCH) including scheduling information for remaining minimum system information (RMSI) when the SS/PBCH block is configured in the second operation mode, and wherein the parameters of the CORESET includes at least one of an SCS of the CORESET that is the SCS of the SS/PBCH block, a bandwidth of the CORESET configured as 24, a number of symbols for the CORESET configured from 1, 2, or 3, and a frequency offset, configured from 0, 1, 2, or 3, between a first resource block (RB) of the CORESET and a first resource block of the SS/PBCH block.

15. A method of a base station (BS) in a wireless communication system, the method comprising:

configuring an operation mode for synchronization signals and physical broadcast channels (SS/PBCH) block as a first operation mode in which the SS/PBCH block is used on a licensed-assisted-access (LAA) secondary cell (Scell) or a second operation mode in which the SS/PBCH block is at least used on a primary cell (Pcell);

configuring a set of parameters as a first set of parameters for the SS/PBCH block when the operation mode of the SS/PBCH block is configured as the first operation mode or a second set of parameters for the SS/PBCH block when the operation mode of the SS/PBCH block is configured as the second operation mode, wherein the first and second set of parameters include different information from each other, the information comprising at least one of an SS/PBCH block structure or an SS/PBCH block time-domain mapping pattern; and transmitting, to a user equipment (UE), the SS/PBCH block over downlink channels using the configured set of parameters based on the configured operation mode.

16. The method of claim 15, wherein:

the SS/PBCH block structure configured for the first operation mode is one symbol shorter than the SS/PBCH block structure configured for the second operation mode; and a symbol mapped to a primary synchronization signal (PSS) in the SS/PBCH block structure configured for the second operation mode is truncated in the SS/PBCH block structure configured for the first operation mode.

17. The method of claim 15, wherein:

the SS/PBCH block time-domain mapping pattern configured for the first operation mode includes consecutive symbols in a slot mapped to SS/PBCH blocks, the slot being mapped to at least more than two SS/PBCH blocks; and the SS/PBCH block time-domain mapping pattern configured for the second operation mode includes non-consecutive symbols in a slot mapped to SS/PBCH blocks, the slot being mapped to up to two SS/PBCH blocks.

18. The method of claim 17, wherein, for the SS/PBCH block time-domain mapping pattern configured for the first operation mode:

three SS/PBCH blocks are mapped to symbols 0, 4, and 7, respectively, as a start symbol in the slot when the SS/PBCH block structure is configured to include 4 symbols; and four SS/PBCH blocks are mapped to symbols 0, 3, 6, and 9, respectively, as a start symbol in the slot when the SS/PBCH block structure is configured to include 3 symbols.

19. The method of claim 15, further comprising configuring a numerology of the SS/PBCH block including a subcarrier spacing (SCS) for the first and second set of parameters configured for the first and second operation mode respectively, wherein:

a first SCS configured for the SS/PBCH block in the first operation mode is larger than a second SCS configured for the SS/PBCH block in the second operation mode;

an SCS of 60 kHz is configured for the SS/PBCH block in the first operation mode; and an SCS of 30 kHz is configured for the SS/PBCH block in the second operation mode.

20. The method of claim 15, further comprising configuring parameters of a control resource set (CORESET) for monitoring common search space (CSS) of a physical downlink control channel (PDCCH) including scheduling information for remaining minimum system information (RMSI) when the SS/PBCH block is configured in the second operation mode, wherein the parameters of the CORESET includes at least one of an SCS of the CORESET that is the SCS of the SS/PBCH block, a bandwidth of the CORESET configured as 24, a number of symbols for the CORESET configured from 1, 2, or 3, and a frequency offset, configured from 0, 1, 2, or 3, between a first resource block (RB) of the CORESET and a first resource block of the SS/PBCH block.

* * * * *